US011899778B2

(12) United States Patent
Tao et al.

(10) Patent No.: US 11,899,778 B2
(45) Date of Patent: Feb. 13, 2024

(54) PASSWORD VERIFICATION METHOD, PASSWORD SETTING METHOD, AND MOBILE TERMINAL

(71) Applicant: Huawei Technologies Co., Ltd., Shenzhen (CN)

(72) Inventors: Qiang Tao, Beijing (CN); Jing Han, Beijing (CN); Guangyuan Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 413 days.

(21) Appl. No.: 16/651,897

(22) PCT Filed: Sep. 30, 2017

(86) PCT No.: PCT/CN2017/104923
§ 371 (c)(1),
(2) Date: Mar. 27, 2020

(87) PCT Pub. No.: WO2019/061471
PCT Pub. Date: Apr. 4, 2019

(65) Prior Publication Data
US 2020/0267551 A1    Aug. 20, 2020

(51) Int. Cl.
*G06F 21/45* (2013.01)
*H04W 12/06* (2021.01)
(Continued)

(52) U.S. Cl.
CPC .............. *G06F 21/45* (2013.01); *G06F 18/22* (2023.01); *G06V 30/142* (2022.01); *G06V 40/40* (2022.01);
(Continued)

(58) Field of Classification Search
CPC ... H04W 12/068; H04W 12/30; H04W 12/63; G06F 21/45; G06F 2221/2103;
(Continued)

(56) References Cited

U.S. PATENT DOCUMENTS 9,904,775 B2 * 2/2018 Salama ............ H04N 21/41407
10,708,056 B2 * 7/2020 Qiu ..................... H04W 12/069
(Continued)

FOREIGN PATENT DOCUMENTS

CN    102750465 A    10/2012
CN    103761502 A     4/2014
(Continued)

OTHER PUBLICATIONS

Anonymous., "WIFI PPPOE—Android Apps on Google Play", Retrieved from the Internet: URL:https://play.google.com/store/apps/developer?id=cnDDU&hl=en, XP055192429,, Sep. 11, 2012, 3 Pages.
(Continued)

*Primary Examiner* — Meng Li
*Assistant Examiner* — Lydia L Noel
(74) *Attorney, Agent, or Firm* — Slater Matsil, LLP

(57) ABSTRACT

This application discloses a password verification method and a password setting method. The password verification method includes: in response to a detected operation of requesting for password verification, collecting at least one first image by using a camera of a mobile terminal; obtaining matching information when a result of matching between the at least one first image collected by the mobile terminal and at least one first preset image satisfies a first preset matching condition, where the matching information includes at least one of the following: location information of the mobile terminal, motion information of the mobile terminal, at least one second image collected by the camera of the mobile
(Continued)

terminal, and network connection information of the mobile terminal; and performing matching between the obtained matching information and a second preset matching condition, where the password verification succeeds when the matching is successful.

17 Claims, 56 Drawing Sheets

(51) Int. Cl.
    *H04W 12/63*     (2021.01)
    *H04W 12/30*     (2021.01)
    *G06F 18/22*     (2023.01)
    *G06V 30/142*     (2022.01)
    *G06V 40/40*     (2022.01)

(52) U.S. Cl.
    CPC ......... *H04W 12/068* (2021.01); *H04W 12/30* (2021.01); *H04W 12/63* (2021.01)

(58) Field of Classification Search
    CPC .......... G06F 2221/2131; G06K 9/6201; G06K 9/00; G06V 2201/10; G06V 30/142; G06V 40/40
    See application file for complete search history.

(56) References Cited

U.S. PATENT DOCUMENTS

| | | | |
|---|---|---|---|
| 2012/0140993 A1* | 6/2012 | Bruso | G06V 40/40 382/118 |
| 2012/0233658 A1 | 9/2012 | Piersol | |
| 2013/0061305 A1* | 3/2013 | Bruso | G06F 21/34 726/19 |
| 2016/0026883 A1 | 1/2016 | Matos | |

FOREIGN PATENT DOCUMENTS

| | | | | |
|---|---|---|---|---|
| CN | 103795716 A | * | 5/2014 | |
| CN | 103853457 A | | 6/2014 | |
| CN | 103914235 A | | 7/2014 | |
| CN | 104169933 A | | 11/2014 | |
| CN | 104850773 A | | 8/2015 | |
| CN | 105357011 A | | 2/2016 | |
| CN | 105447359 A | * | 3/2016 | |
| CN | 105515777 A | | 4/2016 | |
| CN | 106909812 A | | 6/2017 | |
| CN | 107370758 A | * | 11/2017 | ........... H04L 63/083 |
| DE | 102009050602 A1 | * | 5/2011 | ............. G06F 21/34 |
| KR | 20140139451 A | * | 10/2014 | ............. G06V 40/28 |
| WO | WO-2017032010 A1 | * | 3/2017 | |
| WO | 2017143661 A1 | | 8/2017 | |

OTHER PUBLICATIONS

Zhang, F. et al., "Location-based Authentication and Authorization Using Smart Phones", IEEE 11th International Conference on Trust, Security and Privacy in Computing and Communications, Jun. 25-27, 2012, 8 Pages.

* cited by examiner

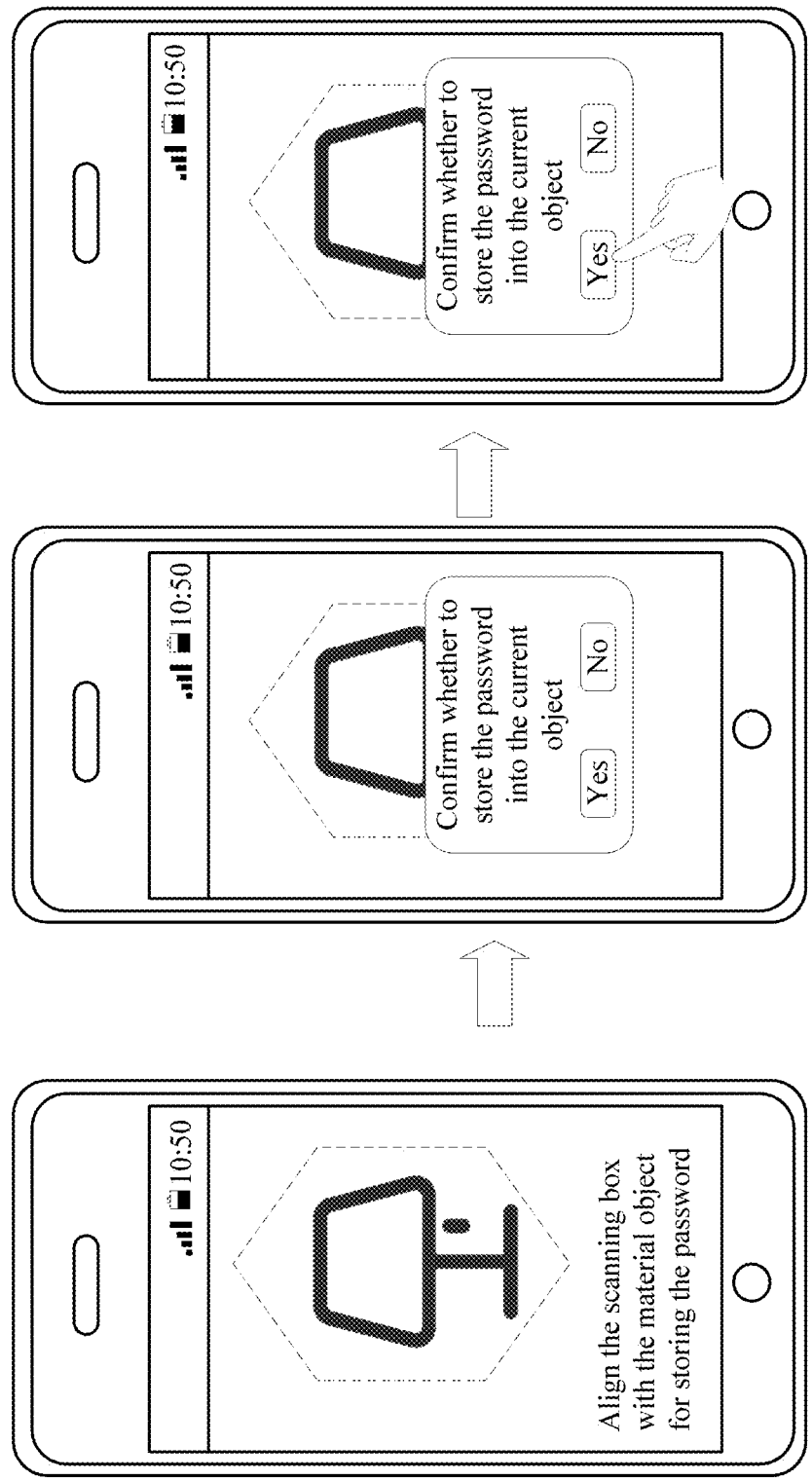

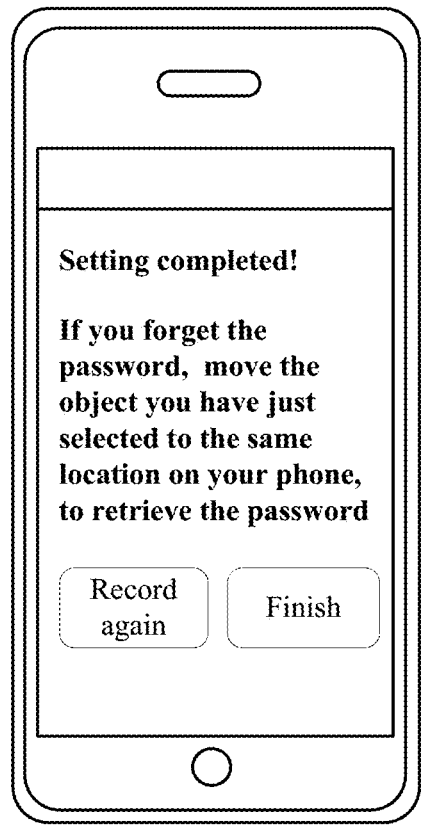

FIG. 10G

| | |
|---|---|
| A mobile terminal detects an action password setting request input by a user, and displays a camera preview interface in response to the request | ⟋ 1001 |

| | |
|---|---|
| The mobile terminal detects a start operation input by the user, and stores, in response to the operation, a first matching image displayed on the camera preview interface | ⟋ 1002 |

| | |
|---|---|
| The mobile terminal detects a stop operation input by the user, and stores, in response to the operation, a second matching image displayed on the camera preview interface | ⟋ 1003 |

FIG. 10H

PASSWORD VERIFICATION METHOD, PASSWORD SETTING METHOD, AND MOBILE TERMINAL

CROSS-REFERENCE TO RELATED APPLICATIONS

This application is a National Stage of International Application No. PCT/CN2017/104923, filed on Sep. 30, 2017, which is hereby incorporated by reference in its entirety.

TECHNICAL FIELD

This application relates to the terminal application field, and in particular, to a password verification method, a password setting method, and a mobile terminal.

BACKGROUND

In today's society, a password is more widely applied, and an electronic device provides a plurality of password verification methods. When a user forgets the password, the electronic device further provides another password verification manner, to help the user retrieve the password.

For example, to facilitate fast verification of a user identity, a mainstream mobile phone in a market generally has a fingerprint recognition function, and the user can perform identity authentication by using a fingerprint, to implement an operation such as screen unlocking, account login, or payment. However, considering a security factor, after the mobile phone is restarted, the user can unlock a screen only by manually entering a password during screen unlocking, but once the user gets used to fingerprint unlocking, the user may usually forget the screen unlocking password.

In some solutions, a password retrieval function may be set on the mobile phone. When setting the password, the user may also set a phone number or an email address used to retrieve the password. When the user forgets the password, the password retrieval function may be started. Then the mobile phone may send a short message to the preset mobile phone number or send an email to the preset email address, and the user manually enters a verification code included in the short message/email, to retrieve or reset the password. However, such a password retrieval method needs to rely on another terminal, leading to an inconvenient operation and affecting user experience.

When the user forgets the password, the only solution is to send the mobile phone to a repair station for read-only memory flashing. This is a complex operation, and is time-consuming and labor-consuming, causing very poor user experience.

SUMMARY

Embodiments of this application provide a password verification method, a password setting method, and a mobile terminal, to improve security and user experience.

According to a first aspect, this application provides a password verification method. The method includes: inputting, by a user on a mobile terminal, an operation of requesting for password verification; and collecting, by the mobile terminal in response to the detected operation, at least one first image by using a camera; then performing matching between the collected at least one first image and at least one first preset image, and if a matching result satisfies a first preset matching condition, obtaining, by the mobile terminal, matching information; and finally performing matching between the obtained matching information and a second preset matching condition, where the password verification succeeds if the matching is successful.

The matching information obtained by the mobile terminal includes at least one of the following: location information of a location at which the mobile terminal is located, motion information of the mobile terminal, at least one second image that is collected by the camera of the mobile terminal and that is different from the first image, and network connection information of the mobile terminal.

In this embodiment, the mobile terminal can verify the password by combining the image and the matching information, for example, a plurality of features such as motion information, location information, and network connection information, to increase verification complexity, so that the password cannot be easily cracked, thereby improving encryption performance. In addition, the image and the matching information can both be completed by the mobile terminal without requiring another device, thereby facilitating a user operation and improving user experience.

With reference to the first aspect of this application, in a first implementation of the first aspect of this application, the matching information includes the location information of the location at which the mobile terminal is located; and a process in which the mobile terminal performs matching between the matching information and the second preset matching condition includes: performing, by the mobile terminal, matching between preset location information and the location information of the location at which the mobile terminal is located.

The location information may be information indicating a geographical location at which the mobile terminal is located, namely, geographical location information; or may specifically be positioning information obtained by using a GPS, namely, GPS information; or may be positioning information obtained by using a base station, namely, base station positioning information; or may be positioning information obtained by using a Wi-Fi signal, namely, Wi-Fi positioning information.

In this embodiment, the mobile terminal may collect, based on a user operation, an image of an object by using the camera, obtain current location information, and perform password verification by using the image and the location information. During the password verification, the user does not need to manually enter any information, but merely needs to aim the camera at a real scene for collection to complete the verification, thereby facilitating a user operation and improving user experience.

With reference to the first aspect of this application, in a second implementation of the first aspect of this application, the mobile terminal further obtains a virtual image in response to the detected operation, and performs matching between the first preset image and the image obtained by combining the virtual image and the at least one first image.

With reference to the second implementation of the first aspect of this application, in a third implementation of the first aspect of this application, the matching information obtained by the mobile terminal includes the at least one second image collected by the camera of the mobile terminal; and then a process in which the mobile terminal performs matching between the matching information and the second preset matching condition may include: performing matching between a second preset image and an image obtained by combining the second image and the virtual image.

In this embodiment of this application, the user merely needs to aim the camera at a material object selected during password setting, and then uses the mobile terminal to move a virtual image of the material object to a location specified during the password setting, so as to retrieve a password, thereby facilitating a user operation and improving user experience.

With reference to the second or third implementation of the first aspect of this application, in a fourth implementation of the first aspect of this application, the mobile terminal may obtain the virtual image from a stored image, or obtain the virtual image from the collected at least one first image.

This embodiment provides a plurality of manners of obtaining the virtual image, thereby improving flexibility of the solution.

With reference to any one of the first aspect of this application or the first to the fourth implementations of the first aspect, in a fifth implementation of the first aspect of this application, the matching information obtained by the mobile terminal includes the motion information of the mobile terminal, where the motion information may include at least one of the following: a gesture of the mobile terminal, an acceleration of the mobile terminal, and an angular velocity of the mobile terminal.

The gesture of the mobile terminal means a gesture change generated by the mobile terminal, the acceleration of the mobile terminal means an acceleration of the mobile terminal in a motion process, and the angular velocity of the mobile terminal means an angular velocity of the mobile terminal in a rotation process.

With reference to the fifth implementation of the first aspect of this application, in a sixth implementation of the first aspect of this application, a process in which the mobile terminal performs matching between the obtained matching information and the second preset matching condition includes: obtaining, by the mobile terminal based on the motion information, action information of the user corresponding to the mobile terminal, where the action information is information about an operation performed by the user on the mobile terminal.

In this embodiment, verification can be performed in combination with an action of the user, and the user can complete the verification without requiring another device or without a need to enter any information. In this way, an operation is convenient and fast, thereby improving user experience.

With reference to the fifth implementation of the first aspect of this application, in a seventh implementation of the first aspect of this application, a process in which the mobile terminal performs matching between the matching information and the second preset matching condition includes: obtaining, by the mobile terminal based on the motion information, behavior information of the user corresponding to the mobile terminal, and performs matching between the behavior information of the user and preset behavior information, where the behavior information includes at least one of the following: a quantity of steps of motion of the user, a location corresponding to each motion step of the user, and motion duration corresponding to each motion step of the user.

It should be understood that, the motion step count and the motion duration may be obtained from the motion information described in the third implementation of the first aspect, and a location in a motion process may be obtained in a manner described in the first implementation of the first aspect.

In this embodiment, verification can be performed in combination with a motion habit of the user, so that the password cannot be easily cracked, thereby improving security.

With reference to any one of the first aspect of this application or the first to the seventh implementations of the first aspect, in an eighth implementation of the first aspect of this application, the network connection information of the mobile terminal includes: a Wi-Fi account stored in the memory and a password corresponding to the Wi-Fi account; and then a process in which the mobile terminal performs matching between the matching information and the second preset matching condition includes: performing network connection for the mobile terminal by using the stored Wi-Fi account and the password corresponding to the Wi-Fi account.

In this embodiment, verification can be performed in combination with a Wi-Fi signal. When the user performs the verification, the verification can be completed only when Wi-Fi signals are connected at these locations. After the mobile terminal is lost, an unauthorized user cannot search for and connect to these Wi-Fi signals, thereby ensuring user information security.

With reference to any one of the first aspect of this application or the first to the seventh implementations of the first aspect, in a ninth implementation of the first aspect of this application, when the password verification succeeds, the mobile terminal releases password lock.

With reference to any one of the first aspect of this application or the first to the seventh implementations of the first aspect, in a tenth implementation of the first aspect of this application, when the password verification succeeds, the mobile terminal prompts for password information, that is, sends password-related prompt information.

With reference to any one of the first aspect of this application or the first to the seventh implementations of the first aspect, in an eleventh implementation of the first aspect of this application, when the password verification succeeds, the mobile terminal prompts for password resetting information.

With reference to any one of the first aspect of this application or the first to the seventh implementations of the first aspect, in a twelfth implementation of the first aspect of this application, the password is a screen unlocking password of the mobile terminal; and when the password verification succeeds, the mobile terminal may prompt for information about the screen unlocking password, or unlock a screen, or prompt for information about resetting the screen unlocking password.

In this embodiment, the screen unlocking password can be retrieved or reset, so that when the user forgets the screen unlocking password, the screen can be unlocked without read-only memory flashing, thereby improving user experience.

According to a second aspect, this application provides a password setting method. The method includes: inputting, by a user on a mobile terminal, an operation of requesting for password setting; and obtaining, by the mobile terminal in response to the detected operation, at least one first verification image and verification information that are determined based on the operation, setting a first matching condition based on the first verification image, recording the first matching condition, setting a second matching condition based on the verification information, and recording the second matching condition.

The verification information determined based on the operation includes at least one of the following: location information of the mobile terminal, motion information of the mobile terminal, at least one second verification image, and network connection information of the mobile terminal.

The first matching condition and the second matching condition are used by the mobile terminal to identify whether password verification is successful.

In this embodiment of this application, the mobile terminal may set a matching condition for password verification by combining the verification image and the verification information, for example, the motion information, the location information, the action information, and the network connection information, thereby improving security of the verification.

With reference to the second aspect of this application, in a first implementation of the second aspect of this application, the verification information includes location information of a location at which the mobile terminal is located. The location information may be information indicating a geographical location at which the mobile terminal is located, namely, geographical location information; or may specifically be positioning information obtained by using a GPS, namely, GPS information; or may be positioning information obtained by using a base station, namely, base station positioning information; or may be positioning information obtained by using a Wi-Fi signal, namely, Wi-Fi positioning information.

In this embodiment of this application, the mobile terminal may automatically obtain a current geographical location to complete the password setting, not requiring any information input by the user, convenient and fast. This improves user experience.

With reference to the second aspect of this application or the first implementation of the second aspect of this application, in a second implementation of the second aspect of this application, the verification information includes the motion information of the mobile terminal, where the motion information may include at least one of the following: a gesture of the mobile terminal, an acceleration of the mobile terminal, and an angular velocity of the mobile terminal.

The gesture of the mobile terminal means a gesture change generated by the mobile terminal, the acceleration of the mobile terminal means an acceleration of the mobile terminal in a motion process, and the angular velocity of the mobile terminal means an angular velocity of the mobile terminal in a rotation process.

With reference to the second implementation of the second aspect of this application, in a third implementation of the second aspect of this application, a process in which the mobile terminal sets the second matching condition based on the verification information and records the second matching condition includes: obtaining action information based on the motion information, where the action information includes information about an operational action performed by the user on the mobile terminal.

In this embodiment, the mobile terminal may obtain the operational action performed by the user on the mobile terminal, and complete the password setting in combination with the action information, and the user does not need to enter any information on a screen. In this way, an operation is convenient and fast, thereby improving user experience.

With reference to the second implementation of the second aspect of this application, in a fourth implementation of the second aspect of this application, a process in which the mobile terminal sets the second matching condition based on the verification information and records the second matching condition includes: obtaining, based on the motion information, behavior information of the user corresponding to the mobile terminal, where the behavior information includes at least one of the following: a quantity of steps of motion of the user, a location corresponding to each motion step of the user, and motion duration corresponding to each motion step of the user.

In this embodiment, the mobile terminal may complete the password setting by using information about behavior of the user in a walking process, and the user merely needs to walk while holding the mobile terminal and does not need to enter any information on a screen. In this way, an operation is convenient and fast, thereby improving user experience.

With reference to any one of the second aspect of this application or the first to the fourth implementations of the second aspect, in a fifth implementation of the second aspect of this application, the network connection information of the mobile terminal includes: at least one Wi-Fi account and a password corresponding to each account.

In this embodiment, the mobile terminal may automatically complete the password setting by using a currently connected Wi-Fi signal or a Wi-Fi signal selected by the user, not requiring any information input by the user, convenient and fast. This improves user experience.

With reference to any one of the second aspect of this application or the first to the fifth implementations of the second aspect, in a sixth implementation of the second aspect of this application, the set password is a screen unlocking password of the mobile terminal.

According to a third aspect, this application provides a password verification method. The method includes: detecting, by a mobile terminal, a password retrieval request input by a user, collecting image information of a first object in a camera preview interface in response to the request, extracting an image characteristic value of the first object from the image information, and obtaining current location information of the mobile terminal; then determining a target image characteristic value and target location information that correspond to the password retrieval request, performing matching between the image characteristic value and the target image characteristic value, and performing matching between the location information and the target location information; and if the image characteristic value successfully matches the target image characteristic value, and the location information successfully matches the target location information, displaying a password corresponding to the password retrieval request.

In this embodiment, the mobile terminal may collect, based on a user operation, an image of an object by using a camera, obtain the current location information, and perform password verification by using the image and the location information. During the password verification, the user does not need to manually enter any information, but merely needs to aim the camera at a real scene for collection to complete the verification, thereby facilitating a user operation and improving user experience.

In a possible implementation, the camera preview interface includes a confirmation button; and the collecting, by a mobile terminal, image information of a first object in a camera preview interface includes: detecting an operation of tapping the confirmation button by the user; and collecting, in response to the operation, image information of a first object currently displayed in the camera preview interface.

In a possible implementation, the location information includes longitude information and latitude information and/or address information.

In a possible implementation, the mobile terminal may perform matching between the image characteristic value and the target image characteristic value in the following manner: determining whether the image characteristic value is consistent with the target image characteristic value; and if yes, determining that the image characteristic value successfully matches the target image characteristic value; and the mobile terminal may perform matching between the location information and the target location information in the following manner: determining whether a location corresponding to the location information is consistent with a location corresponding to the target location information; and if yes, determining that the location information successfully matches the target location information.

In a possible implementation, the mobile terminal may perform the following process before detecting the password retrieval request input by the user: detecting an operation input by the user, and displaying a password entry interface in response to the operation; storing a password entered by the user on the password entry interface, and displaying a prompt interface; detecting a material object password setting request input by the user on the prompt interface, and starting the camera in response to the material object password setting request; detecting a confirmation operation input by the user, collecting, in response to the confirmation operation, image information of a second object by using the camera, extracting a target image information characteristic value of the second object from the image information, and determining current target location information of the mobile terminal; and storing the target image information characteristic value and the target location information into the mobile terminal correspondingly.

According to a fourth aspect, this application provides a password verification method. The method includes: detecting, by a mobile terminal, a password retrieval request input by a user, and displaying a stored start-point picture in response to the password retrieval request, where the start-point picture is used to instruct to start walking from a specified location; detecting, by the mobile terminal, a start operation input by the user at the specified location, and starting, in response to the start operation, to record motion information of the user from a first moment, where the motion information includes step count information and/or location information; detecting, by the mobile terminal, a stop operation input by the user, and stopping, at a second moment in response to the stop operation, recording the motion information of the user; reading, by the mobile terminal, target motion information corresponding to the password retrieval request, and performing matching between the target motion information and motion information recorded from the first moment to the second moment, where the target motion information includes step count information and/or location information; and if the matching is successful, displaying, by the mobile terminal, a password corresponding to the password retrieval request.

In this embodiment, verification may be performed based on a motion habit of the user, and the user can complete the verification without a need to manually enter any information. In this way, an operation is convenient and fast, thereby improving user experience.

In this embodiment, verification may be performed based on an action of the user, and the user can complete the verification without requiring another device or without a need to enter any information. In this way, an operation is convenient and fast, thereby improving user experience.

In a possible implementation, the motion information recorded by the mobile terminal from the first moment to the second moment includes: an accumulated quantity of steps that the user has walked, and location information corresponding to each step.

In a possible implementation, the starting, by the mobile terminal, to record motion information of the user from a first moment includes: starting to record, from the first moment, step count information collected by a pedometer, and/or starting to record GPS-collected location information from the first moment.

In a possible implementation, before the mobile terminal detects the password retrieval request input by the user, the method includes: detecting an operation input by the user, and displaying a password entry interface in response to the operation; storing a password entered by the user on the password entry interface, and displaying a prompt interface; detecting a track password setting request input by the user on the prompt interface, and starting a camera in response to the track password setting request; detecting a start operation input by the user, shooting, in response to the start operation, a start-point picture by using the camera, and starting to record motion information of the user from a third moment; and detecting a stop operation input by the user, stopping, at a fourth moment in response to the stop operation, recording the motion information of the user, and storing, into the mobile terminal, target motion information recorded from the third moment to the fourth moment.

According to a fifth aspect, this application provides a password verification method, including: displaying, by a mobile terminal, an image of a target object in response to a detected password retrieval request; when the mobile terminal has collected image information of the target object by using a camera, displaying, by the mobile terminal, a virtual image of the target object on a camera preview interface; detecting, by the mobile terminal, actions input by a user, displaying, by the mobile terminal in response to these actions, locations of the virtual image of the target object on the camera preview interface in real time, and recording action information corresponding to each action, where the action information includes speed information and/or acceleration information of the mobile terminal; detecting, by the mobile terminal, a stop operation input by the user, and reading, by the mobile terminal in response to the stop operation, target action information corresponding to the password retrieval request, and performing matching between the action information and the target action information, where the target action information includes speed information and/or acceleration information of the mobile terminal; and if the matching is successful, displaying, by the mobile terminal, a password corresponding to the password retrieval request.

In this embodiment, verification may be performed based on an action of the user, and the user can complete the verification without a need to manually enter any information. In this way, an operation is convenient and fast, thereby improving user experience.

In a possible implementation, the detecting, by the mobile terminal, actions input by a user includes: determining action information of the mobile terminal by using a gravity sensor and/or determining action information of the mobile terminal by using an acceleration sensor.

In a possible implementation, the mobile terminal may perform the following process before detecting the password retrieval request input by the user: detecting an operation input by the user, and displaying a password entry interface in response to the operation; storing a password entered by the user on a first interface, and displaying a prompt interface; detecting an action password setting request input by the user on the prompt interface, and displaying a camera preview interface in response to the action password setting request; detecting a start operation input by the user on the camera preview interface, storing an image of a target object on the camera preview interface in response to a start operation, and displaying a virtual image of the target object on the camera preview interface; detecting actions input by the user, displaying locations of the virtual image of the target object on the camera preview interface in real time in response to these actions, and recording target action information corresponding to each action; and detecting a stop operation input by the user, and storing the recorded target action information into the mobile terminal in response to the stop operation, where the target action information includes speed information and/or acceleration information of the mobile terminal.

According to a sixth aspect, this application provides a mobile terminal. The mobile terminal includes a touchscreen, one or more processors, a camera, a memory, a plurality of application programs, and one or more computer programs. The touchscreen includes a touch-sensitive surface and a display. The one or more computer programs are stored in the memory. The one or more computer programs include an instruction. When the instruction is executed by the mobile terminal, the mobile terminal is enabled to perform the following steps:

in response to a detected operation of requesting for password verification, collecting at least one first image by using the camera; then performing matching between the collected at least one first image and at least one first preset image, and if a matching result satisfies a first preset matching condition, obtaining, by the mobile terminal, matching information; and finally performing matching between the obtained matching information and a second preset matching condition, where the password verification succeeds if the matching is successful.

In this embodiment, the mobile terminal can verify the password by combining the image and the matching information, for example, a plurality of features such as motion information, location information, and network connection information, to increase verification complexity, so that the password cannot be easily cracked, thereby improving encryption performance. In addition, the image and the matching information can both be completed by the mobile terminal without requiring another device, thereby facilitating a user operation and improving user experience.

With reference to the sixth aspect of this application, in a first implementation of the sixth aspect of this application, the matching information includes location information of a location at which the mobile terminal is located; and in a process in which the mobile terminal performs matching between the matching information and the second preset condition, the processor executes the instruction, so that the mobile terminal specifically performs the following step: performing matching between the location information of the location at which the mobile terminal is located and preset location information.

The location information may be information indicating a geographical location at which the mobile terminal is located, namely, geographical location information; or may specifically be positioning information obtained by using a GPS, namely, GPS information; or may be positioning information obtained by using a base station, namely, base station positioning information; or may be positioning information obtained by using a Wi-Fi signal, namely, Wi-Fi positioning information.

In this embodiment, the mobile terminal may collect, based on a user operation, an image of an object by using the camera, obtain current location information, and perform password verification by using the image and the location information. During the password verification, a user does not need to manually enter any information, but merely needs to aim the camera at a real scene for collection to complete the verification, thereby facilitating a user operation and improving user experience.

With reference to the sixth aspect of this application, in a second implementation of the sixth aspect of this application, the processor executes the instruction, so that the mobile terminal further performs the following steps: obtaining a virtual image; and performing matching between the first preset image and an image obtained by combining the virtual image and the at least one first image.

With reference to the second implementation of the sixth aspect of this application, in a third implementation of the sixth aspect of this application, the matching information includes at least one second image collected by the camera; and in a process in which the mobile terminal performs matching between the matching information and the second preset matching condition, the processor executes the instruction, so that the mobile terminal specifically performs the following step: performing matching between a second preset image and an image obtained by combining the second image and the virtual image.

In this embodiment of this application, the user merely needs to aim the camera at a material object selected during password setting, and then uses the mobile terminal to move a virtual image of the material object to a location specified during the password setting, so as to retrieve a password, thereby facilitating a user operation and improving user experience.

With reference to the second or third implementation of the sixth aspect of this application, in a fourth implementation of the sixth aspect of this application, in a process in which the mobile terminal obtains the virtual image, the processor executes the instruction, so that the mobile terminal specifically performs the following step: obtaining the virtual image from a stored image, or obtaining the virtual image from the collected at least one first image.

With reference to any one of the sixth aspect of this application or the first to the fourth implementations of the sixth aspect, in a fifth implementation of the first aspect of this application, the matching information obtained by the mobile terminal includes the motion information of the mobile terminal, where the motion information may include at least one of the following: a gesture of the mobile terminal, an acceleration of the mobile terminal, and an angular velocity of the mobile terminal.

The gesture of the mobile terminal means a gesture change generated by the mobile terminal, the acceleration of the mobile terminal means an acceleration of the mobile terminal in a motion process, and the angular velocity of the mobile terminal means an angular velocity of the mobile terminal in a rotation process.

With reference to the fifth implementation of the sixth aspect of this application, in a sixth implementation of the sixth aspect of this application, in a process in which the mobile terminal performs matching between the obtained matching information and the second matching condition, the processor executes the instruction, so that the mobile terminal specifically performs the following step: obtaining action information of a corresponding user based on the motion information, where the action information is information about an operation performed by the user on the mobile terminal.

In this embodiment, verification can be performed in combination with an action of the user, and the user can complete the verification without requiring another device or without a need to enter any information. In this way, an operation is convenient and fast, thereby improving user experience.

With reference to the fifth implementation of the sixth aspect of this application, in a seventh implementation of the sixth aspect of this application, in a process in which the mobile terminal performs matching between the matching information and the second preset matching condition, the processor executes the instruction, so that the mobile terminal specifically performs the following step: obtaining behavior information of a corresponding user based on the motion information, and performs matching between the behavior information of the user and preset information, where the behavior information includes at least one of the following: a quantity of steps of motion of the user, a location corresponding to each motion step of the user, and motion duration corresponding to each motion step of the user.

In this embodiment, verification can be performed in combination with a motion habit of the user, so that the password cannot be easily cracked, thereby improving security.

With reference to any one of the sixth aspect of this application or the first to the seventh implementations of the sixth aspect, in an eighth implementation of the sixth aspect of this application, network connection information of the mobile terminal includes: a Wi-Fi account stored in the mobile terminal and a password corresponding to the Wi-Fi account; and then in a process in which the mobile terminal performs matching between the matching information and the second preset matching condition, the processor executes the instruction, so that the mobile terminal specifically performs the following step: performing network connection by using the stored Wi-Fi account and the password corresponding to the Wi-Fi account.

In this embodiment, verification can be performed in combination with a Wi-Fi signal. When the user performs the verification, the verification can be completed only when Wi-Fi signals are connected at these locations. After the mobile terminal is lost, an unauthorized user cannot search for and connect to these Wi-Fi signals, thereby ensuring user information security.

With reference to any one of the sixth aspect of this application or the first to the seventh implementations of the sixth aspect, in a ninth implementation of the sixth aspect of this application, when the password verification succeeds, the processor executes the instruction, so that the mobile terminal further performs the following steps: releasing, by the mobile terminal, password lock, and prompting for password information or prompting for password resetting information.

With reference to any one of the sixth aspect of this application or the first to the seventh implementations of the sixth aspect, in a tenth implementation of the first aspect of this application, the password is a screen unlocking password of the mobile terminal; and when the password verification succeeds, the processor executes the instruction, so that the mobile terminal further performs the following step: prompting the user with information about the screen unlocking password, or unlocking a screen, or providing information about resetting the screen unlocking password.

In this embodiment, the screen unlocking password can be retrieved or reset, so that when the user forgets the screen unlocking password, the screen can be unlocked without read-only memory flashing, thereby improving user experience.

According to a seventh aspect, this application provides a mobile terminal. The mobile terminal includes a touchscreen, one or more processors, a camera, a memory, a plurality of application programs, and one or more computer programs. The touchscreen includes a touch-sensitive surface and a display. The one or more computer programs are stored in the memory. The one or more computer programs include an instruction. When the instruction is executed by the mobile terminal, the mobile terminal is enabled to perform the following steps:

in response to a detected operation of requesting for password verification, obtaining at least one first verification image and verification information that are determined based on the operation; and then setting a first matching condition based on the first verification image, recording the first matching condition, setting a second matching condition based on the verification information, and recording the second matching condition.

The verification information determined based on the operation includes at least one of the following: location information of the mobile terminal, motion information of the mobile terminal, at least one second verification image, and network connection information of the mobile terminal.

The first matching condition and the second matching condition are used by the mobile terminal to identify whether password verification is successful.

In this embodiment of this application, the mobile terminal may set a matching condition for password verification by combining the verification image and the verification information, for example, the motion information, the location information, the action information, and the network connection information, thereby improving security of the verification.

With reference to the seventh aspect of this application, in a first implementation of the seventh aspect of this application, the verification information includes location information of a location at which the mobile terminal is located. The location information may be information indicating a geographical location at which the mobile terminal is located, namely, geographical location information; or may specifically be positioning information obtained by using a GPS, namely, GPS information; or may be positioning information obtained by using a base station, namely, base station positioning information; or may be positioning information obtained by using a Wi-Fi signal, namely, Wi-Fi positioning information.

In this embodiment of this application, the mobile terminal may automatically obtain a current geographical location to complete the password setting, and a user does not need to enter any information. In this way, an operation is convenient and fast, thereby improving user experience.

With reference to the seventh aspect of this application or the first implementation of the seventh aspect of this application, in a second implementation of the seventh aspect of this application, the verification information includes the motion information of the mobile terminal, where the motion information may include at least one of the following: a gesture of the mobile terminal, an acceleration of the mobile terminal, and an angular velocity of the mobile terminal.

The gesture of the mobile terminal means a gesture change generated by the mobile terminal, the acceleration of the mobile terminal means an acceleration of the mobile terminal in a motion process, and the angular velocity of the mobile terminal means an angular velocity of the mobile terminal in a rotation process.

With reference to the second implementation of the seventh aspect of this application, in a third implementation of the seventh aspect of this application, in a process in which the mobile terminal sets the second matching condition based on the verification information and records the second matching condition, the processor executes the instruction, so that the mobile terminal specifically performs the following step: obtaining action information based on the motion information, where the action information includes information about an operational action performed by a user on the mobile terminal.

In this embodiment, the mobile terminal may obtain the operational action performed by the user on the mobile terminal, and complete the password setting in combination with the action information, and the user does not need to enter any information on a screen. In this way, an operation is convenient and fast, thereby improving user experience.

With reference to the second implementation of the seventh aspect of this application, in a fourth implementation of the seventh aspect of this application, in a process in which the mobile terminal sets the second matching condition based on the verification information and records the second matching condition, the processor executes the instruction, so that the mobile terminal specifically performs the following step: obtaining, based on the motion information, behavior information of a user corresponding to the mobile terminal, where the behavior information includes at least one of the following: a quantity of steps of motion of the user, a location corresponding to each motion step of the user, and motion duration corresponding to each motion step of the user.

In this embodiment, the mobile terminal may complete the password setting by using information about behavior of the user in a walking process, and the user merely needs to walk while holding the mobile terminal and does not need to enter any information on a screen. In this way, an operation is convenient and fast, thereby improving user experience.

With reference to any one of the seventh aspect of this application or the first to the fourth implementations of the seventh aspect, in a fifth implementation of the seventh aspect of this application, the network connection information of the mobile terminal includes: at least one Wi-Fi account and a password corresponding to each account.

In this embodiment, the mobile terminal may automatically complete the password setting by using a currently connected Wi-Fi signal or a Wi-Fi signal selected by the user, not requiring any information input by the user, convenient and fast. This improves user experience.

With reference to any one of the seventh aspect of this application or the first to the fifth implementations of the seventh aspect, in a sixth implementation of the seventh aspect of this application, the set password is a screen unlocking password of the mobile terminal.

According to an eighth aspect, this application provides a graphical user interface (Graphical User Interface, GUI). The graphical user interface is stored in a mobile terminal. The mobile terminal includes a camera, a touchscreen, a memory, and one or more processors. The one or more processors are configured to execute one or more computer programs stored in the memory. The graphical user interface includes: a first interface, a first camera preview interface, and a second interface.

The first interface is configured to detect an operation of requesting for password verification, as shown in FIG. 7A and FIG. 9B.

The first camera preview interface is displayed in response to the operation of requesting for password verification that is detected on the first interface, and is configured to display at least one first image collected by the camera, as shown in FIG. 7C and FIG. 9C. When a result of matching between at least one first preset image and the at least one first image collected by the camera satisfies a first preset matching condition, the mobile terminal obtains matching information and performs matching between the obtained matching information and a second preset matching condition. The second interface is displayed when the matching information successfully matches the second preset matching condition, and is configured to indicate that password verification is successful.

With reference to the eighth aspect of this application, in a first implementation of the eighth aspect of this application, the first camera preview interface is specifically configured to display an image obtained by combining the at least one first image collected by the camera and a virtual image, as shown in FIG. 11D.

With reference to the eighth aspect of this application, in a second implementation of the eighth aspect of this application, the matching information includes: at least one second image collected by the camera of the mobile terminal; and the graphical user interface further includes: a second camera preview interface, where the second camera preview interface is displayed when the image obtained by combining the first image and the virtual image successfully matches the first preset image, and is configured to display an image obtained by combining the virtual image and the at least one second image collected by the camera, as shown in FIG. 11F.

With reference to the eighth aspect of this application, in a third implementation of the eighth aspect of this application, the matching information includes motion information of the mobile terminal, the motion information is used to obtain action information of a user corresponding to the mobile terminal, and the motion information includes at least one of the following: a gesture of the mobile terminal, an acceleration of the mobile terminal, and an angular velocity of the mobile terminal; and the action information includes information about an operational action performed by the user on the mobile terminal; and the graphical user interface further includes: a third camera preview interface, where the third camera preview interface is displayed when the result of matching between the at least one first image collected by the camera and the at least one first preset image satisfies the first preset matching condition, and is configured to display a virtual image that successfully matches the action information.

With reference to the eighth aspect of this application, in a fourth implementation of the eighth aspect of this application, the matching information includes motion information of the mobile terminal, where the motion information is used to obtain behavior information of a user corresponding to the mobile terminal, and the behavior information includes at least one of the following: a motion step count of the user, a motion step length of the user, a location corresponding to each motion step of the user, and motion duration corresponding to each motion step of the user; and the graphical user interface further includes: a track interface, where the track interface is displayed when the result of matching between the at least one first image collected by the camera and the at least one first preset image satisfies the first preset matching condition, and is configured to display the behavior information of the user.

With reference to the eighth aspect of this application, in a fifth implementation of the eighth aspect of this application, the second interface is an interface after password lock is released, or a password information prompt interface (as shown in FIG. 11I), or a password resetting information prompt interface.

With reference to any one of the eighth aspect of this application or the first to the fourth implementations of the eighth aspect, in a sixth implementation of the eighth aspect of this application, the first interface contains a control for retrieving a screen unlocking password; and the second interface is an interface different from a locked-screen interface, or an interface for prompting for the screen unlocking password, or an interface for setting the screen unlocking password.

According to a ninth aspect, this application provides a graphical user interface. The graphical user interface is stored in a mobile terminal. The mobile terminal includes a camera, a touchscreen, a memory, and one or more processors. The one or more processors are configured to execute one or more computer programs stored in the memory. The graphical user interface includes: a third interface and a third camera preview interface.

The third interface is configured to detect an operation of requesting for password setting, as shown in FIG. 6G, FIG. 8A, and FIG. 10A. The third camera preview interface is displayed in response to the detected operation of requesting for password setting, and is configured to display at least one first verification image selected based on the operation of requesting for password setting, as shown in FIG. 6H, FIG. 8B, and FIG. 10B. The mobile terminal obtains verification information selected based on the operation of requesting for password setting, where the verification information includes at least one of the following: location information; motion information; at least one second verification image, where the second verification image is different from the first verification image; and network connection information. The mobile terminal generates a first matching condition based on the at least one first verification image, records the first matching condition, generates a second matching condition based on the verification information, and records the second matching condition.

According to a tenth aspect, this application provides a mobile terminal. The mobile terminal includes: a collection module, an obtaining module, and a matching module. The collection module is configured to collect at least one first image in response to a detected operation of requesting for password verification. The obtaining module obtains matching information when a result of matching between the at least one first image collected by the collection module and at least one first preset image satisfies a first preset matching condition. The matching module performs matching between a second preset matching condition and the matching information obtained by the matching module. Password verification is successful when the matching is successful.

The matching information includes at least one of the following: location information of the mobile terminal, motion information of the mobile terminal, at least one second image collected by a camera of the mobile terminal, and network connection information of the mobile terminal, where the second image is different from the first image.

In this embodiment, the mobile terminal can verify the password by combining the image and the matching information, for example, a plurality of features such as motion information, location information, and network connection information, to increase verification complexity, so that the password cannot be easily cracked, thereby improving encryption performance. In addition, the image and the matching information can both be completed by the mobile terminal without requiring another device, thereby facilitating a user operation and improving user experience.

With reference to the tenth aspect of this application, in a first implementation of the tenth aspect of this application, the matching information comprises the location information of the mobile terminal; and the matching module performs matching between preset location information and the location information of the mobile terminal, where the location information includes at least one of the following: global positioning system GPS information, base station positioning information, Wi-Fi positioning information, and geographical location information.

With reference to the tenth aspect of this application, in a second implementation of the tenth aspect of this application, the obtaining module obtains a virtual image, and the matching module performs matching between the first preset image and an image obtained by combining the at least one first image and the virtual image obtained by the obtaining module.

With reference to the second implementation of the tenth aspect of this application, in a third implementation of the tenth aspect of this application, the matching information includes: the at least one second image collected by the camera; and the matching module performs matching between a second preset image and an image obtained by combining the second image and the virtual image.

With reference to the second or third implementation of the tenth aspect of this application, in a fourth implementation of the tenth aspect of this application, the obtaining module obtains the virtual image from a stored image, or the obtaining module obtains the virtual image from the collected at least one first image.

With reference to any one of the tenth aspect of this application or the first to the fourth implementations of the tenth aspect, in a fifth implementation of the tenth aspect of this application, the matching information includes the motion information of the mobile terminal, where the motion information may include at least one of the following: a gesture of the mobile terminal, an acceleration of the mobile terminal, and an angular velocity of the mobile terminal.

The gesture of the mobile terminal means a gesture change generated by the mobile terminal, the acceleration of the mobile terminal means an acceleration of the mobile terminal in a motion process, and the angular velocity of the mobile terminal means an angular velocity of the mobile terminal in a rotation process.

With reference to the fifth implementation of the tenth aspect of this application, in a sixth implementation of the tenth aspect of this application, a process of matching between the matching information and the second matching condition includes: obtaining, by the obtaining module based on the motion information, action information of a user corresponding to the mobile terminal, where the action information is information about an operation performed by the user on the mobile terminal.

With reference to the fifth implementation of the tenth aspect of this application, in a seventh implementation of the tenth aspect of this application, the obtaining module obtains, based on the motion information, behavior information of a user corresponding to the mobile terminal, and the matching module performs matching between preset information and the behavior information of the user, where the behavior information includes at least one of the following: a quantity of steps of motion of the user, a location corresponding to each motion step of the user, and motion duration corresponding to each motion step of the user.

With reference to any one of the tenth aspect of this application or the first to the seventh implementations of the tenth aspect, in an eighth implementation of the tenth aspect of this application, the network connection information of the mobile terminal includes: a Wi-Fi account stored in the mobile terminal and a password corresponding to the Wi-Fi account; and the matching module performs network connection for the mobile terminal by using the stored Wi-Fi account and the password corresponding to the Wi-Fi account.

With reference to any one of the tenth aspect of this application or the first to the seventh implementations of the tenth aspect, in a ninth implementation of the tenth aspect of this application, the mobile terminal further includes: an unlocking module. When the password verification succeeds, the unlocking module releases password lock.

With reference to any one of the tenth aspect of this application or the first to the seventh implementations of the tenth aspect, in a tenth implementation of the tenth aspect of this application, a mobile terminal further includes: a prompting module. When the password verification succeeds, the prompting module prompts for password information, that is, sends password-related prompt information.

With reference to any one of the tenth aspect of this application or the first to the first implementations of the seventh aspect, in an eleventh implementation of the first aspect of this application, a mobile module further includes: a resetting module, configured to prompt for password resetting information when the password verification succeeds.

With reference to any one of the tenth aspect of this application or the first to the first implementations of the seventh aspect, in a twelfth implementation of the tenth aspect of this application, the mobile terminal further includes: an unlocking module, a prompting module, or a resetting module. The password is a screen unlocking password of the mobile terminal. When the password verification succeeds, the prompting module prompts the user with information about the screen unlocking password, or the unlocking module unlocks a screen, or the resetting module prompts the user with information about resetting the screen unlocking password.

According to an eleventh aspect, this application provides a mobile terminal. The mobile terminal includes an obtaining module and a setting module.

In response to a detected operation of requesting for password setting, the obtaining module obtains at least one first verification image and verification information that are determined based on the operation. The setting module sets a first matching condition based on the first verification image, records the first matching condition, sets a second matching condition based on the verification information, and records the second matching condition.

The verification information determined based on the operation includes at least one of the following: location information of the mobile terminal, motion information of the mobile terminal, at least one second verification image, and network connection information of the mobile terminal.

The first matching condition and the second matching condition are used by the mobile terminal to identify whether password verification is successful.

With reference to the eleventh aspect of this application, in a first implementation of the eleventh aspect of this application, the verification information includes location information of a location at which the mobile terminal is located. The location information may be information indicating a geographical location at which the mobile terminal is located, namely, geographical location information; or may specifically be positioning information obtained by using a GPS, namely, GPS information; or may be positioning information obtained by using a base station, namely, base station positioning information; or may be positioning information obtained by using a Wi-Fi signal, namely, Wi-Fi positioning information.

With reference to the eleventh aspect of this application or the first implementation of the eleventh aspect of this application, in a second implementation of the eleventh aspect of this application, the verification information includes the motion information of the mobile terminal, where the motion information may include at least one of the following: a gesture of the mobile terminal, an acceleration of the mobile terminal, and an angular velocity of the mobile terminal.

The gesture of the mobile terminal means a gesture change generated by the mobile terminal, the acceleration of the mobile terminal means an acceleration of the mobile terminal in a motion process, and the angular velocity of the mobile terminal means an angular velocity of the mobile terminal in a rotation process.

With reference to the second implementation of the eleventh aspect of this application, in a third implementation of the eleventh aspect of this application, a process in which the mobile terminal sets the second matching condition based on the verification information and records the second matching condition includes: obtaining action information based on the motion information, where the action information includes information about an operational action performed by a user on the mobile terminal.

With reference to the second implementation of the eleventh aspect of this application, in a fourth implementation of the eleventh aspect of this application, a process in which the mobile terminal sets the second matching condition based on the verification information and records the second matching condition includes: obtaining, based on the motion information, behavior information of a user corresponding to the mobile terminal, where the behavior information includes at least one of the following: a quantity of steps of motion of the user, a location corresponding to each motion step of the user, and motion duration corresponding to each motion step of the user.

With reference to any one of the eleventh aspect of this application or the first to the fourth implementations of the eleventh aspect, in a fifth implementation of the eleventh aspect of this application, the network connection information of the mobile terminal includes: at least one Wi-Fi account and a password corresponding to each account.

With reference to any one of the eleventh aspect of this application or the first to the fifth implementations of the eleventh aspect, in a sixth implementation of the eleventh aspect of this application, the set password is a screen unlocking password of the mobile terminal.

According to a twelfth aspect, this application provides a computer readable storage medium, including an instruction. When the instruction runs on a computer, the computer is enabled to perform the method according to any one of the first aspect, the implementations of the first aspect, the second aspect, or the implementations of the second aspect.

According to a thirteenth aspect, this application provides a computer program product. When the computer program product runs on a computer, the computer is enabled to perform the method according to any one of the first aspect, the implementations of the first aspect, the second aspect, or the implementations of the second aspect.

Technical solutions provided in the embodiments of this application have the following beneficial effects:

In the embodiments, the mobile terminal can verify the password by combining the image and the matching information, for example, a plurality of features such as motion information, location information, and network connection information, to increase verification complexity, so that the password cannot be easily cracked, thereby improving encryption performance. In addition, the image and the matching information can both be completed by the mobile terminal without requiring another device, thereby facilitating a user operation and improving user experience.

BRIEF DESCRIPTION OF THE DRAWINGS

FIG. 6I is a schematic diagram of inputting a confirmation operation by a user according to an embodiment of this application;

FIG. 10G is a schematic diagram of displaying a notification interface by a mobile terminal according to an embodiment of this application;

FIG. 10H is a flowchart of an embodiment of a password setting method according to an embodiment of this application;

DETAILED DESCRIPTION OF ILLUSTRATIVE EMBODIMENTS

The following describes technical solutions in embodiments of this application with reference to the accompanying drawings in the embodiments of this application. Apparently, the described embodiments are merely a part rather than all of the embodiments of this application.

In the specification, claims, and accompanying drawings of this application, the terms "first", "second", "third", "fourth", and the like (if any) are intended to distinguish between similar objects but do not necessarily indicate a specific order or sequence. It should be understood that the data termed in such a way is interchangeable in proper circumstances so that the embodiments described herein can be implemented in other orders than the order illustrated or described herein. In addition, the terms "include", "contain" and any other variants mean to cover non-exclusive inclusion, for example, a process, method, system, product, or device that includes a series of steps or units is not necessarily limited to those expressly listed steps or units, but may include other steps or units not expressly listed or inherent to such a process, method, system, product, or device.

The embodiments of this application provide a password retrieval method and a mobile terminal, to improve user experience.

For an easy understanding of the embodiments of this application, the following describes a mobile terminal in the embodiments of this application. A mobile terminal 100 in this application may include but is not limited to: a mobile phone, a tablet, an electronic reader, a personal digital assistant (Personal Digital Assistant, PDA), a vehicle-mounted electronic device, a wearable device, a virtual reality (VR, Virtual Reality) device, an augmented reality (Augmented Reality) device, or the like. An operating system of the mobile terminal may be a system, such as Android, iOS, Windows Phone, or BlackBerry OS, and is not specifically limited in the embodiments of this application.

Figure 1:
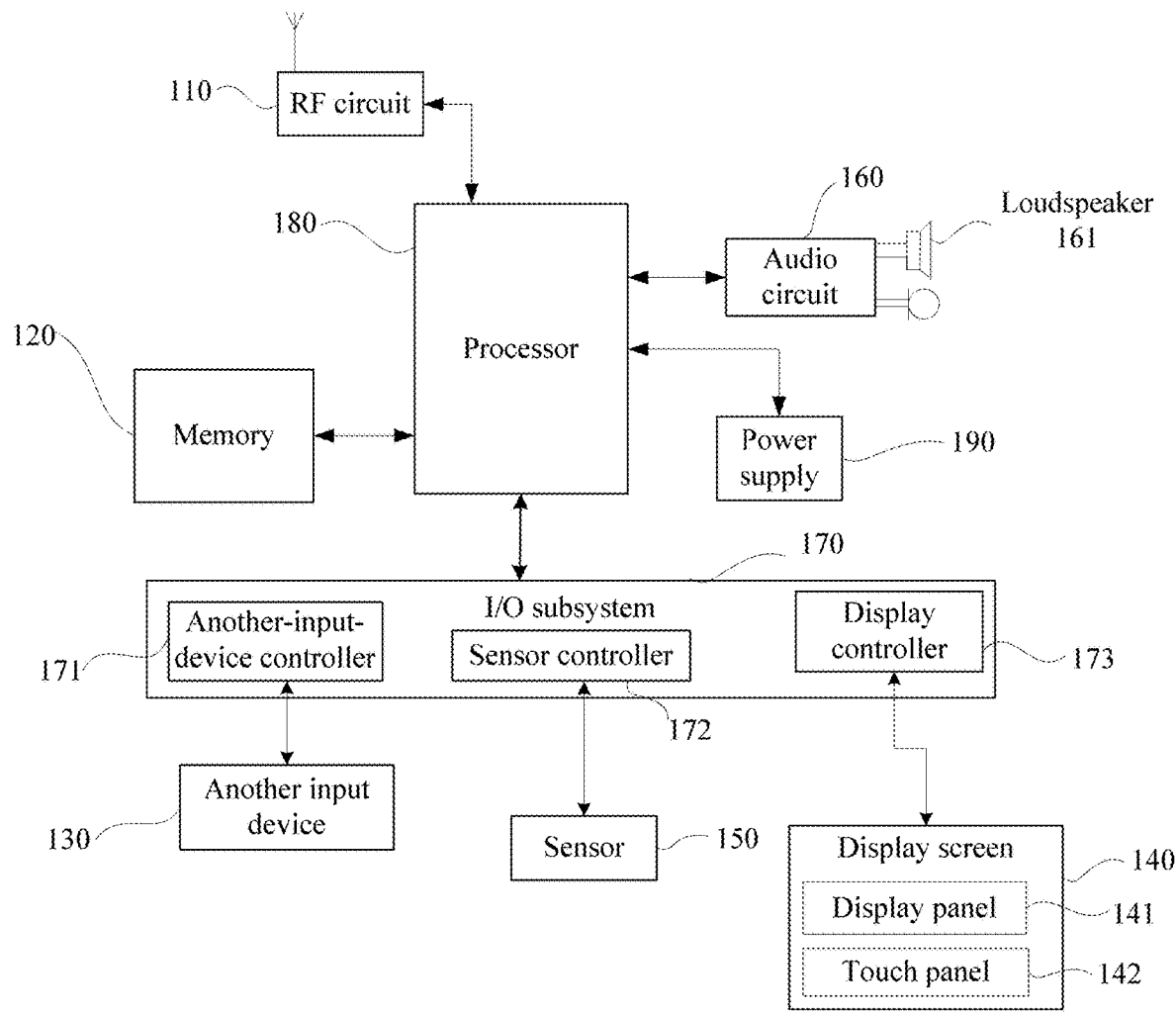
FIG. 1 is a schematic structural diagram of a mobile terminal according to an embodiment of this application.

For example, the mobile terminal 100 is a mobile phone. FIG. 1 is a block diagram of a part of a structure of the mobile phone 100 related to an embodiment of this application. As shown in FIG. 1, the mobile phone 100 includes components, such as an RF (Radio Frequency, radio frequency) circuit no, a memory 120, another input device 130, a display screen 140, a sensor 150, an audio circuit 160, an I/O subsystem 170, a processor 180, and a power supply 190. Persons skilled in the art may understand that, the mobile phone structure shown in FIG. 1 does not constitute a limitation to the mobile phone, and may include more or fewer components than those shown in the figure, or some components may be combined, or some components may be split, or a different component layout may be used. Persons skilled in the art may understand that, the display screen 140 belongs to a user interface (User Interface, UI), and the mobile phone 100 may include more or fewer user interfaces than those shown in the figure.

The following describes in detail each component of the mobile phone 100 with reference to FIG. 1.

The RF circuit 110 may be configured to receive or send a signal in an information receiving/sending process or a call process, and in particular, receive downlink information from a base station and send the downlink information to the processor 180 for processing; and send related uplink data to the base station. Generally, the RF circuit includes but is not limited to: an antenna, at least one amplifier, a transceiver, a coupler, a low noise amplifier (Low Noise Amplifier, LNA), a duplexer, or the like. In addition, the RF circuit 110 may further communicate with a network and another device through radio communication. The radio communication may use any communication standard or protocol, including but not limited to: global system for mobile communications (Global System of Mobile communication, GSM), general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), email, short message service (Short Message Service, SMS), or the like.

The memory 120 may be configured to store a software program and a module. The processor 180 performs each functional application and data processing of the mobile phone 100 by running the software program and the module that are stored in the memory 120. The memory 120 may mainly include a program storage area and a data storage area, where the program storage area may store an operating system, an application program required by at least one function (for example, an audio playback function or an image playback function), and the like; and the data storage area may store data (for example, audio data or a phone book) created according to use of the mobile phone 100, and the like. In addition, the memory 120 may include a high-speed random access memory, and may further include a non-volatile memory, for example, at least one magnetic disk storage device, a flash memory, or another volatile solid-state storage device.

The another input device 130 may be configured to receive entered numeral or character information, and generate a key signal input related to user settings and function control of the mobile phone loft Specifically, the another input device 130 may include but is not limited to one or more of the following: a physical keypad, a function key (for example, a volume control key or an on/off key), a trackball, a mouse, a joystick, an optical mouse (where the optical mouse is a touch-sensitive surface that does not display a visual output, or is an extension of a touch-sensitive surface formed by a touchscreen), and the like. The another input device 130 is connected to an another-input-device controller 171 of the I/O subsystem 170, and performs signal exchange with the processor 180 under the control of the another-input-device controller 171.

The display screen 140 may be configured to display information input by a user or information provided for a user and various menus of the mobile phone 100, and may further accept a user input. Specifically, the display screen 140 may include a display panel 141 and a touch panel 142. The display panel 141 may be configured in a form of an LCD (Liquid Crystal Display, liquid crystal display), an OLED (Organic Light-Emitting Diode, organic light-emitting diode), or the like. The touch panel 142 is also referred to as a touchscreen, a touch-sensitive screen, or the like; and may collect a touch or non-touch operation of a user on or around the touch panel 142 (for example, an operation performed on or around the touch panel 142 by a user by using a finger or any proper object or accessory such as a stylus, where the operation may include a motion sensing operation, and the operation includes operation types such as a single-point control operation and a multi-point control operation), and drives a corresponding connection apparatus according to a preset program. Optionally, the touch panel 142 may include two parts: a touch detection apparatus and a touch controller. The touch detection apparatus detects a touch azimuth and a gesture of the user, detects a signal arising from a touch operation, and transmits the signal to the touch controller. The touch controller receives touch information from the touch detection apparatus, converts the touch information into information that can be processed by the processor, and sends the converted information to the processor 180; and can receive a command sent by the processor 180 and then execute the command. In addition, the touch panel 142 may be implemented in a plurality of types such as a resistive type, a capacitive type, an infrared type, and a surface acoustic wave type; or the touch panel 142 may be implemented by using any technology to be developed in the future. Further, the touch panel 142 may cover the display panel 141. A user may perform, based on content (where the content includes but is not limited to a soft keypad, a virtual mouse, a virtual key, an icon, and the like) displayed on the display panel 141, an operation on or around the touch panel 142 covering the display panel 141. After detecting a touch operation on or around the touch panel 142, the touch panel 142 transmits, by using the I/O subsystem 170, information about the operation to the processor 180 to determine a touch application type, so as to determine a user input. Then the processor 180 provides, based on the touch application type and the user input by using the I/O subsystem 170, a corresponding visual output on the display panel 141. Although the touch panel 142 and the display panel 141 shown in FIG. 1 are used as two independent components to implement input and output functions of the mobile phone 100, in some embodiments, the touch panel 142 and the display panel 141 may be integrated to implement the input and output functions of the mobile phone 100.

The mobile phone 100 may further include at least one type of sensor 150, for example, a light sensor, a motion sensor, a position sensor, or another sensor. Specifically, the light sensor may include an ambient light sensor and a proximity sensor. The ambient light sensor can adjust brightness of the display panel 141 according to brightness of an ambient light ray. The proximity sensor can switch off the display panel 141 and/or a backlight when the mobile phone 100 is moved to an ear. As a kind of motion sensors, an acceleration sensor 1501 can detect a value of an acceleration in various directions (usually three axes); can detect a value and a direction of gravity when the mobile phone 100 is still; and can be used for an application (for example, screen switching between a portrait mode and a landscape mode, a related game, or magnetometer posture calibration) for recognizing a gesture of the mobile phone 100, a function (for example, a pedometer or a keystroke) related to vibration recognition, and the like. As a kind of position sensors, a global positioning system (Global Positioning System, GPS) 1502 can implement positioning of the mobile phone 100, that is, can detect location information of the mobile phone 100. As a kind of position sensors, an orientation sensor 1503 (for example, a gyroscope or an electronic compass) can detect direction information of the mobile phone 100. For another sensor, such as a gyroscope, a barometer, a hygrometer, a thermometer, or an infrared sensor, with which the mobile phone 100 may be further equipped, details are not described herein again.

The audio circuit 160, a loudspeaker 161, and a microphone 162 can provide an audio interface between a user and the mobile phone 100. The audio circuit 160 can transmit, to the loudspeaker 161, a signal that is converted from received audio data. The loudspeaker 161 converts the signal into an acoustical signal and outputs the acoustical signal. In addition, the microphone 162 converts a collected acoustical signal into a signal; and the audio circuit 160 receives the signal, converts the signal into audio data, and then outputs the audio data to the RF circuit 110, so as to send the audio data to, for example, another mobile phone, or outputs the audio data to the memory 120 for further processing.

The I/O subsystem 170 is configured to control an external input/output device, and may include the another-input-device controller 171, a sensor controller 172, and a display controller 173. Optionally, one or more another-input-device controllers 171 receive a signal from the another input device 130, and/or send a signal to the another input device 130. The another input device 130 may include a physical button (such as a push button or a rocker button), a dial pad, a slider switch, a joystick, a click scroll wheel, or an optical mouse (where the optical mouse is a touch-sensitive surface that does not display a visual output, or is an extension of a touch-sensitive surface formed by a touchscreen). It is worth noting that the another-input-device controller 171 may be connected to any one or more of the foregoing devices. The display controller 173 in the I/O subsystem 170 receives a signal from the display screen 140, and/or sends a signal to the display screen 140. After the display screen 140 detects a user input, the display controller 173 converts the detected user input into interaction with a user interface object that is displayed on the display screen 140, so as to implement man-machine interaction. The sensor controller 172 may receive a signal from one or more sensors 150, and/or send a signal to one or more sensors 150.

The processor 180 is a control center of the mobile phone 100, connects each part of the entire mobile phone by using various interfaces and lines, and performs various functions and data processing of the mobile phone 100 by running or executing the software program and/or the module that are stored in the memory 120 and invoking data stored in the memory 120, so as to perform overall monitoring on the mobile phone. Optionally, the processor 180 may include one or more processing units. Preferably, an application processor and a modem processor may be integrated into the processor 180. The application processor mainly handles an operating system, a user interface, an application program, and the like. The modem processor mainly handles radio communication. It may be understood that the modem processor may not be integrated into the processor 180.

The mobile phone 100 further includes the power supply 190 (for example, a battery) that supplies power to each component. Optionally, the power supply may be logically connected to the processor 180 through a power management system, so as to implement functions such as charging management, discharging management, and power consumption management through the power management system.

Although not shown, the mobile phone 100 may further include a camera 1504, a Wi-Fi module 1505, a Bluetooth module, and the like. Details are described herein again.

For an easy understanding of the embodiments of this application, the following defines some terms in this application.

Virtual image: is an image generated on a camera preview interface by combining a characteristic of a material object when a camera of a mobile terminal is started. The virtual image can change as a gesture of the mobile terminal changes, and move as the mobile terminal moves. For example, a desk lamp 1030 in FIG. 10C to FIG. 10E below is a virtual image.

For an easy understanding of the embodiments of this application, the following describes scenarios to which a password verification method and a mobile terminal in this application are applicable.

1. Retrieval of an Unlocking Password

Figure 2A:
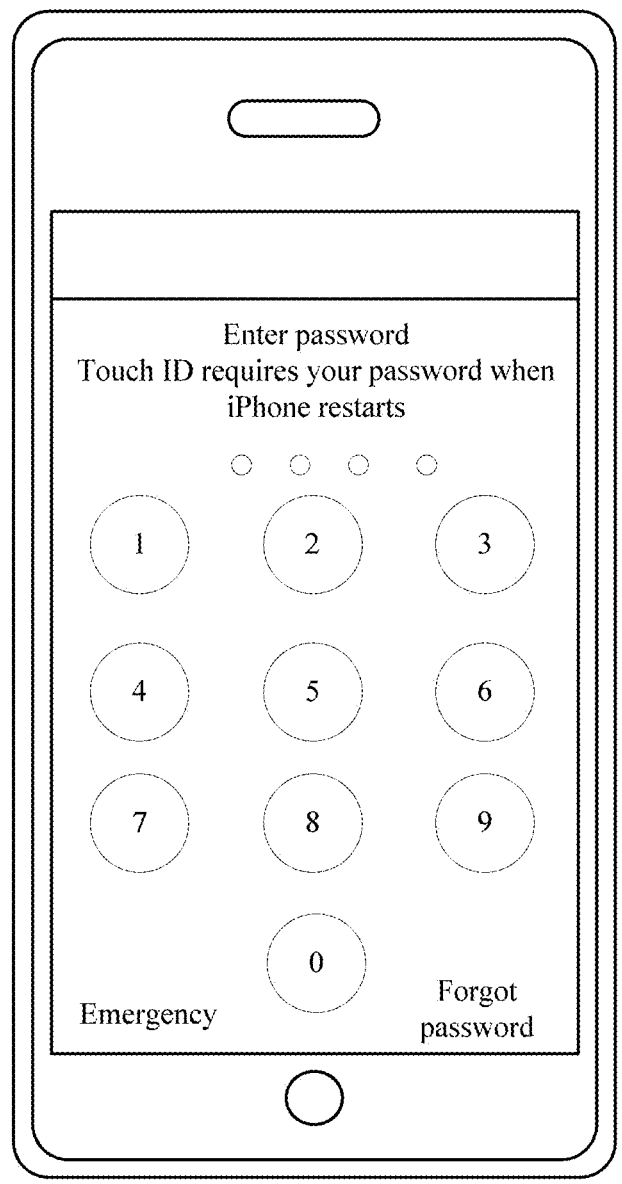
FIG. 2A is a schematic diagram of an unlocking interface according to an embodiment of this application.
Figure 2B:
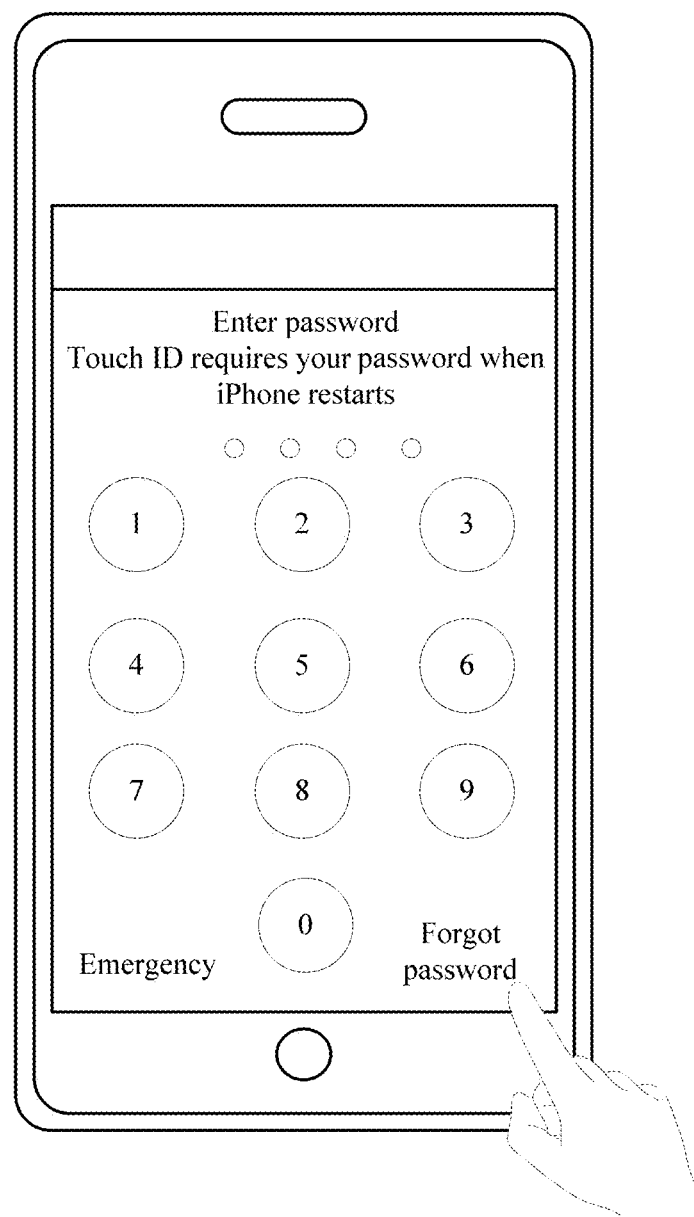
FIG. 2B is a schematic diagram of an operation of inputting a password retrieval request by a user according to an embodiment of this application.

After a mobile phone is restarted, a password unlocking interface is displayed, to prompt a user to enter a password for unlocking, as shown in FIG. 2A. The user forgets the unlocking password, and taps a function button "Forget Password" on a locked-screen interface, as shown in FIG. 2B. A mobile phone system starts a password retrieval process, to help the user retrieve the unlocking password by using the password verification method in this application.

2. Retrieval of a Login Password

Figure 2C:
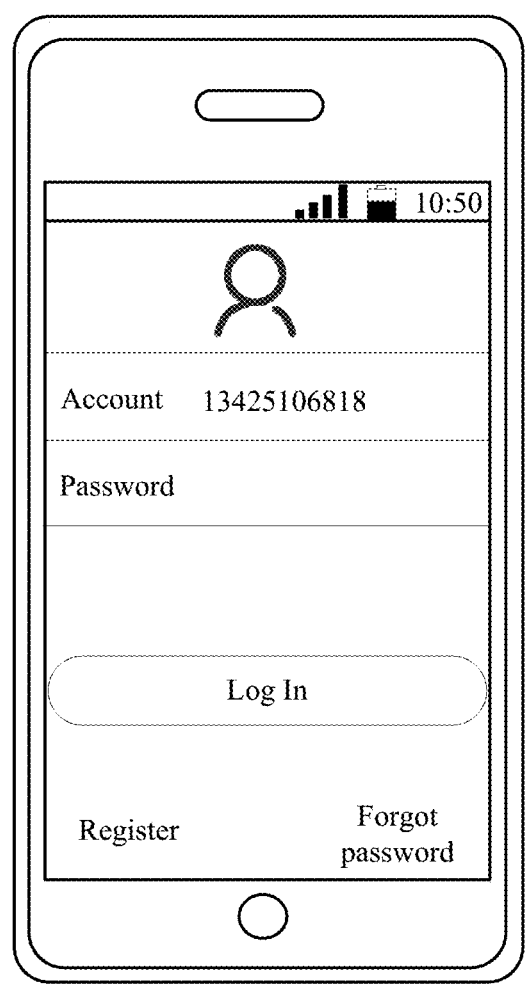
FIG. 2C is a schematic diagram of a login interface according to an embodiment of this application.
Figure 2D:
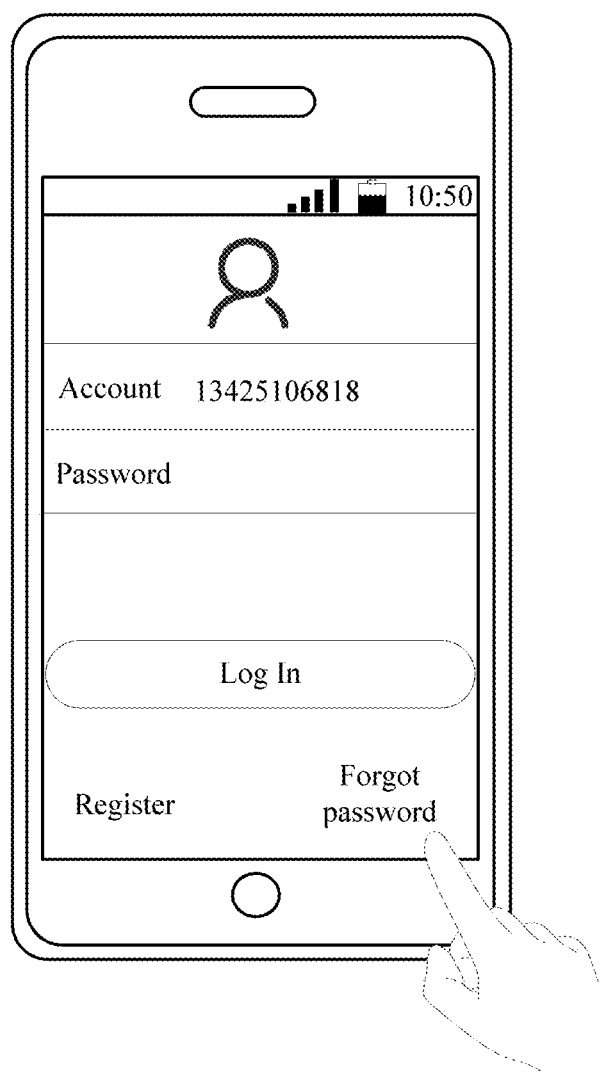
FIG. 2D is a schematic diagram of an operation of inputting a password retrieval request by a user according to an embodiment of this application.

A user taps an application icon. A login interface is displayed on a mobile phone, as shown in FIG. 2C. The user forgets a login password of the account, and taps a function button "Forget Password" on the login interface, as shown in FIG. 2D. The mobile phone starts a password retrieval process, to help the user retrieve the login password by using the password verification method in this application.

3. Retrieval of an Encryption Password

For a special application (for example, a memo), a special file (for example, a private album), or a special function (for example, payment), a user may set a password for the application, file, or function, to encrypt the application, file, or function. When the user starts the application, or opens the file, or enables the function, a password entry interface is displayed on a mobile phone, prompting the user to enter the encryption password. When the user forgets the encryption password, the user may tap a function button "Forget Password" on the password entry interface. The mobile phone detects the operation, and triggers a password retrieval process, to help the user retrieve the password of the application by using the password verification method in this application.

It should be understood that, in the foregoing scenarios, the operation of triggering the password retrieval process may alternatively be: inputting a predefined gesture on an interface, tapping entity hardware of the mobile phone, or the like, in addition to tapping a function button on the interface.

4. Conventional Password Verification

The password verification method in the embodiments of this application is also applicable to verifying the foregoing passwords, in addition to retrieving the foregoing passwords. To be specific, a password, such as a screen unlocking password, a login password, an application password for encrypting an application, a file password for encrypting a file, or a function password for encrypting a function, may be verified by using the password verification method in the embodiments of this application.

It should be understood that, this application is also applicable to another scenario, in addition to the scenarios of retrieving the foregoing passwords and the scenario of verifying the foregoing passwords, and this is not specifically limited in this application.

For an easy understanding of the embodiments of this application, the following describes a structure of a system to which the password verification method and the mobile terminal in this application are applicable.

Figure 3:
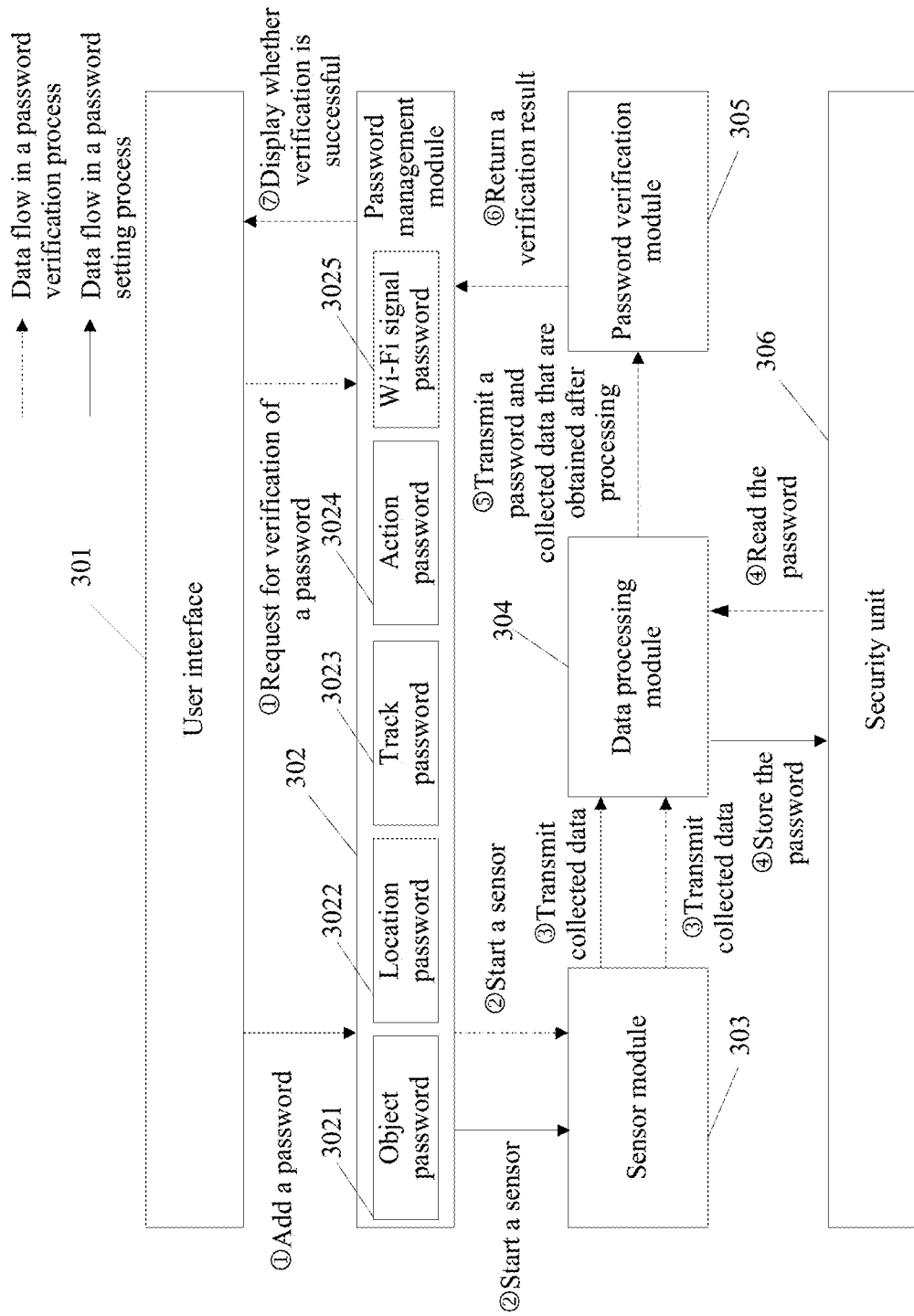
FIG. 3 is a schematic structure diagram of a system to which a password setting (or verification) method is applicable according to an embodiment of this application.

As shown in FIG. 3, the system may include: a user interface 301, a password management module 302, a sensor module 303, a data processing module 304, a password verification module 305, and a security unit 306. In the figure, a solid-line arrow represents a password entry process, and a dashed-line arrow represents a password verification process.

User interface module 301: configured to display, on a display screen 140, an interface used for prompting a user to input an operation for retrieving a password; and provides, on the display screen 140, an entrance for password verification, information about whether verification is successful, and the like.

Password management module 302: may include one or more of the following five modules based on functions: a material object password module 3021, a location password module 3022, a track password module 3023, an action password module 3024, and a Wi-Fi signal password module 3025. The password management module 302 performs a password verification function by combining one or more of the five modules.

Material object password module 3021: configured to start a camera 1504, and prompt the user to store a password into a specific object; deliver image information collected by the camera 1504 to the data processing module 304 for processing, to obtain a material object password; and when the user requests for verification of the material object password, start the camera 1504 to collect image information, and deliver the collected image information to the data processing module 304 and the password verification module 305, to complete verification.

Location password module 3022: configured to start a global positioning system (Global Positioning System, GPS) 1502 and/or an orientation sensor 1503, and prompt the user to store a password into a specific location; deliver location information collected by the GPS 1502 and/or direction information collected by the orientation sensor 1503 to the data processing module 304 for processing, to obtain a location password; and when the user requests for verification of the location password, start the GPS 1502 and/or the orientation sensor 1503, and deliver collected information to the data processing module 304 and the password verification module 305, to complete verification.

Track password module 3023: configured to start a step counting function of an acceleration sensor 1501 and a positioning function of the global positioning system 1502, and prompt the user to store a password into a segment of a walking track; deliver motion data collected in a walking process by the acceleration sensor 1501 to the data processing module 304 for processing, to obtain a track password; and when the user requests for verification of the track password, start the step counting function of the acceleration sensor 1501 and the positioning function of the global positioning system 1502, and deliver information collected by the acceleration sensor 1501 and the global positioning system 1502 to the data processing module 304 and the password verification module 305, to complete verification.

Action password module 3024: configured to start the acceleration sensor 1501, and prompt the user to perform a particular action by using a mobile phone; deliver action data, which is collected by the acceleration sensor 1501 in a process of performing an operation by the user on the mobile phone, to the data processing module 304 for processing, to obtain an action password; and when the user requests for verification of the action password, start the acceleration sensor 1501 to collect action data (for example, gesture information and acceleration information) of the mobile phone, and deliver the collected action data to the data processing module 304 and the password verification module 305, to complete verification.

Wi-Fi signal password module 3025: configured to start a Wi-Fi module 1505, and prompts the user to specify a Wi-Fi signal for retrieving a password; deliver the Wi-Fi signal specified by the user to the data processing module 304 for processing, to obtain target data; and when the user requests for Wi-Fi signal password verification, start the Wi-Fi module 1505 to connect a Wi-Fi signal, and deliver the connected Wi-Fi signal to the data processing module 304 and the password verification module 305, to complete verification.

Sensor module 303: configured to select different sensors depending on different password retrieval manners, to obtain data, for example, start the camera 1504 to collect image data when the user selects the material object password module to set a material object password; or start the GPS 1502 when the user selects the location password module to set a location password; or start the acceleration sensor 1501 and the GPS 1502 when the user selects the track password module 3023 to set a track password.

Data processing module 304: configured to process raw data collected by the sensor module 303, to obtain target data, for example, extract an image characteristic value or the like of image data.

Password verification module 305: configured to perform, when the user requests for password verification, matching between data detected by the user by using a sensor 150 and target data read from the security unit 306. If the matching is successful, the password for retrieval verification is successful.

Security unit 306: configured to store the target data that is obtained after the data processing module 304 performs the processing.

It should be understood that, this application is also applicable to another system structure, in addition to the foregoing system structure, and this is not specifically limited in this application.

Figure 4:
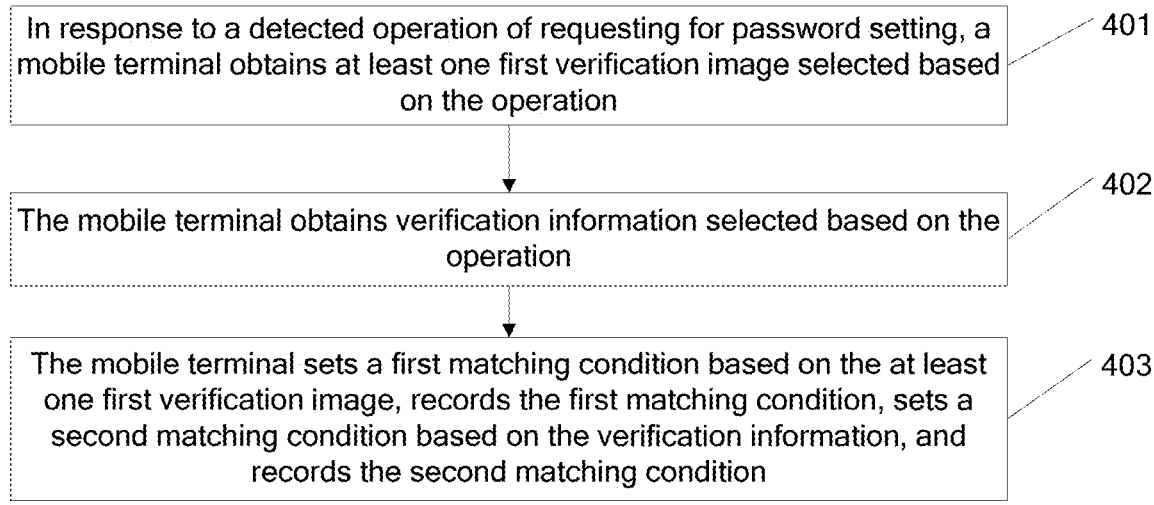
FIG. 4 is a flowchart of an embodiment of a password setting method according to an embodiment of this application.

The following describes the password verification method in the embodiments of this application, based on the foregoing scenarios and system structure. As shown in FIG. 4, an embodiment of a password setting method according to an embodiment of this application includes the following steps.

401. In response to a detected operation of requesting for password setting, a mobile terminal obtains at least one first verification image selected based on the operation.

A user inputs an operation of requesting for password setting. In response to the operation, the mobile terminal starts a camera, and displays a camera preview interface, where at least one first verification image collected by using the camera is displayed on the camera preview interface.

It should be understood that, in this embodiment, the operation of requesting for password setting may specifically be an operation of requesting for setting of a conventional password (for example, a login password, a screen unlocking password, or an encryption password), or requesting for password setting for retrieving a conventional password, or may be another requesting operation, and is not specifically limited herein.

402. The mobile terminal obtains verification information selected based on the operation.

In this embodiment of this application, the verification information includes at least one of the following: location information of the mobile terminal, motion information of the mobile terminal, at least one second verification image that is collected by the camera and that is different from the first verification image, and network connection information of the mobile terminal.

For ease of description, in this embodiment of this application, in a password setting process, motion information obtained by the mobile terminal is referred to as motion verification information; information that is obtained by the mobile terminal and that is about a location at which the mobile terminal is located is referred to as location verification information; and network connection information obtained by the mobile terminal is referred to as network connection verification information.

403. The mobile terminal sets a first matching condition based on the at least one first verification image, records the first matching condition, sets a second matching condition based on the verification information, and records the second matching condition.

After obtaining the first verification image and the verification information, the mobile terminal sets a first matching condition based on the first verification information, records the first matching condition, sets a second matching condition based on the verification information, and records the second matching condition. The first matching condition is used to verify a first image collected by the mobile terminal in response to a password verification request. The second matching condition is used to verify matching information obtained by the mobile terminal.

In this embodiment of this application, the mobile terminal may set a matching condition for password verification by combining the verification image and the verification information, for example, the motion information, the location information, the action information, and the network connection information, thereby improving security of the verification.

Figure 5:
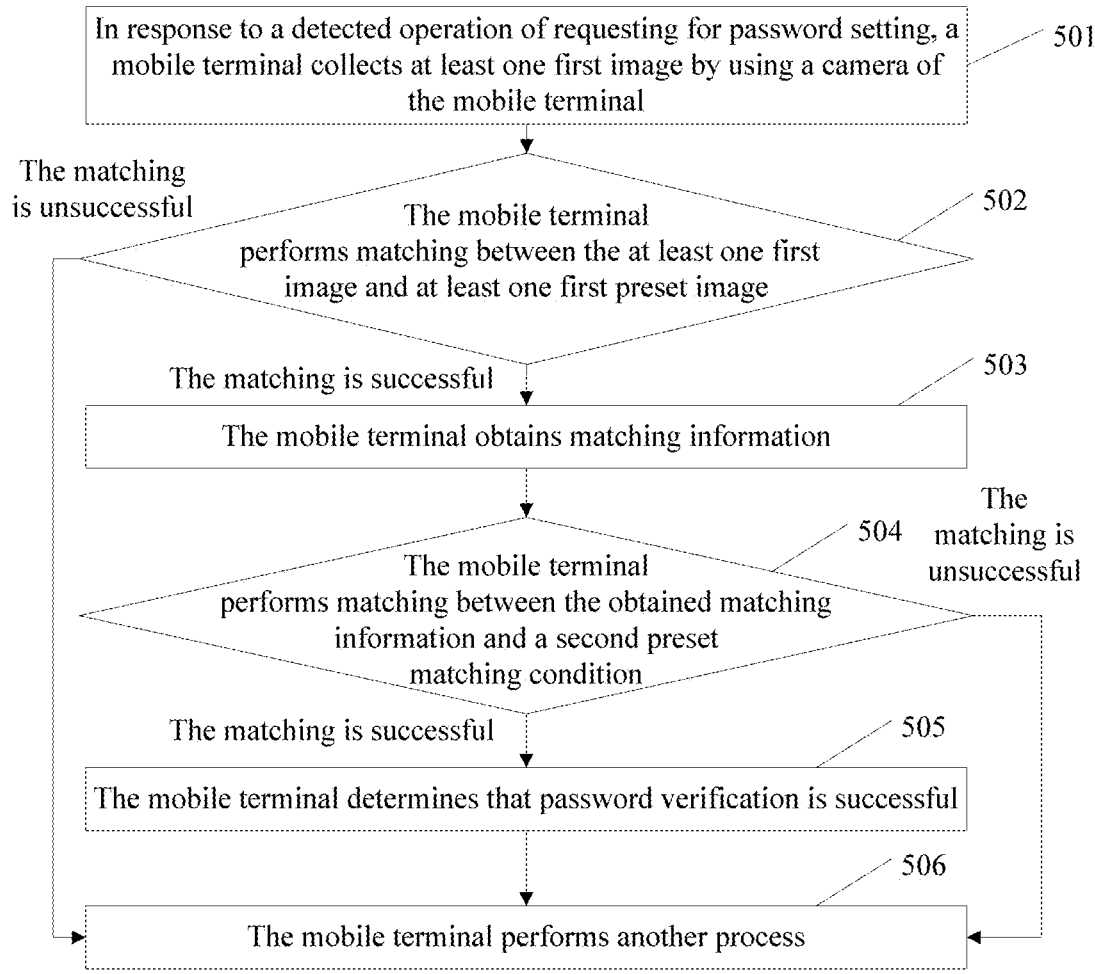
FIG. 5 is a flowchart of an embodiment of a password verification method according to an embodiment of this application.

The following describes, in correspondence to the setting method corresponding to FIG. 4, a password verification method in an embodiment of this application. As shown in FIG. 5, an embodiment of a password verification method according to an embodiment of this application includes the following steps.

501. In response to a detected operation of requesting for password verification, a mobile terminal collects at least one first image by using a camera of the mobile terminal.

A user inputs an operation of requesting for password setting. In response to the operation, the mobile terminal starts a camera, and displays a camera preview interface. At least one first image is collected by using the camera, and the collected first image is displayed on the camera preview interface.

It should be understood that, in this embodiment of this application, the operation of requesting for password verification may specifically be an operation of requesting for verification of a conventional password (for example, a login password, a screen unlocking password, or an encryption password), or requesting for verification to retrieve a conventional password, or another requesting operation, and is not specifically limited herein.

502. The mobile terminal performs matching between the at least one first image and at least one first preset image; and performs step 503 if the matching is successful, or performs step 506 if the matching is unsuccessful.

After collecting the at least one first image, the mobile terminal performs matching between the at least one first image and at least one first preset image; and performs step 503 if a matching result satisfies a first preset matching condition, or performs step 506 if a matching result does not satisfy a first preset matching condition.

It should be understood that, the first preset image in this embodiment is an image collected, in response to a user-input operation of requesting for password setting, by the mobile terminal by using the camera, for example, the first verification image in the embodiment corresponding to FIG. 4.

The first preset matching condition in this embodiment is an image matching condition that has been set, in a password setting process, by the mobile terminal based on an image collected by the camera, for example, the first matching condition in the embodiment corresponding to FIG. 4.

503. The mobile terminal obtains matching information.

When the result of matching between the at least one first image and the at least one first preset image satisfies the first preset matching condition, the mobile terminal obtains the matching information. The matching information includes at least one of the following: location information of the mobile terminal, motion information of the mobile terminal, at least one second image that is collected by the camera and that is different from the first image, and network connection information of the mobile terminal.

504. The mobile terminal performs matching between the obtained matching information and a second preset matching condition; and performs step 505 if the matching is successful, or performs step 506 if the matching is unsuccessful.

After obtaining the matching information, the mobile terminal performs matching between the obtained matching information and the second preset matching condition; and performs step 505 if the matching is successful, or performs step 506 if the matching is unsuccessful.

It should be understood that, the second preset matching condition in this embodiment is an information matching condition that has been set, in a password setting process, by the mobile terminal based on obtained verification information, for example, the second matching condition in the embodiment corresponding to FIG. 4.

505. The mobile terminal determines that password verification is successful.

When the mobile terminal determines that the matching information satisfies the second preset matching condition, that is, when the matching information successfully matches the second preset condition, the mobile terminal determines that the password verification succeeds.

506. The mobile terminal performs another process.

When the mobile terminal determines that the matching information does not satisfy the first preset matching condition and/or the second preset matching condition, that is, when the matching information fails to match the second preset condition, the mobile terminal performs another process, for example, prompts the user with verification failure information or prompts the user to perform verification again.

In this embodiment of this application, the mobile terminal needs to combine the image collected by the camera and the obtained verification information, for example, the motion information, the location information, the action information, and the network connection information, to implement password verification, thereby improving security of the verification.

Depending on different verification information (matching information), there may be different manners of setting the second condition (performing matching between the matching information and the second preset matching condition) for the mobile terminal. The following describes several setting manners and corresponding matching manners.

1. Material Object Password

Figure 6A:
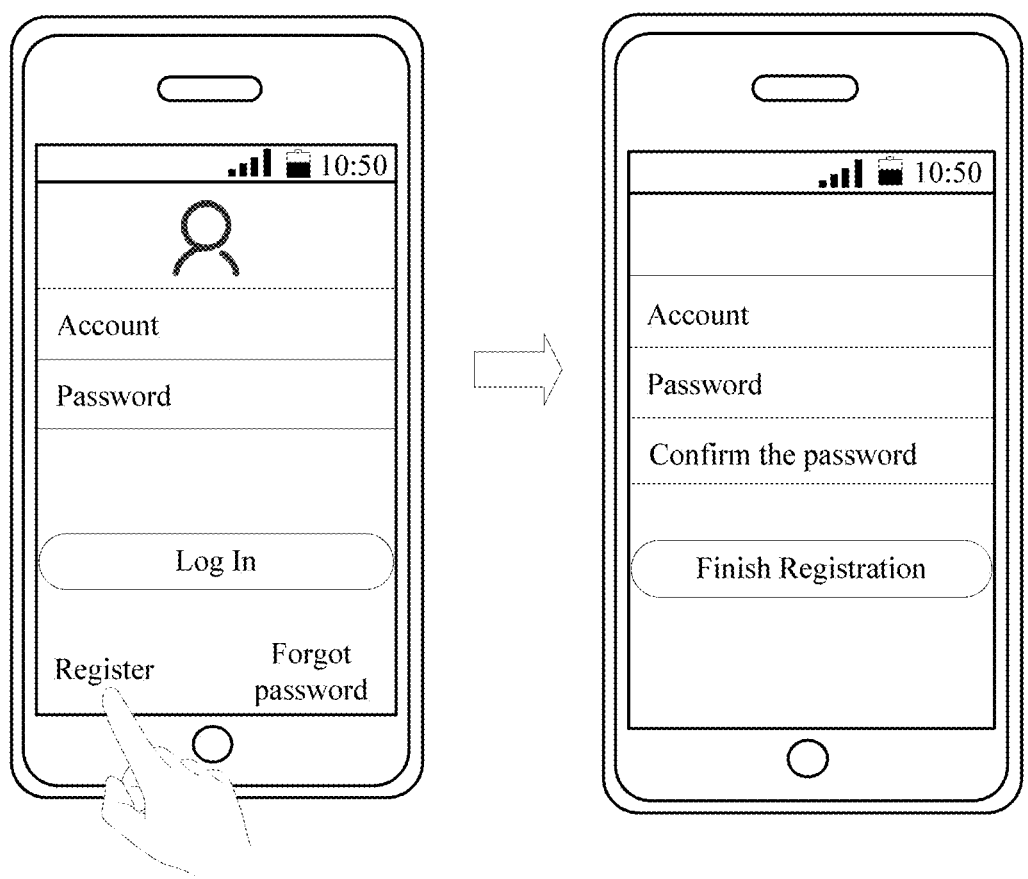
FIG. 6A is a schematic diagram of displaying a password entry interface by a mobile terminal in response to an operation according to an embodiment of this application.
Figure 6B:
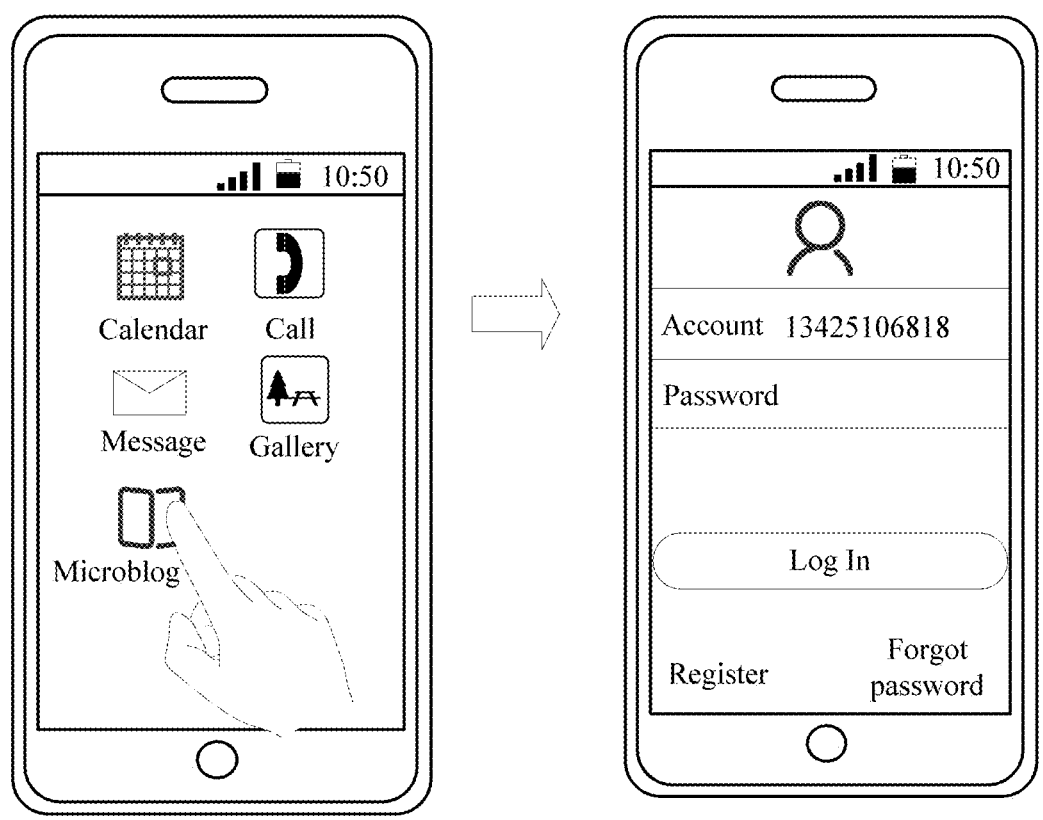
FIG. 6B is a schematic diagram of displaying a password entry interface by a mobile terminal in response to an operation according to an embodiment of this application.
Figure 6C:
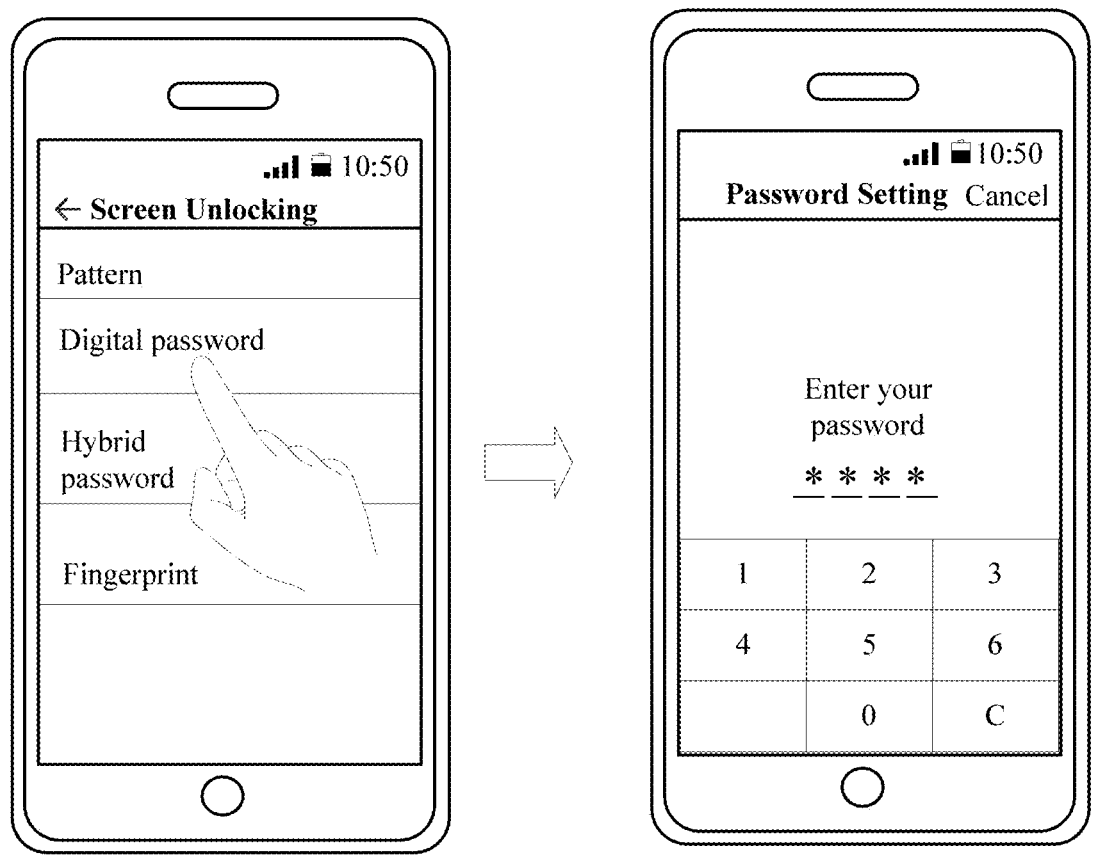
FIG. 6C is a schematic diagram of displaying a password entry interface by a mobile terminal in response to an operation according to an embodiment of this application.
Figure 6D:
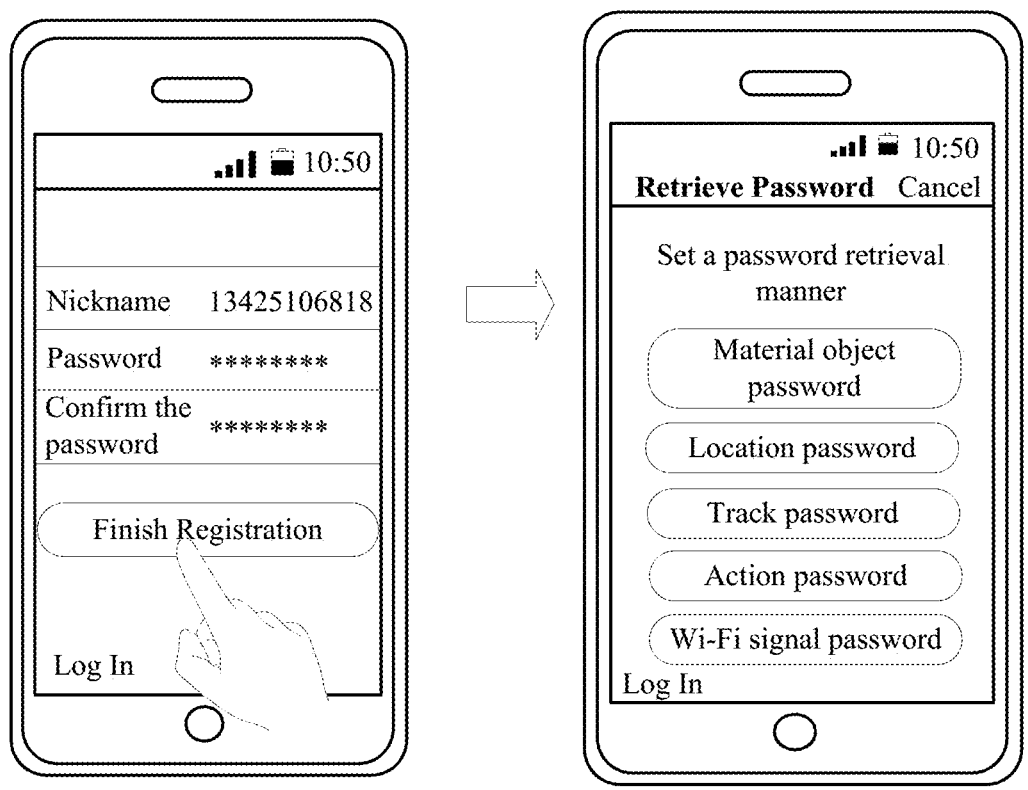
FIG. 6D is a schematic diagram of displaying a setting selection interface by a mobile terminal in response to an operation according to an embodiment of this application.
Figure 6E:
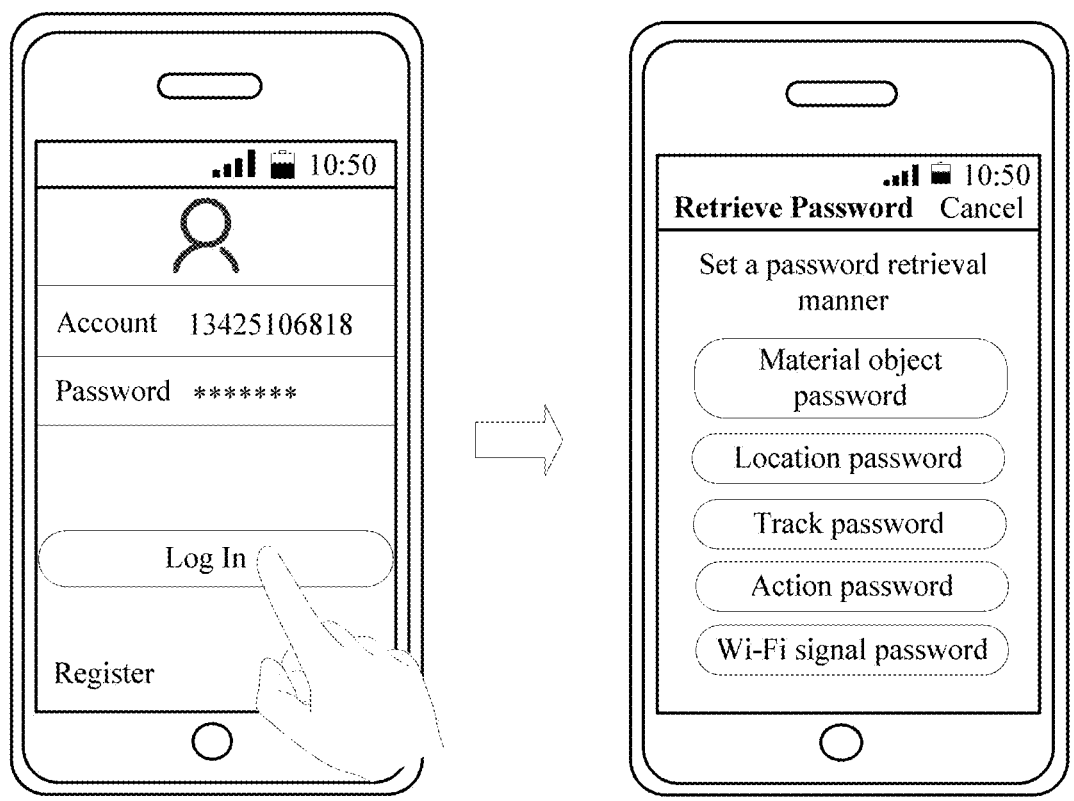
FIG. 6E is a schematic diagram of displaying a setting selection interface by a mobile terminal in response to an operation according to an embodiment of this application.
Figure 6F:
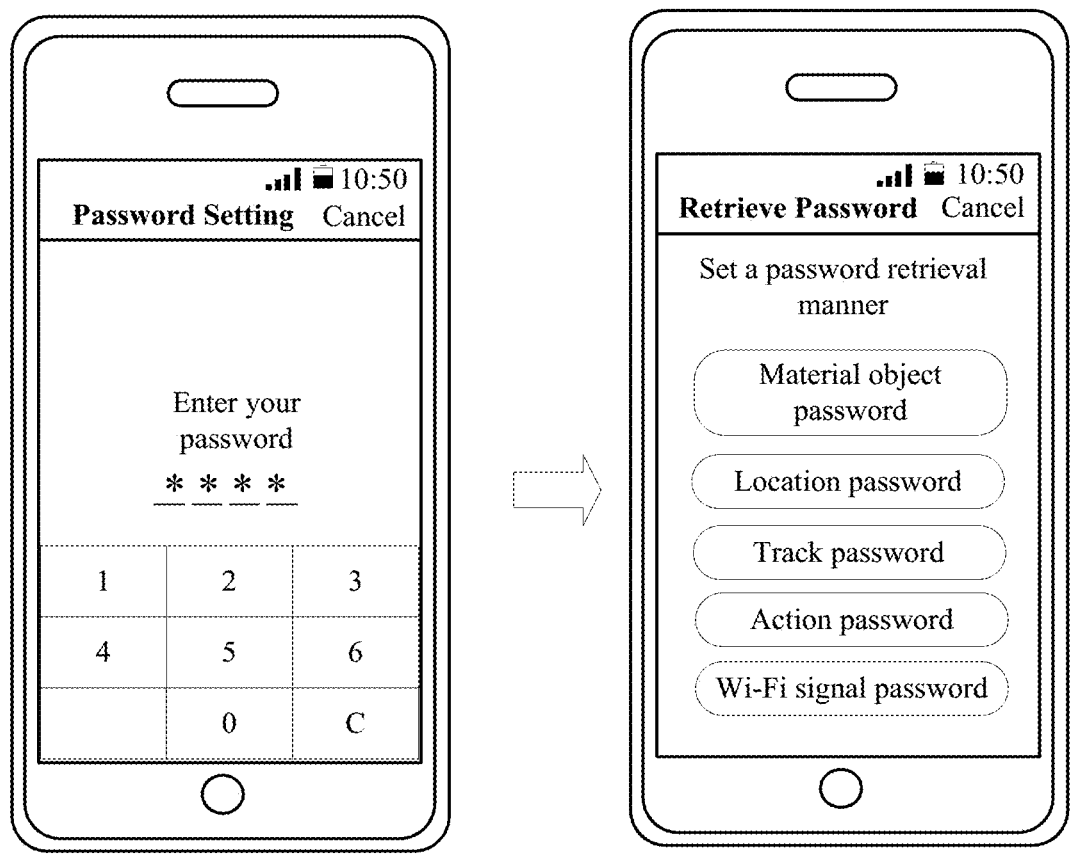
FIG. 6F is a schematic diagram of displaying a setting selection interface by a mobile terminal in response to an operation according to an embodiment of this application.
Figure 6G:
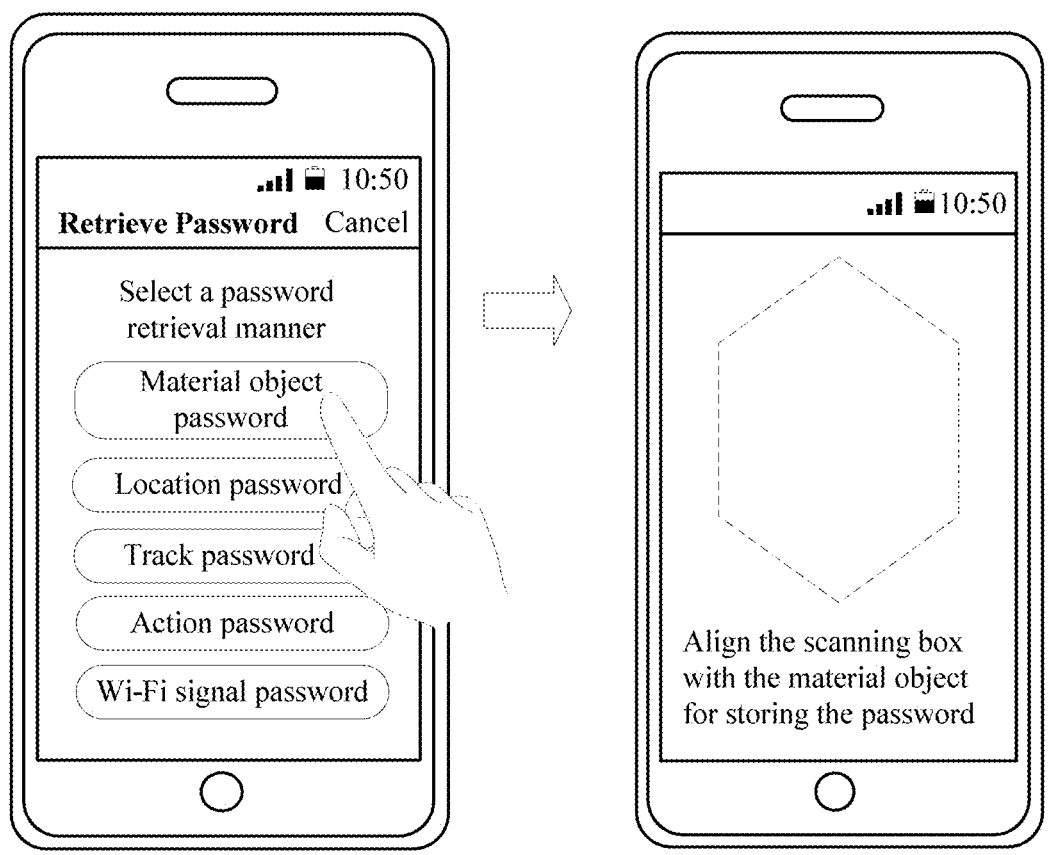
FIG. 6G is a schematic diagram of displaying a camera preview interface by a mobile terminal in response to an operation according to an embodiment of this application.

The following first describes in detail a process of setting a material object password. As shown in FIG. 6L, an embodiment of a password setting method according to an embodiment of this application includes the following steps.

601. A mobile terminal detects a material object password setting request input by a user, and starts a camera in response to the request.

The user inputs an operation of requesting for password setting, for example, taps a corresponding control on a screen, to trigger a material object password setting request. In response to the request, the mobile terminal starts the camera, and presents a camera preview interface on the screen, as shown in FIG. 6G.

It should be understood that, the camera preview interface shows an image of a scene at which the camera is currently aiming, and content on the camera preview interface differs as the mobile terminal moves.

602. The mobile terminal detects a confirmation operation input by the user; and in response to the confirmation operation, obtains image information of a target object collected by the camera, extracts an image characteristic value of the target object from the image information, and obtains current location information of the mobile terminal.

In an optional manner, after starting the camera, the mobile terminal may identify a scene obtained by the camera. When the mobile terminal has identified a specific object in a current scene, that is, when a specific object appears on the camera preview interface, the mobile terminal may prompt, on the camera preview interface, the user to use or not to use an image of the object as a verification image. The user taps a confirmation button (for a confirmation operation). The mobile terminal detects the operation, obtains image information (a first verification image) of the object (a target object), and extracts an image characteristic value of the object from the image information.

Figure 6H:
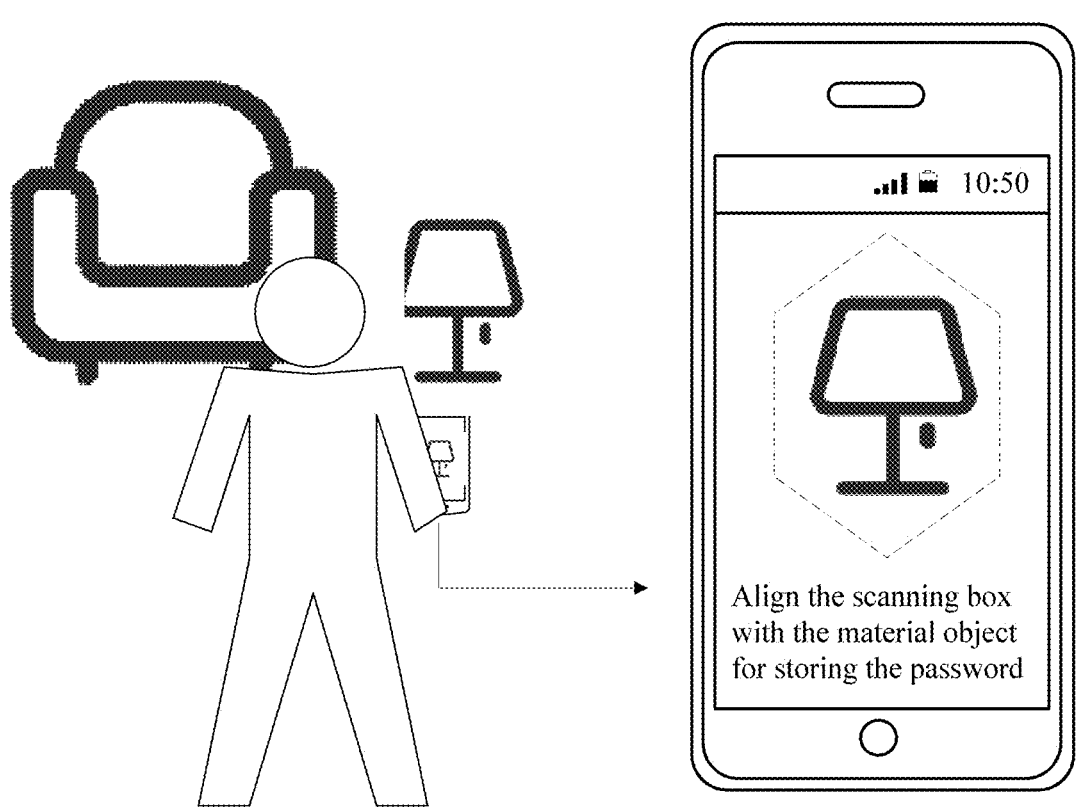
FIG. 6H is a schematic diagram of aiming a camera at an object by a user according to an embodiment of this application.

For example, when the user sets an entity password for retrieving a conventional password, after the camera is started, the user aims the camera of the mobile terminal at a desk lamp at home, as shown in FIG. 6H. In this case, the mobile terminal finds the object through scanning, and prompts the user to store or not to store a password into the object. The user taps "Yes". In response to the operation, the mobile terminal obtains image information of the desk lamp, and extracts an image characteristic value of the desk lamp from the image information, as shown in FIG. 6I.

In an optional manner, the camera preview interface includes a shooting button. The user moves the mobile terminal to aim the camera at a material object used for verification, and taps the shooting button. The mobile terminal detects the operation, extracts image information (collects a first verification image) of the object (a target object), and extracts an image characteristic value of the object from the image information.

It should be understood that, the confirmation operation may alternatively be sliding on the screen with a predefined gesture, or an operation such as tapping entity hardware of the mobile terminal, in addition to tapping a function button on the screen. This is not specifically limited herein.

In this embodiment, while obtaining the image information of the object, the mobile terminal also obtains the current location information (location verification information) of the mobile terminal. Specifically, the mobile terminal may obtain the location information (GPS information) by using a GPS, or may obtain the location information by using Bluetooth, or may obtain the location information (Wi-Fi positioning information) by using a Wi-Fi hotspot, or may obtain the location information (base station positioning information) by using a base station, or may obtain the location information in another manner.

Figure 6J:
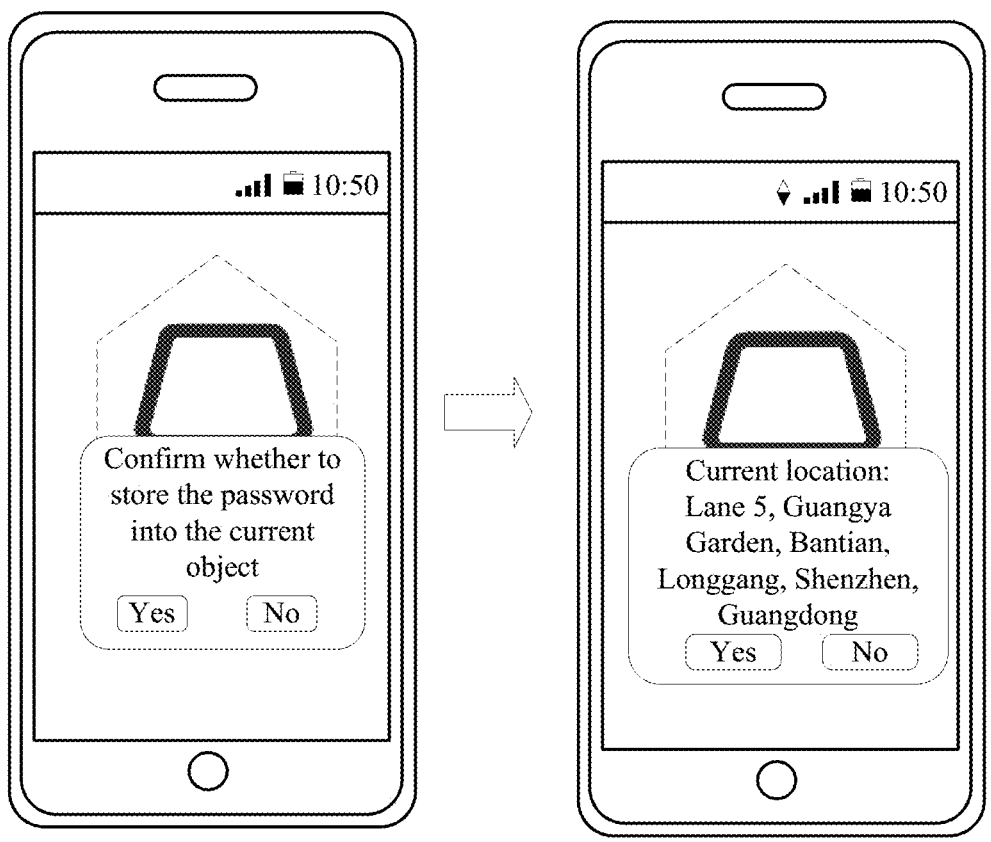
FIG. 6J is a schematic diagram of displaying current location information by a mobile terminal according to an embodiment of this application.

In an optional manner, after obtaining the current location information, the mobile terminal may preset the obtained location information to the user, for the user to perform calibration. As shown in FIG. 6J, after the user determines to store the password into the "desk lamp", the mobile terminal shows that the obtained location information is "Lane 5, Guangya Garden, Bantian, Longgang, Shenzhen, Guangdong", and provides two function buttons: "Yes" and "No". If the user taps "Yes", the mobile terminal determines that the location information is the current location information of the mobile terminal. If the user taps "No", the mobile terminal may provide an input interface for the user to manually select the current location information or manually enter current location information, and determines, as the current location information of the mobile terminal, location information selected by the user or entered by the user.

In an optional manner, alternatively, the mobile terminal may directly determine the obtained location information as the current location information of the mobile terminal.

It should be understood that, the location information may be address information, for example, "Lane 5, Guangya Garden, Bantian, Longgang, Shenzhen, Guangdong" in FIG. 6J; or may be longitude information and latitude information, for example, (N22° 37' 18.25", E114° 03' 40.58"); or may be other information that can be used to identify a geographical location. This is not specifically limited in this application.

It should be further understood that, precision of the obtained location also varies with different manners of obtaining the location information, and precision of the location information is not limited to the example in the foregoing scenario.

603. The mobile terminal stores the image characteristic value and the location information into the mobile terminal correspondingly.

The mobile terminal stores the image characteristic value and the location information correspondingly as a material object password into the mobile terminal. The image characteristic value corresponds to a first matching condition. During material object password verification, if an image characteristic value of an image collected by the camera is the same as the image characteristic value, it is considered that the image satisfies the first matching condition. The location information corresponds to a second matching condition. During material object password verification, if location information of the mobile terminal is the same as the location information, it is considered that the location information of the mobile terminal satisfies the second matching condition.

In some embodiments, the material object password (to be specific, the image characteristic value of the object and the current location information) may be used to verify a conventional password. When the user needs to perform a corresponding function (for example, account login, screen unlocking, or payment), after a corresponding operation is performed on the mobile terminal to enter the material object password, the verification is successful. Then the mobile terminal may perform an operation, such as releasing password lock, allowing account login, or allowing payment.

In some embodiments, the material object password may be further used to retrieve a conventional password. When the user forgets the password, the user performs a corresponding operation on the mobile terminal to enter the material object password and then verification is successful. Then the mobile terminal may display the to-be-retrieved password, or display prompt information (namely, password prompt information) of the password, or display an interface for resetting the password so that the user can reset a link of the password.

In this embodiment, the mobile terminal needs to pre-store the to-be-retrieved password requested by the user, or pre-store prompt information of the password, or pre-store characteristic data (for example, a password resetting link) that exists in a server and that corresponds to the password.

In an optional manner, the mobile terminal may further perform the following steps before performing step 601.

S1. The mobile terminal detects a first operation input by the user, and displays a password entry interface in response to the first operation.

The password entry interface may be an application account registration interface, as shown in FIG. 6A. The user taps a registration control on a login interface. The mobile terminal displays the application account registration interface. Alternatively, the password entry interface may be an application account login interface, as shown in FIG. 6B. The user taps an application icon. The mobile terminal displays the application account login interface. Alternatively, the password entry interface may be a screen unlocking password entry interface, as shown in FIG. 6C. The user taps a password control on a password setting interface. The mobile terminal displays the screen unlocking password entry interface.

It should be understood that, the password entry interface may alternatively be another interface that instructs the user to enter a password, and is not specifically limited in this application.

S2. The mobile terminal stores a password entered on the password entry interface by the user, and displays a setting selection interface.

The user enters a login password on the application account registration interface. After registration is successful, the mobile terminal stores the application account and the password, and displays a setting selection interface, as shown in FIG. 6D. Alternatively, the user enters, on the application account login interface, a login password corresponding to an application account. After login is successful, the mobile terminal stores the application account and the login password, and displays a setting selection interface, as shown in FIG. 6E. Alternatively, the user enters a screen unlocking password of the mobile terminal on the screen locking password entry interface. The mobile terminal stores the screen unlocking password and displays a setting selection interface, as shown in FIG. 6F.

It should be noted that, the setting selection interface is configured to prompt the user to enter target data for retrieving the password. Specifically, the setting selection interface may provide only one entry interface to allow the user to enter, in a specified manner, the target data; or may provide a plurality of entry interfaces to allow the user to select one of or combine a plurality of the entry interfaces to enter the target data.

It should also be noted that, depending on different password entry interfaces, the password entered by the user may alternatively be a password of another type such as a payment password, in addition to the screen unlocking password and the login password. This is not specifically limited in this embodiment of this application.

It should be noted that, in this embodiment, after obtaining the password entered on the password entry interface by the user, the mobile terminal may not display the setting selection interface but may directly start the camera and display the camera preview interface, where on the camera preview interface, the user is prompted to aim the camera at a material object used for password verification.

Figure 6K:
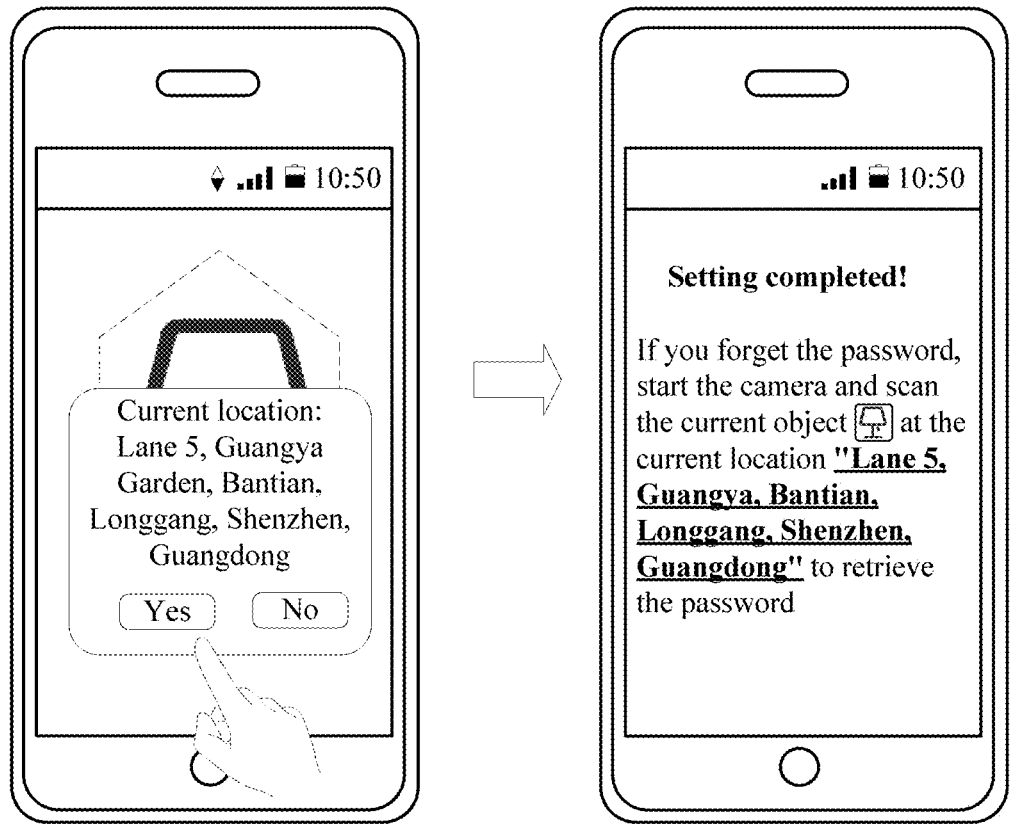
FIG. 6K is a schematic diagram of displaying a notification interface by a mobile terminal according to an embodiment of this application.
Figure 6L:
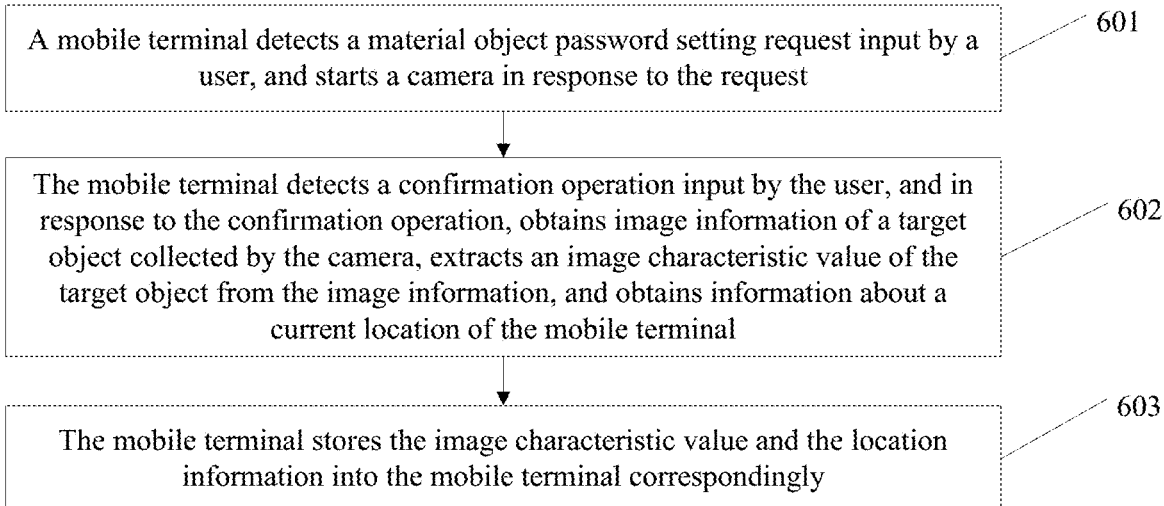
FIG. 6L is a flowchart of an embodiment of a password setting method according to an embodiment of this application.

In some embodiments, after storing the material object password, the mobile terminal may display a notification interface, to prompt the user that the material object password has been recorded. As shown in FIG. 6K, the user confirms that the location information obtained by the mobile terminal is correct, and taps "Yes". The mobile terminal stores the location information and the image characteristic value of the object correspondingly, and displays a result to the user, to instruct the user to scan, at this location, a material object into which the password has been stored, so as to retrieve the password when the user forgets the password.

In this embodiment of this application, the mobile terminal may collect, based on the operation of the user, the image characteristic value of the target object and the current location information by using the camera, and store the image characteristic value and the location information as a material object password into the mobile terminal correspondingly. When setting a password retrieval item, the user does not need to manually enter any information, but merely needs to aim the camera at a material object, to finish the setting, thereby facilitating a user operation and improving user experience.

Figure 7A:
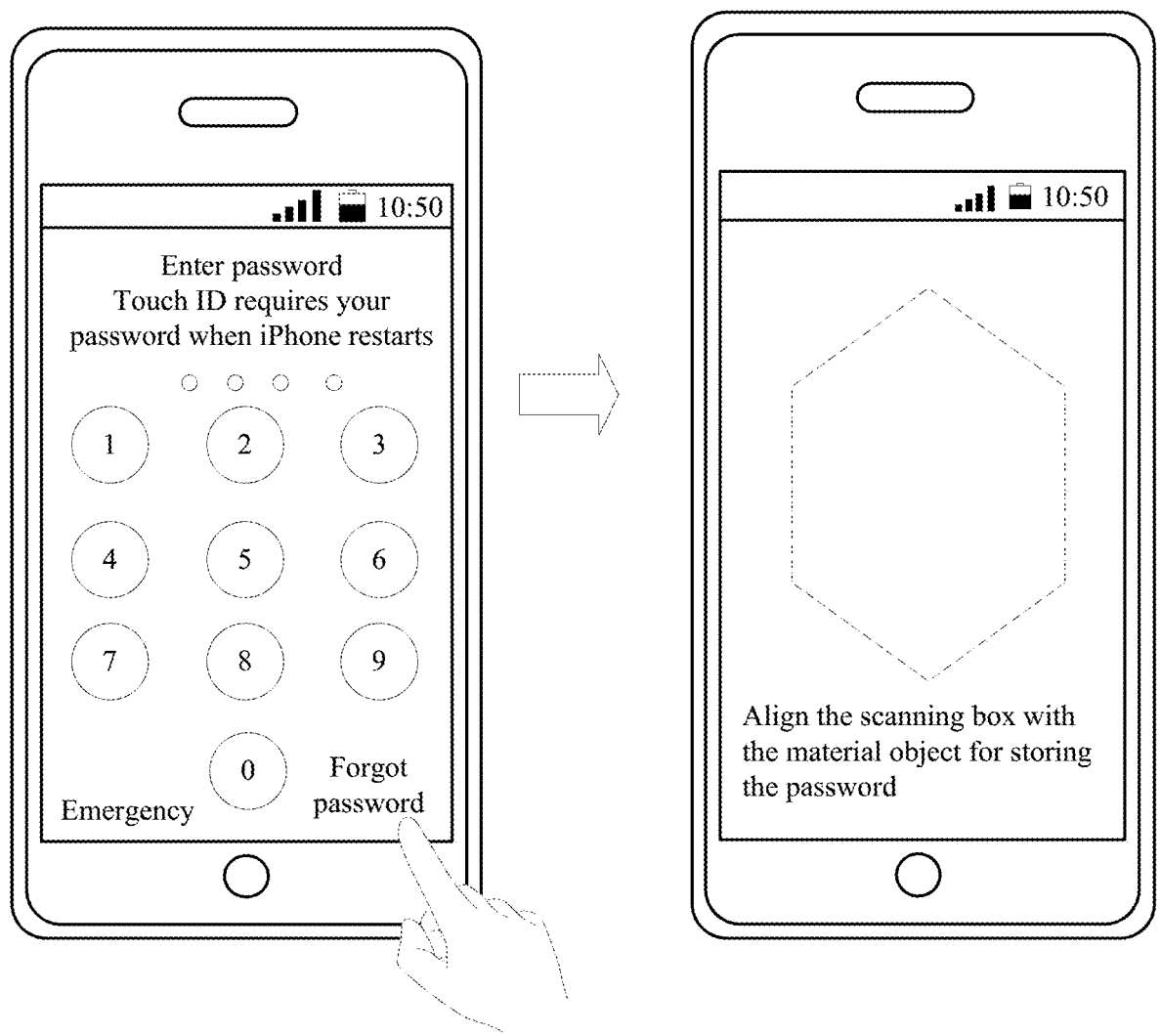
FIG. 7A is a schematic diagram of displaying a camera preview interface by a mobile terminal in response to an operation according to an embodiment of this application.
Figure 7B:
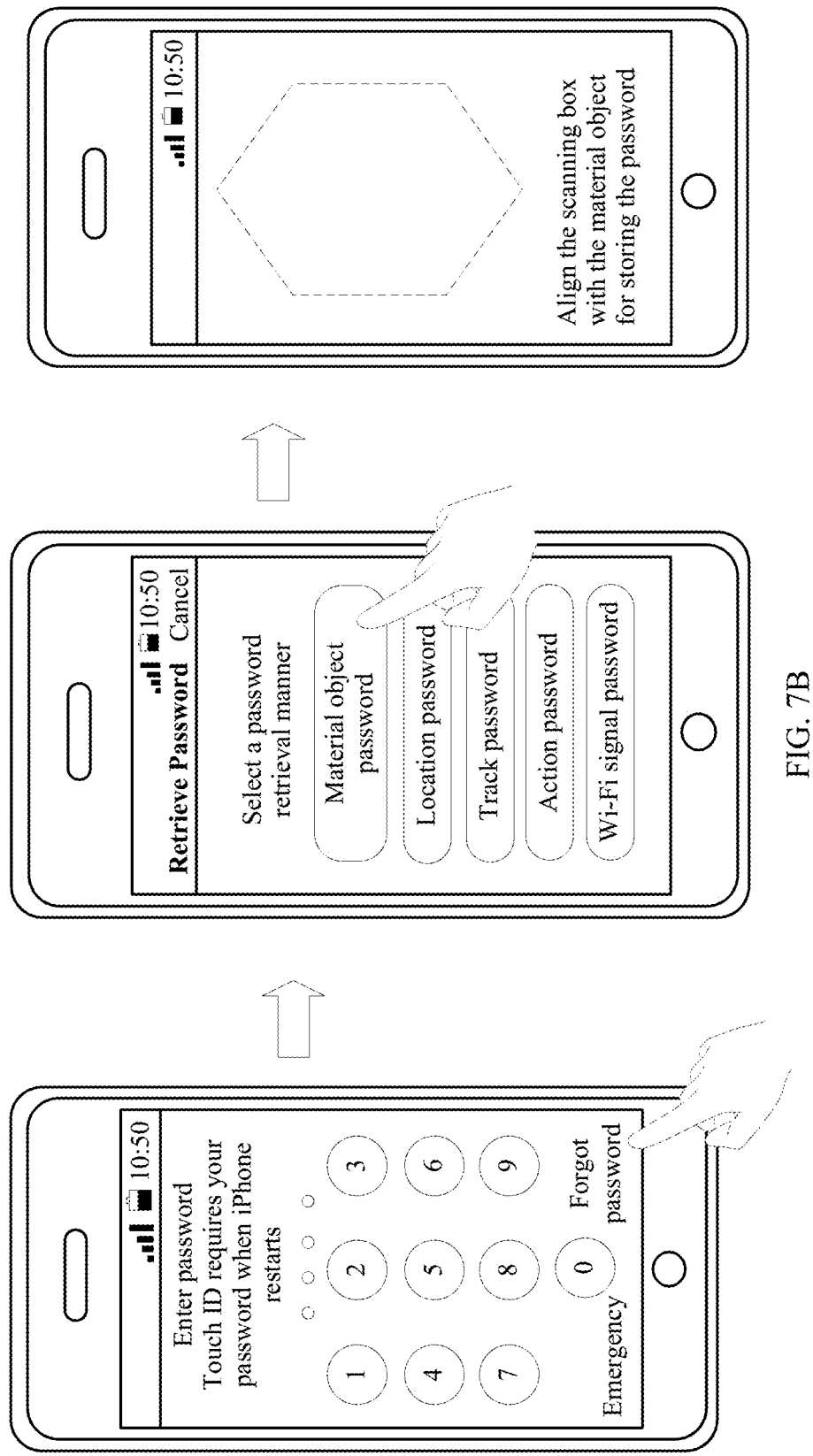
FIG. 7B is a schematic diagram of displaying a camera preview interface by a mobile terminal in response to an operation according to an embodiment of this application.

After the user sets the material object password in the manner corresponding to FIG. 6L, when the user requests for verification of the material object password, the mobile terminal may perform verification in the following process. As shown in FIG. 7F, an embodiment of a password verification method according to an embodiment of this application includes the following steps.

701. A mobile terminal detects a password verification request input by a user, and starts a camera in response to the request.

When the user forgets a login password, or a screen unlocking password, or a payment password, or another password, the user inputs a password retrieval request (an operation of requesting for password verification) on the mobile terminal, as shown in FIG. 2B or FIG. 2D. After detecting the password retrieval request input by the user, the mobile terminal starts the camera in response to the request, and displays a camera preview interface, as shown in FIG. 7A.

When the user needs to perform a corresponding function (for example, account login, screen unlocking, or payment), the user inputs a password entry request (an operation of requesting for password verification) on the mobile terminal. In response to the request, the mobile terminal starts the camera, and displays a camera preview interface. In an optional manner, when the user has set a plurality of password verification manners, after detecting an operation that is input by the user and that is of requesting for password verification, the mobile terminal may first display a selection interface. On the selection interface, the user selects a material object password manner for the verification. The mobile terminal starts the camera, and displays a camera preview interface, as shown in FIG. 7B.

702. The mobile terminal collects image information of an object by using the camera, and determines whether an image characteristic value extracted from the image information successfully matches an image characteristic value of a first preset image; and performs step 703 if the matching is successful, or performs step 705 if the matching is unsuccessful.

In an optional manner, after starting the camera, the mobile terminal may identify a scene obtained by the camera. When the mobile terminal has identified a specific object in a current scene, that is, when a specific object appears on the camera preview interface, the mobile terminal may collect image information of the object (collect a first image), and extract an image characteristic value of the object from the image information.

Figure 7C:
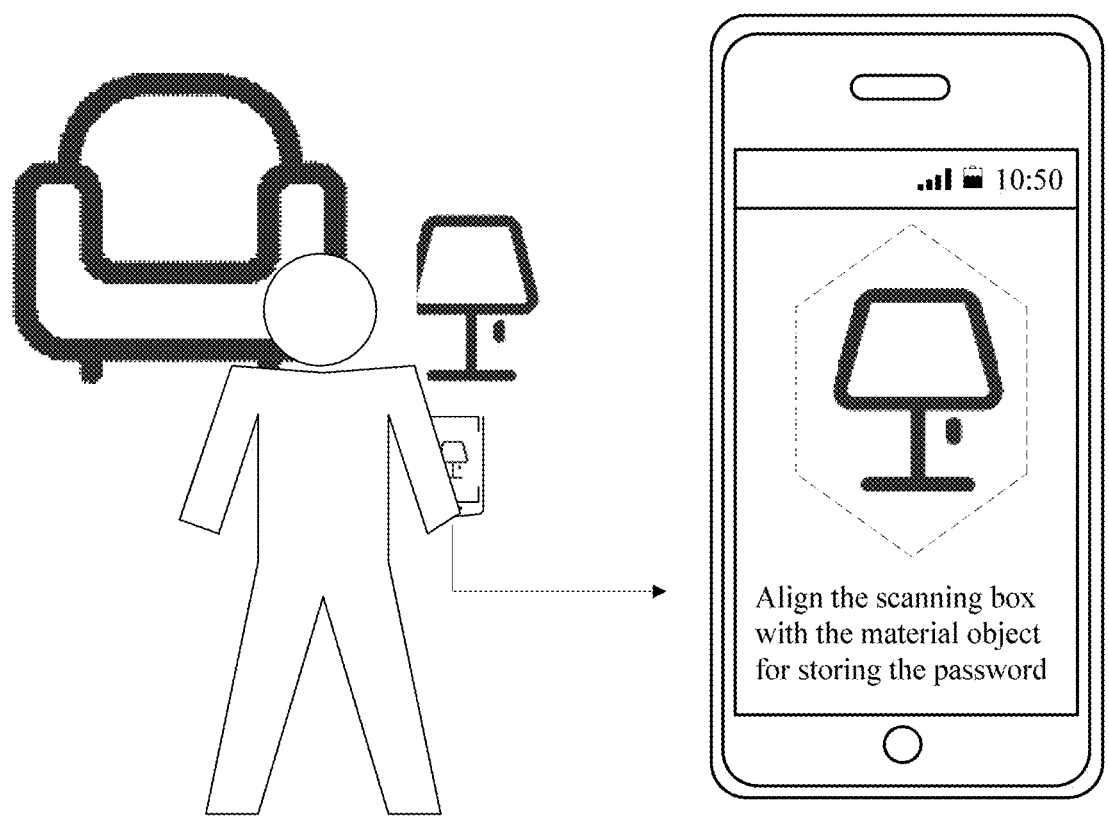
FIG. 7C is a schematic diagram of aiming a camera at an object by a user according to an embodiment of this application.

As shown in FIG. 7C, the user aims the camera of the mobile terminal at a desk lamp at home. The mobile terminal scans the object by using the camera, obtains image information of the desk lamp, and extracts an image characteristic value of the desk lamp from the image information.

In an optional manner, the camera preview interface displayed on the mobile terminal may include a confirmation button. The user moves the mobile terminal to aim the camera at an object, and taps the confirmation button. The mobile terminal detects the operation, collects image information of the object, and extracts an image characteristic value of the object from the image information.

After extracting the image characteristic value, the mobile terminal determines whether the image characteristic value successfully matches the image characteristic value of the first preset image. If the matching is successful (a first matching condition is satisfied), the mobile terminal performs step 703. If the matching is unsuccessful, the mobile terminal performs step 705. Specifically, the mobile terminal may determine, by using an image matching algorithm, whether the image characteristic value successfully matches the image characteristic value of the first preset image.

It should be understood that, the image characteristic value of the first preset image is a verification image corresponding to the password verification request, and is an image characteristic value (corresponding to the image characteristic value of the first verification image in the embodiment corresponding to FIG. 6L) extracted by the mobile terminal during the setting of the material object password.

703. The mobile terminal obtains current location information of the mobile terminal, and performs matching between the location information and preset location information; and performs step 704 if the matching is successful, or performs step 705 if the matching is unsuccessful.

When the image characteristic value extracted by the mobile terminal successfully matches the image characteristic value of the first preset image, the mobile terminal determines whether a location indicated by the preset location information is the same as a location indicated by the current location information. If the two are the same, it is considered that the location information matching is successful (a second matching condition is satisfied), and the mobile terminal performs step 704.

It should be understood that, the preset location information is verification information corresponding to the password verification request, and is location information (corresponding to the location verification information in the embodiment corresponding to FIG. 6L) of the mobile terminal obtained by the mobile terminal during the setting of the material object password.

704. The mobile terminal determines that the password verification succeeds.

If the obtained location information successfully matches the preset location information, it is considered that the password verification succeeds.

In an optional manner, for the password entry request, after the password verification succeeds, the mobile terminal may perform an operation, such as releasing password lock, allowing account login, allowing payment, starting an encrypted application, displaying an encrypted file, or displaying an encrypted album.

In an optional manner, for the password retrieval request, after the password verification succeeds, the mobile terminal may display a to-be-retrieved password, or display prompt information (namely, password prompt information) of the password, or display an interface for resetting the password so that the user can reset the password.

The mobile terminal may display the to-be-retrieved password specifically in the following manners.

Figure 7D:
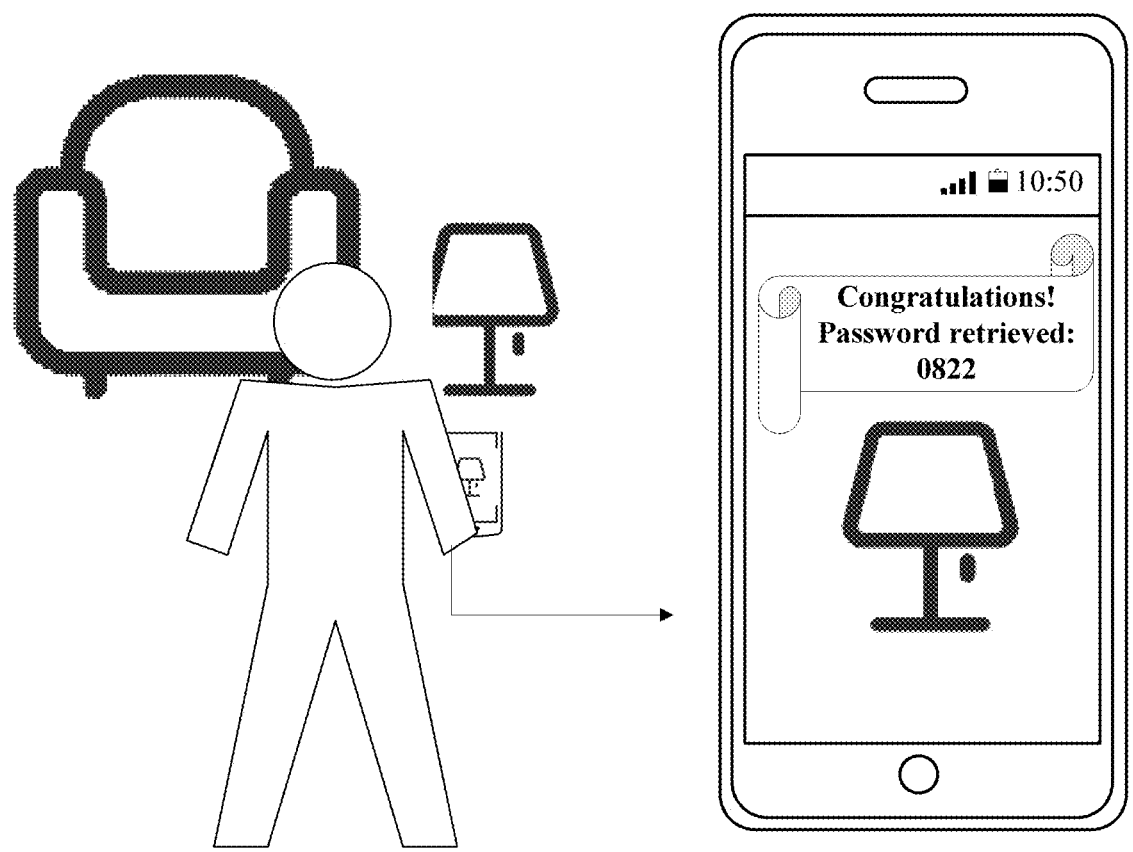
FIG. 7D is a schematic diagram of displaying a password by a mobile terminal according to an embodiment of this application.

The mobile terminal displays the password in a form of an animation on the camera preview interface by combining an image collected by the camera. As shown in FIG. 7D, after the matching is successful, the mobile terminal slowly expands a banner above the desk lamp on the camera preview interface, where content of the banner is the to-be-retrieved password.

Figure 7E:
FIG. 7E is a schematic diagram of displaying a password by a mobile terminal according to an embodiment of this application.
Figure 7F:
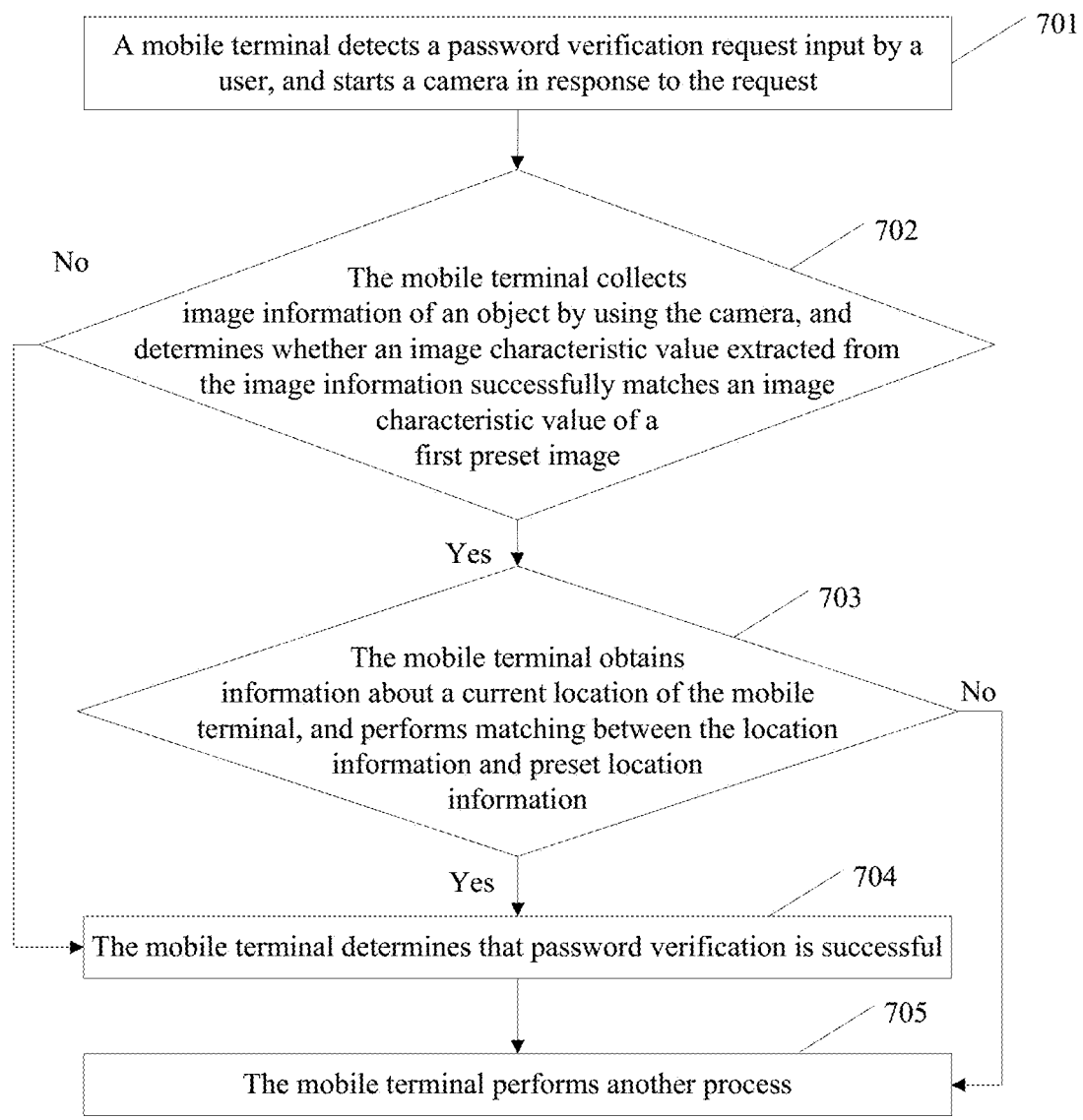
FIG. 7F is a flowchart of an embodiment of a password verification method according to an embodiment of this application.

The mobile terminal does not display the camera preview interface, but displays another interface showing the password, as shown in FIG. 7E.

The user may reset the password in the following manner:

After the verification is successful, the mobile terminal displays a link to an interface for setting the password to be retrieved by the user. The user taps the link to access the setting interface, and sets a new password on the setting interface.

Alternatively, after the verification is successful, the mobile terminal displays an interface for setting the password to be retrieved by the user. The user may set a new password on the setting interface.

After setting the new password, the user may perform an operation, such as screen unlocking, account login, or payment, by using the specified new password on the mobile terminal.

705. The mobile terminal performs another process.

If the obtained image characteristic value does not satisfy the first matching condition and/or the location information does not satisfy the second matching condition, the mobile terminal may perform another process, for example, display prompt information to notify the user of a verification failure, or display the camera preview interface again to prompt the user to perform other verification.

In this embodiment of this application, the mobile terminal may collect, based on the operation of the user, the image characteristic value of the object and the current location information by using the camera; perform matching between the image characteristic value and the location information, and a pre-stored material object password; and display the password if the matching is successful. When the user forgets the password, the user does not need to rely on another device or manually enter any information, but merely needs to aim, at the location selected during the setting of the material object password, the camera at the material object selected during the setting of the material object password, to retrieve the password, thereby facilitating a user operation and improving user experience.

In addition, the user may select a safe place and select a common material object in life as the material object password for retrieving the password, for example, select a television set or a desk lamp at home. This facilitates memorization of the user and prevents an unauthorized user from retrieving the password from another place after stealing the mobile terminal, thereby guaranteeing user information security and improving user experience.

2. Track Password

The following first describes in detail a process of setting a track password. As shown in FIG. 8G, an embodiment of a password setting method according to an embodiment of this application includes the following steps.

801. A mobile terminal detects a track password setting request input by a user, and starts a camera in response to the request.

The user inputs the track password setting request, for example, taps a corresponding control on a screen, to trigger the track password setting request. In response to the request, the mobile terminal starts the camera, and presents a camera preview interface on the screen.

Figure 8A:
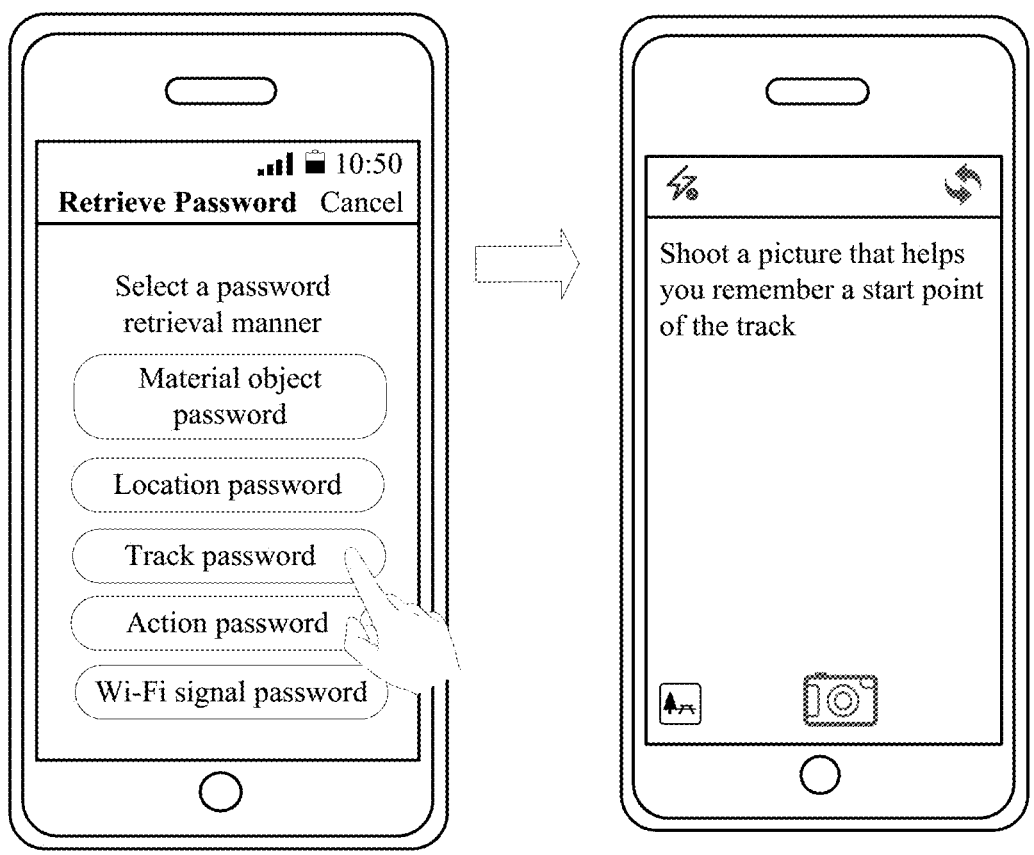
FIG. 8A is a schematic diagram of displaying a camera preview interface by a mobile terminal in response to an operation according to an embodiment of this application.

In an optional manner, the camera preview interface may include a shooting button and prompt information, where the shooting button is used to start a shooting function, and the prompt information is used to prompt the user to shoot a start-point picture for password verification, as shown in FIG. 8A.

802. The mobile terminal detects a start operation input by the user, and in response to the operation, collects a start-point picture by using the camera, and starts to record behavior information of the user from a first moment.

The user walks to a start point of a to-be-recorded track, aims the camera at a particular location, and inputs the start operation to trigger the shooting function of the mobile terminal. In response to the start operation, the mobile terminal obtains the start-point picture (collects a first verification image) by using the camera, and stores image information currently displayed on the camera preview interface into the mobile terminal.

In an optional manner, the start-point picture corresponds to a first matching condition. During the track password verification, if an image collected by the camera is the same as the start-point picture, it is considered that the image satisfies the first matching condition. In an optional manner, the start-point picture may be used as prompt information; and when the track password verification request is detected, the start-point picture is displayed, to prompt for a start location corresponding to the track password.

The start operation may be: touching a shooting button on the camera preview interface, or tapping a hardware button on the mobile terminal, or sliding on the camera preview interface with a predefined gesture, or another operation. This is not specifically limited in this application.

Figure 8B:
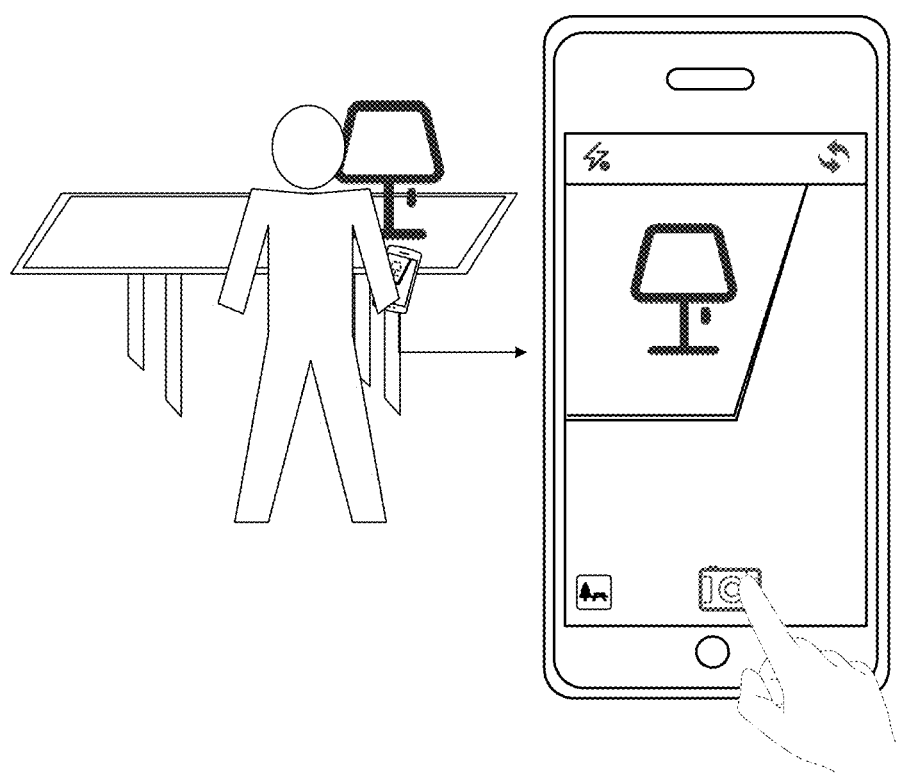
FIG. 8B is a schematic diagram of inputting a start operation by a user according to an embodiment of this application.

For example, the user intends to use an edge of a desk in a room of the user as a start point, and there is a desk lamp at the edge of the desk. Then the user aims a mobile phone at the desk lamp and a corner of the desk, and presses a shooting button on a preview interface. The mobile phone stores a shot picture as a start-point picture into the mobile phone, as shown in FIG. 8B.

After obtaining the start-point picture, the mobile terminal starts to record behavior information of the user. In this embodiment, a moment at which the behavior information starts to be recorded is referred to as the first moment; and the recorded motion information may include a quantity of steps that the user has walked (and a length of a step of motion of the user) and location information corresponding to each step, or may further include other information such as motion duration, and is not specifically limited herein.

Specifically, the mobile terminal may record location information of the user by using a GPS, and record, by using a pedometer, the quantity of steps that the user has walked. The location information may be address information, or may be longitude information and latitude information, or may be other information that can be used to identify a location, and is not specifically limited in this application.

Figure 8C:
FIG. 8C is a prompt interface displayed by a mobile terminal according to an embodiment of this application.

In an optional manner, after obtaining the start-point picture, the mobile terminal may disable the camera and display a prompt interface on the screen, as shown in FIG. 8C. The prompt interface may include a "Finish recording" button and prompt information. The prompt information is used to prompt the user to carry the mobile terminal and start recording track information of a to-be-stored password. The "Finish recording" button is used to stop recording the location information and the information about the quantity of steps.

In an optional manner, after obtaining the start-point picture, the mobile terminal may disable the camera and may not display any interface, that is, the mobile terminal is in a screen-off state.

In an optional manner, after obtaining the start-point picture, the mobile terminal may disable the camera and may display a motion information presentation interface on the screen, to display a current-location of the user and/or a current accumulated quantity of steps of the user in real time.

803. The mobile terminal detects a stop operation input by the user, and in response to the operation, stops, at a second moment, recording the motion information of the user, and stores, into the mobile terminal, motion information recorded from the first moment to the second moment.

After shooting the start-point picture (that is, after the mobile terminal starts to record the behavior information), the user begins to walk while carrying the mobile terminal. After walking for a distance, the user inputs a stop operation on the mobile terminal. In response to the stop operation, the mobile terminal stops recording the behavior information of the user in a walking process. The stop operation may be: tapping the "Finish Recording" button on the prompt interface, tapping the hardware button on the mobile terminal, or inputting a predefined gesture on the screen, or another operation.

In this embodiment, a moment at which the mobile terminal stops recording the motion information is referred to as the second moment. After the mobile terminal stops recording the walking information, accumulated behavior information (behavior verification information) from the first moment to the second moment may be stored as a track password into the mobile terminal. Specifically, the mobile terminal may store, into the mobile terminal, an accumulated quantity of steps that the user has walked from the first moment to the second moment and location information corresponding to each step. The behavior verification information corresponds to a second matching condition. During the track password verification, if motion information obtained by the mobile terminal includes the same behavior verification information, it is considered that the motion information of the mobile terminal satisfies the second matching condition.

Figure 8D:
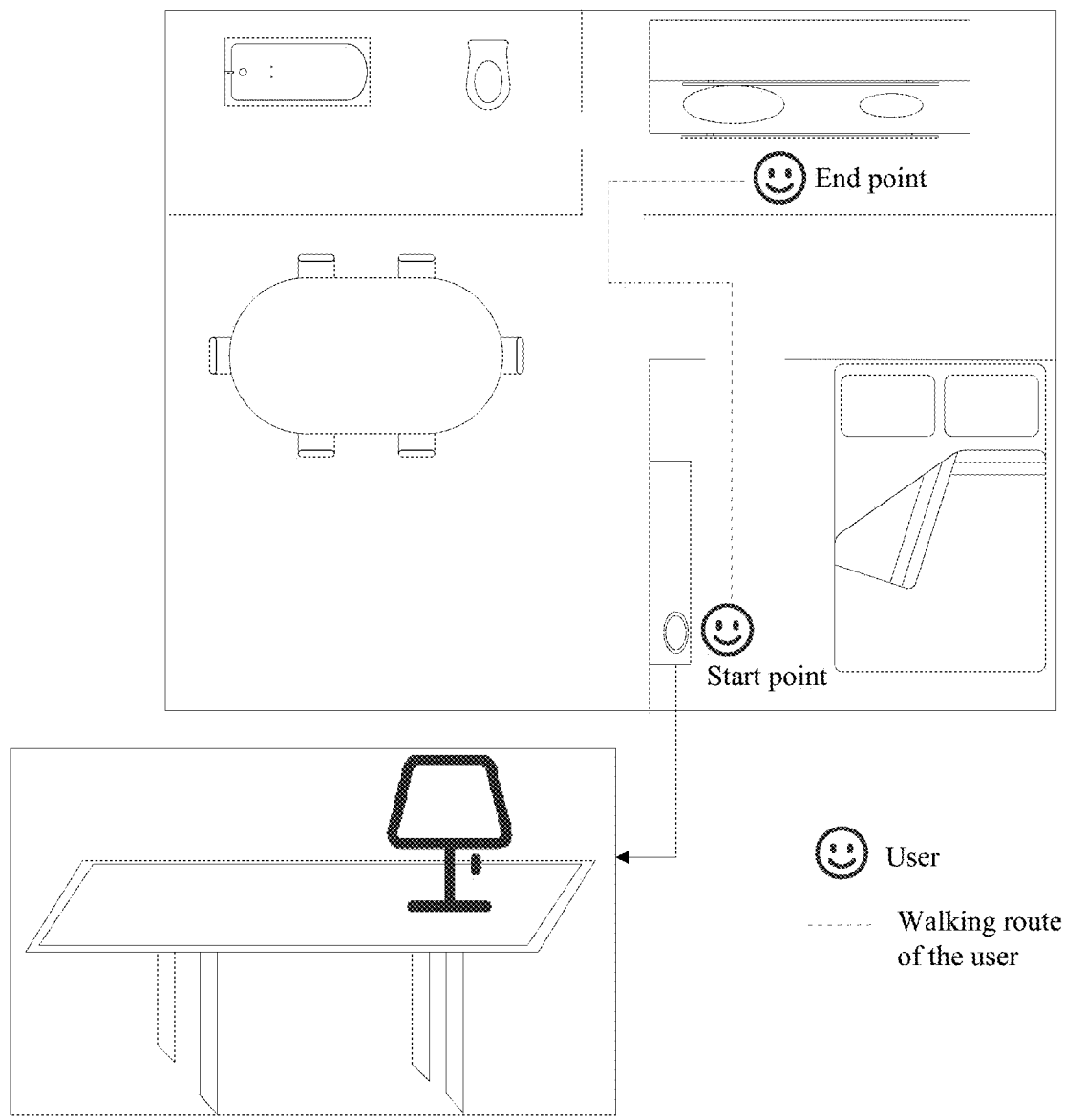
FIG. 8D is a schematic diagram of a walking track of a user holding a mobile terminal according to an embodiment of this application.
Figure 8E:
FIG. 8E is a schematic diagram of inputting a stop operation by a user according to an embodiment of this application.

An example is given below for description. The user uses an edge of a desk in a room as a start point, and stands at the start point to shoot a start-point picture, as shown in FIG. 8B. After storing the start-point picture, the mobile terminal displays a prompt interface shown in FIG. 8C, and starts to record a location of the user and a quantity of steps of the user. The user starts walking from the edge of the desk in the room while carrying a mobile phone according to a prompt. A walking route is shown in FIG. 8D. The user walks to the front of a gas stove in a kitchen, and taps an "End" button on the prompt interface, as shown in FIG. 8E. The mobile terminal stops recording the location of the user and the quantity of steps of the user, and stores, as a track password into the mobile terminal, a location corresponding to each step that the user has walked in this process and an accumulated quantity of steps that the user has walked in this process.

Figure 8F:
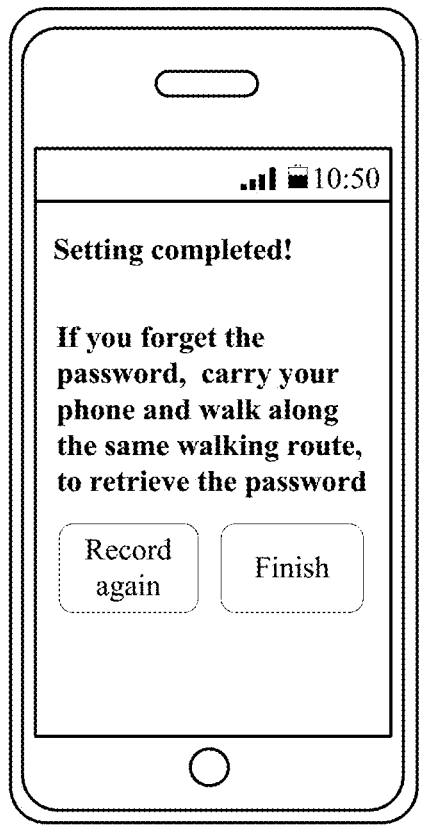
FIG. 8F is a schematic diagram of displaying a notification interface by a mobile terminal according to an embodiment of this application.
Figure 8G:
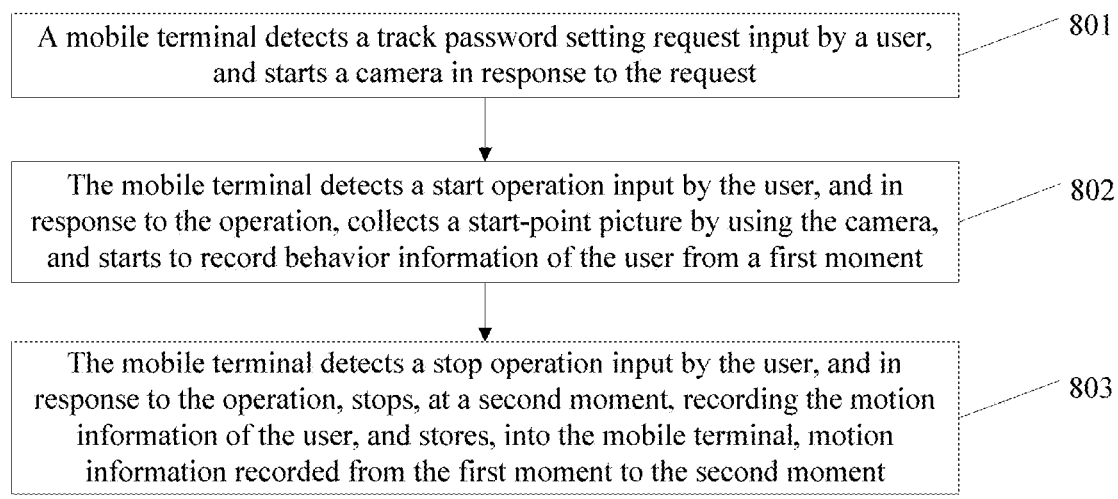
FIG. 8G is a flowchart of an embodiment of a password setting method according to an embodiment of this application.

In an optional manner, after storing the behavior information, the mobile terminal may display a notification interface, to notify the user that the track password has been recorded, as shown in FIG. 8F, where this interface may further include a "Finish" button and a "Record again" button. When the user taps the "Finish" button on this interface, a main interface, or a login interface, or another interface of the mobile terminal may be displayed. When the user taps the "Record again" button on this interface, the mobile terminal may start the camera and perform the foregoing steps 802 to 803, to replace the originally stored behavior information with newly recorded behavior information and to store the newly recorded behavior information as the track password into the mobile terminal.

In some embodiments, the track password (that is, the behavior verification information) may be used to verify a conventional password. When the user needs to perform a corresponding function (for example, account login, screen unlocking, or payment), the user performs a corresponding operation on the mobile terminal to enter the track password and then verification is successful. Then the mobile terminal may perform an operation, such as releasing password lock, allowing account login, or allowing payment.

In some embodiments, the track password may be further used to retrieve a conventional password. When the user forgets the password, the user performs a corresponding operation on the mobile terminal to enter the track password and then verification is successful. The mobile terminal may display the to-be-retrieved password, or display prompt information (namely, password prompt information) of the password, or display an interface for resetting the password so that the user can reset the password.

In this embodiment, the mobile terminal needs to pre-store prompt information of the password, or pre-store characteristic data (for example, a password resetting link) that exists in a server and that corresponds to the password, or pre-store the to-be-retried password requested by the user. (For a specific storage process, refer to S1 and S2 in the embodiment corresponding to FIG. 6L.) In this embodiment of this application, the mobile terminal may record, based on the operation of the user, the behavior information of the user by using a sensor, and store the behavior information as the track password into the mobile terminal. When setting a password retrieval item, the user does not need to manually enter any information, but merely needs to walk for a distance while holding the mobile terminal, to finish the setting, thereby facilitating a user operation and improving user experience.

After the user sets the track password in the manner corresponding to FIG. 8G, when the user requests for verification of the track password, the mobile terminal may perform verification in the following process. As shown in FIG. 9H, an embodiment of a password verification method according to an embodiment of this application includes the following steps.

901. A mobile terminal detects a password verification request input by a user, and displays a start-point picture in response to the request.

When the user forgets a login password, or a screen unlocking password, or a payment password, or another password, the user inputs a password retrieval request (the password verification request) on the mobile terminal, as shown in FIG. 2B or FIG. 2D. After detecting the password retrieval request input by the user, the mobile terminal finds, from a database in response to the request, a start-point picture corresponding to a to-be-retrieved password requested by the user, and displays the start-point picture on a prompt interface.

Alternatively, when the user needs to perform a corresponding function (for example, account login, screen unlocking, or payment), the user inputs a password entry request (the password verification request) on the mobile terminal. In response to the request, the mobile terminal finds, from a database, a start-point picture corresponding to the password entry request, and displays the start-point picture on a prompt interface.

Figure 9A:
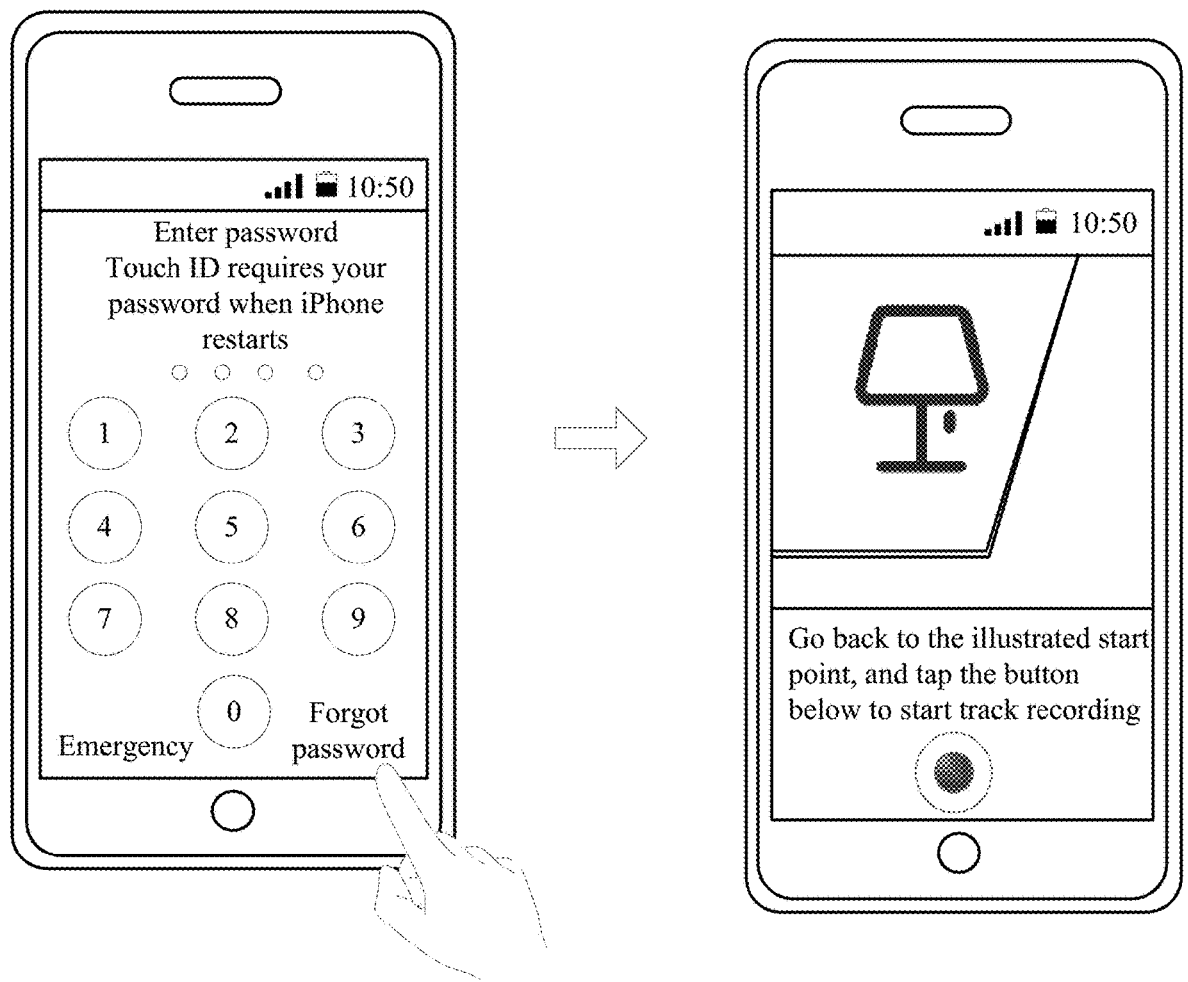
FIG. 9A is a schematic diagram of displaying a start-point picture by a mobile terminal in response to an operation according to an embodiment of this application.

The prompt interface may include a "Record" button, and the "Record" button is used to trigger the mobile terminal to start recording motion information of the user, as shown in FIG. 9A.

Figure 9B:
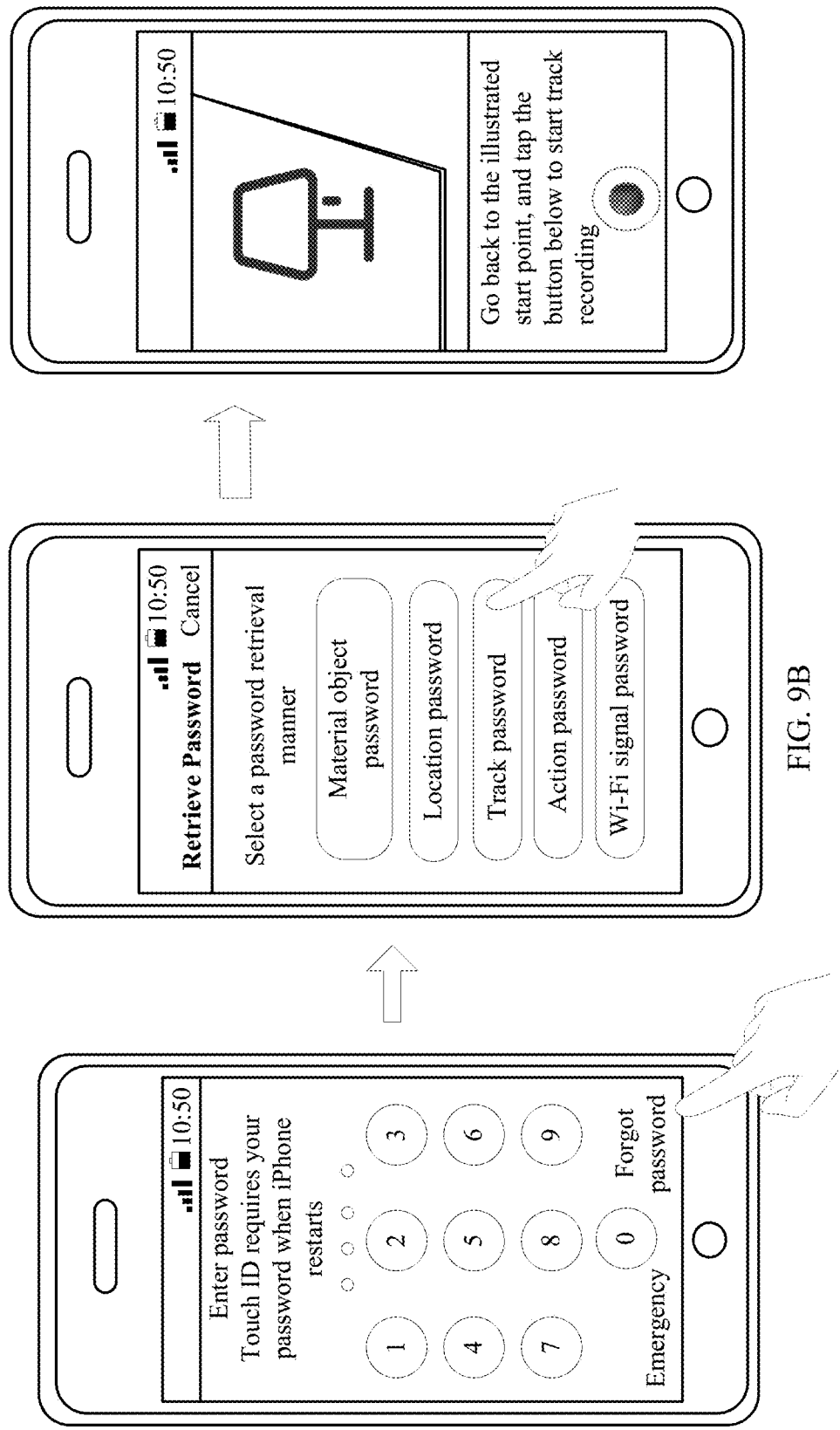
FIG. 9B is a schematic diagram of displaying a start-point picture by a mobile terminal in response to an operation according to an embodiment of this application.

It should be understood that the start-point picture is used to prompt for a start location corresponding to the track password. In some embodiments, the mobile terminal may not display the start-point picture, and this is not specifically limited in this application. In an optional manner, when the user has set a plurality of password verification manners, after detecting the password verification request input by the user, the mobile terminal may first display a selection interface. On the selection interface, the user selects a track password manner for the verification. The mobile terminal displays the start-point picture, as shown in FIG. 9B.

902. The mobile terminal detects a start operation input by the user, and starts, in response to the operation, to record behavior information of the user from a first moment.

The user walks to a specific location, and inputs a start operation on the mobile terminal, for example, touches a "Record" button on a prompt interface, or taps entity hardware of the mobile terminal, or slides on a screen with a predefined gesture. In response to the start operation, the mobile terminal starts to record the behavior information of the user.

A moment at which the behavior information starts to be recorded is referred to as the first moment; and the recorded behavior information may include a quantity of steps that the user has walked and location information corresponding to each step, or may further include other information such as motion duration, and is not specifically limited herein.

Specifically, the mobile terminal may record location information of the user by using a GPS, and record, by using a pedometer, the quantity of steps that the user has walked. The location information may be address information, or may be longitude information and latitude information, or may be other information that can be used to identify a location, and is not specifically limited in this application.

Figure 9C:
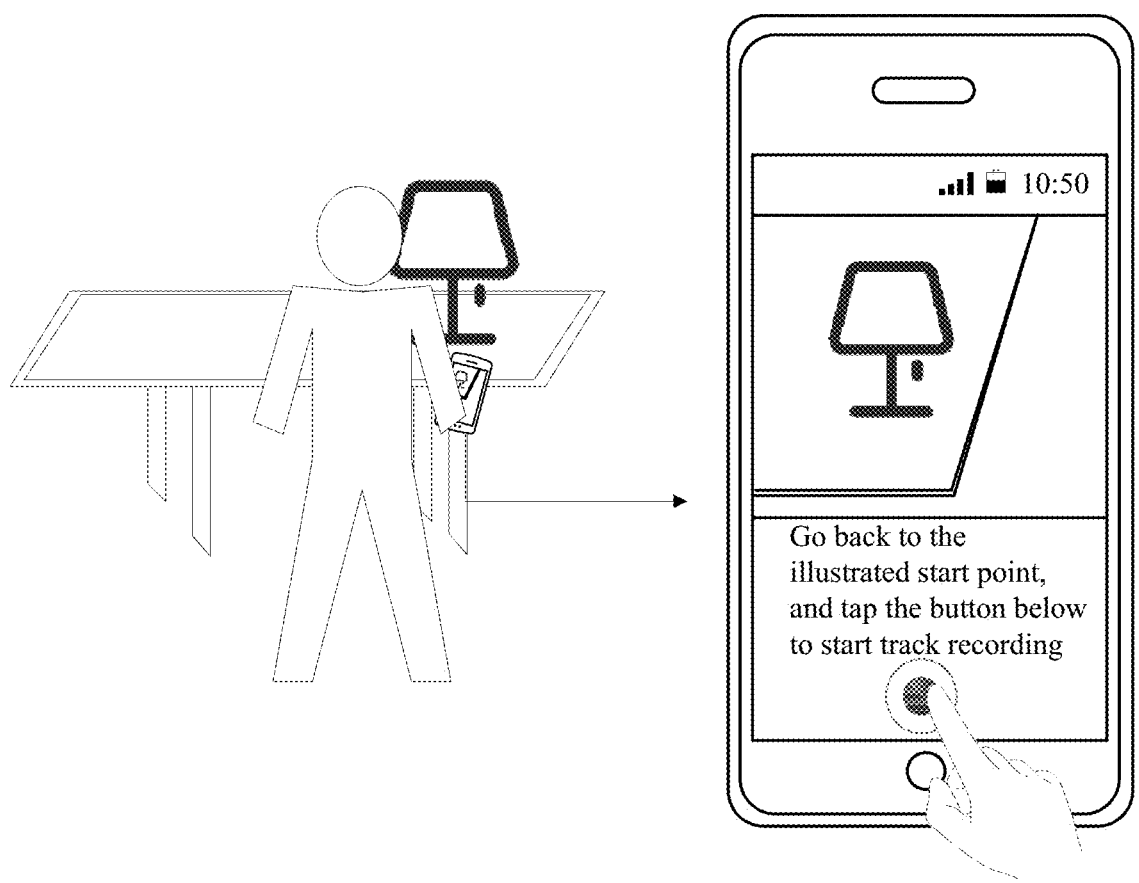
FIG. 9C is a schematic diagram of inputting a start operation by a user at a location corresponding to a start-point picture according to an embodiment of this application.

For example, the user sees the start-point picture on a prompt interface, and learns that a start point of a track of the to-be-retrieved password is beside a desk lamp on a desk in a room of the user. The user walks and goes beside the desk lamp, taps a "Record" button on the prompt interface, to trigger the mobile terminal to start recording the track, that is, to start recording behavior information of the user, as shown in FIG. 9C.

In an optional manner, the mobile terminal may further collect, in response to the start operation, a first image by using the camera, and determine whether the first image successfully matches the start-point picture. If the matching is successful (a first matching condition is satisfied), the mobile terminal determines that the first image satisfies the first matching condition, and then the mobile terminal starts to record the behavior information of the user. Specifically, the determining whether the first image successfully matches the start-point picture may specifically be: determining whether an image characteristic value of the first image is consistent with an image characteristic value of the start-point picture, and if yes, determining that the matching is successful.

Figure 9D:
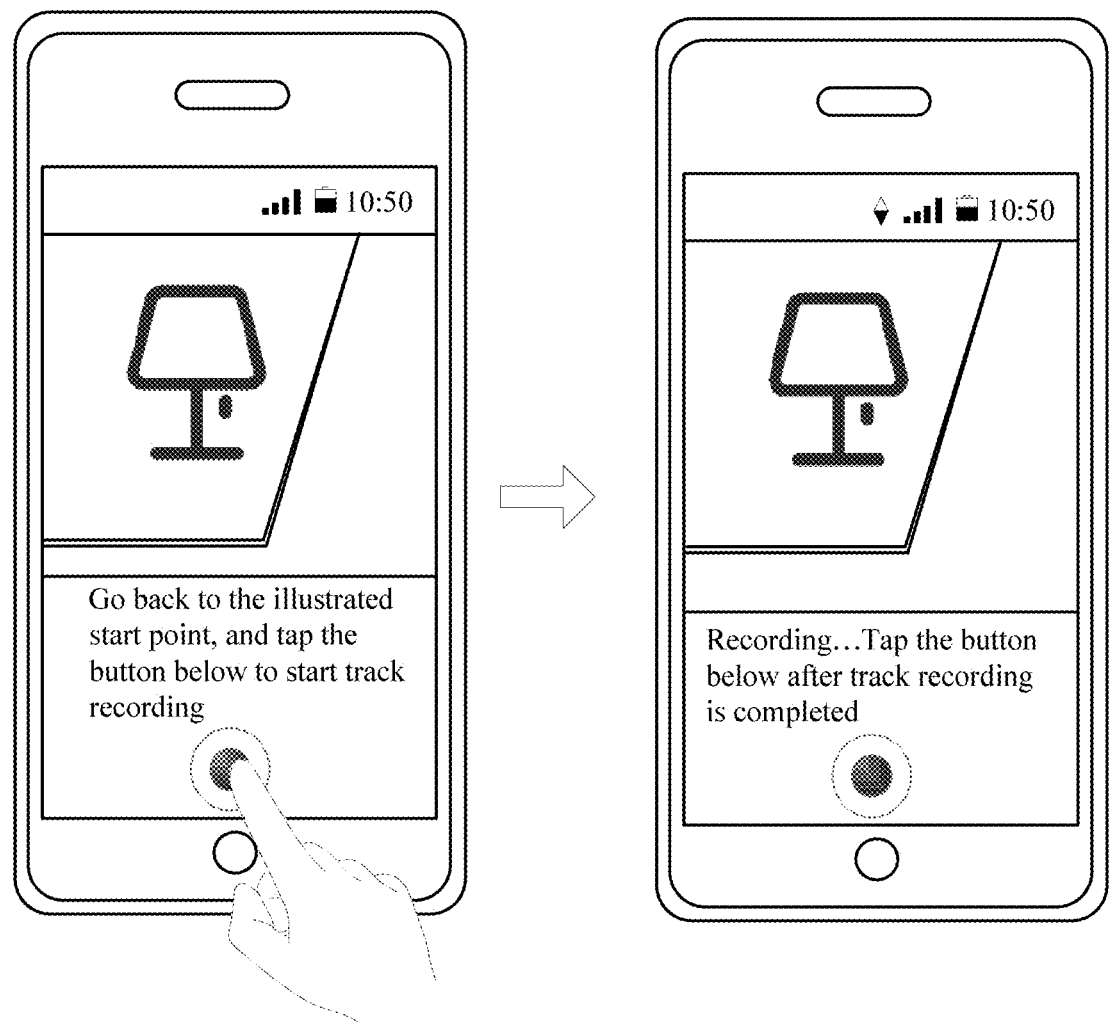
FIG. 9D is a schematic diagram of displaying a prompt interface by a mobile terminal in response to a start operation according to an embodiment of this application.

In an optional manner, the prompt interface may continue to be displayed on the screen when the mobile terminal starts to record the behavior information of the user, and in this case, the "Record" button is used to trigger the mobile terminal to stop recording the behavior information of the user, as shown in FIG. 9D.

In an optional manner, no interface may be displayed on the screen at the same time when the mobile terminal starts to record the behavior information of the user, that is, the mobile terminal is in a screen-off state.

In an optional manner, a behavior information presentation interface may be displayed on the screen when the mobile terminal starts to record the behavior information of the user, to display a current-location of the user and/or a current accumulated quantity of steps of the user in real time.

903. The mobile terminal detects a stop operation input by the user, and stops, at a second moment in response to the operation, recording the motion information of the user.

After the user walks for a track while carrying the mobile terminal, the user inputs a stop operation on the mobile terminal, for example, touches the "Record" button on the prompt interface, taps the entity hardware of the mobile terminal, or slides on the screen with a predefined gesture. The mobile terminal stops, in response to the stop operation, recording the stopping information of the user. In this embodiment, a moment at which the recording of the motion information is stopped is referred to as the second moment.

Figure 9E:
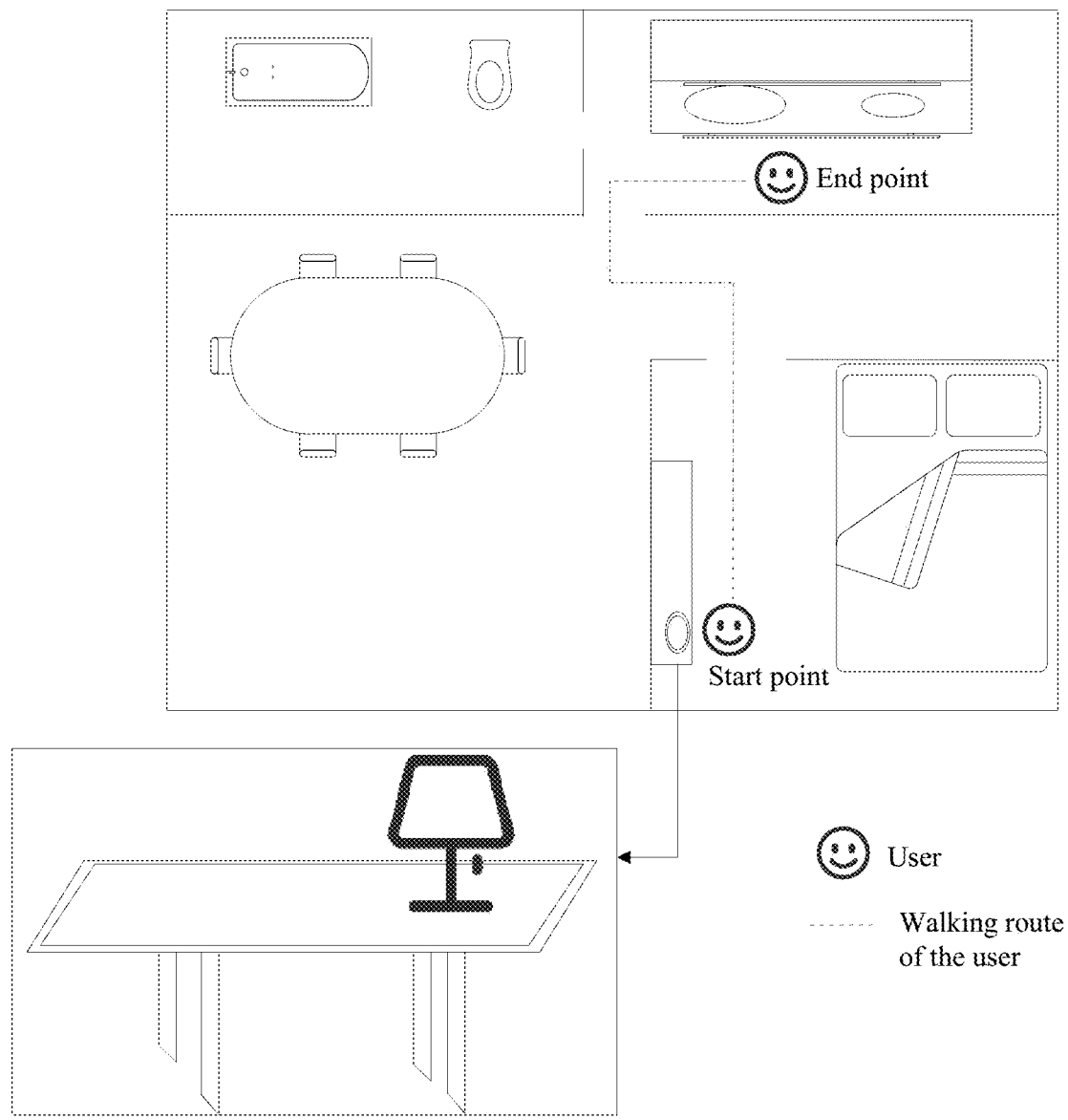
FIG. 9E is a schematic diagram of a walking track of a user holding a mobile terminal according to an embodiment of this application.
Figure 9F:
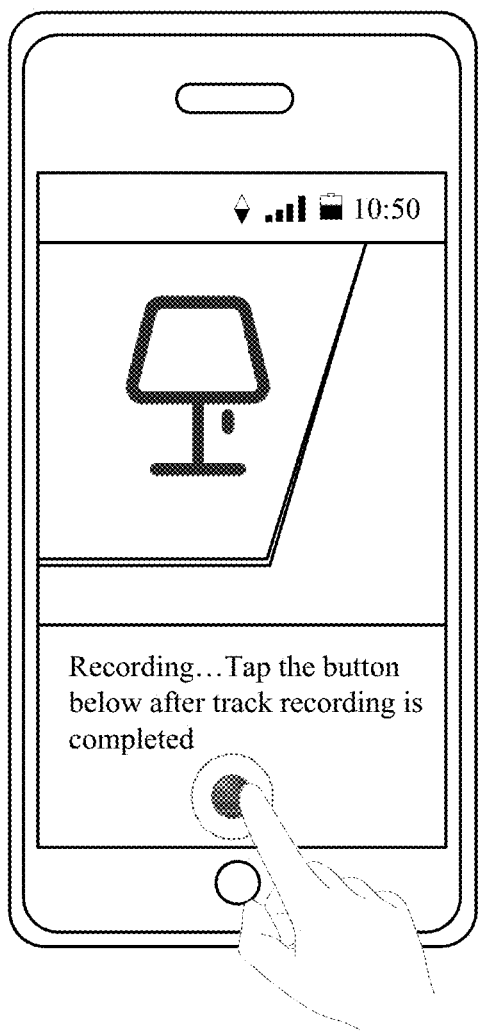
FIG. 9F is a schematic diagram of inputting a stop operation by a user according to an embodiment of this application.

An example is given below for description. The user uses an edge of a desk in a room as a start point, and stands at the start point to tap a "Record" button, as shown in FIG. 9C. In response to the operation, the mobile terminal displays a prompt interface shown by a right figure in FIG. 9D, and starts to record a location of the user and a quantity of steps of the user. The user starts walking from the edge of the desk in the room while carrying a mobile phone. A walking route is shown in FIG. 9E. The user walks to the front of a gas stove in a kitchen, and taps the "Record" button on the prompt interface, as shown in FIG. 9F. The mobile terminal stops recording the location of the user and the quantity of steps of the user.

904. The mobile terminal performs matching between the preset behavior information and behavior information recorded from the first moment to the second moment; and performs step 905 if the matching is successful, or performs step 906 if the matching is unsuccessful.

After stopping recording the behavior information of the user, the mobile terminal may obtain an accumulated quantity of steps that the user has walked from the first moment to the second moment and a location corresponding to each step. The mobile terminal performs matching between preset behavior information corresponding to the password verification request and the accumulated quantity of walked steps and the location corresponding to each step; and performs step 905 if the matching is successful, or performs step 906 if the matching is unsuccessful. The preset behavior information is an accumulated quantity of walked steps of the user and a location corresponding to each step that are recorded when the user sets the track password.

In an optional manner, if the accumulated quantity of walked steps recorded by the mobile terminal from the first moment to the second moment is the same as the accumulated quantity of walked steps recorded when the user sets the track password, and the location corresponding to each step is the same as the location corresponding to each step recorded when the user sets the track password, the matching is successful (a second matching condition is satisfied). In other words, for successful matching, the quantity of steps recorded when the user requests for password verification needs to be the same as the quantity of steps recorded when the user sets the track password, and the location corresponding to each step recorded when the user requests for password verification also needs to be the same as the location corresponding to each step recorded when the user sets the track password.

In an optional manner, if a difference between the accumulated quantity of walked steps recorded by the mobile terminal from the first moment to the second moment and the accumulated quantity of walked steps recorded when the user sets the track password is within an error range, and locations recorded by the mobile terminal from the first moment to the second moment are the same as locations recorded when the user sets the track password, the matching is successful (a second matching condition is satisfied). In other words, in this embodiment, the accumulated quantities of walked steps may not be completely the same, but an error may be permitted. When the quantities of steps are not the same, the locations corresponding to each step cannot be compared; and then it is considered that the matching is successful, provided that all locations (namely, locations recorded by the mobile terminal) that the user had walked during the setting of the track password by the user are included in the locations recorded by the mobile terminal during the password verification. Alternatively, when locations corresponding to a quantity of steps in a preset proportion to the accumulated quantity of walked steps are the same as locations recorded when the user sets the track password, it is considered that the matching is successful.

An example is given below for description. As shown in FIG. 9E, the user walks from a room to a kitchen, totaling 30 steps, where longitude and latitude information corresponding to the 1st step to the 15th step is (N22° 37' 18.25", E114° 03' 40.58"), longitude and latitude information corresponding to the 16th step to the 20th step is (N22° 37' 18.22", E114° 03' 40.58"), and longitude and latitude information corresponding to the 21st step to the 30th step is (N22° 37' 18.25", E114° 03' 40.55"). An accumulated quantity of walked steps read from a database indicates 31 steps, where longitude and latitude information corresponding to the 1st step to the 15th step is (N22° 37' 18.25", E114° 03' 40.58"), longitude and latitude information corresponding to the 16th step to the 20th step is (N22° 37' 18.22", E114° 03' 40.58"), and longitude and latitude information corresponding to the 21st step to the 31st step is (N22° 37' 18.25", E114° 03' 40.55"). The mobile terminal compares the accumulated quantities of walked steps, and obtains a difference 1 that falls within the error range. In addition, locations read from the database (that is, the locations recorded when the user sets the track password) are all recorded during a walking process of the user. The mobile terminal determines that the matching is successful.

905. The mobile terminal determines that the verification is successful.

When the mobile terminal determines that the behavior information recorded from the first moment to the second moment successfully matches the preset behavior information, the mobile terminal determines that the password verification succeeds.

In an optional manner, for the password entry request, after the password verification succeeds, the mobile terminal may perform an operation, such as releasing password lock, allowing account login, allowing payment, starting an encrypted application, displaying an encrypted file, or displaying an encrypted album.

Figure 9G:
FIG. 9G is a schematic diagram of displaying a password by a mobile terminal according to an embodiment of this application.
Figure 9H:
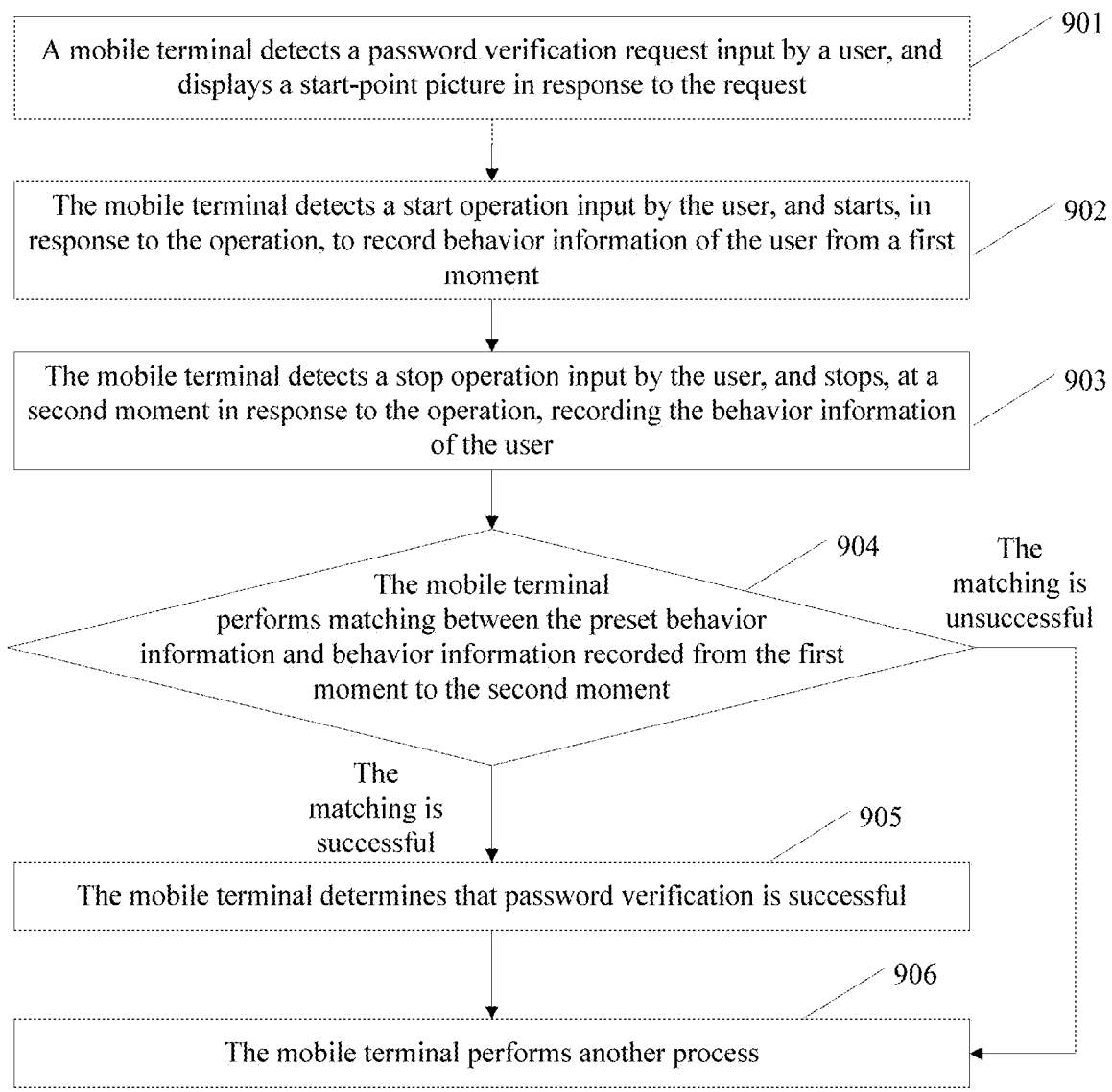
FIG. 9H is a flowchart of an embodiment of a password verification method according to an embodiment of this application.

In an optional manner, for the password retrieval request, after the password verification succeeds, the mobile terminal may display the to-be-retrieved password (as shown in FIG. 9G), or display prompt information (namely, password prompt information) of the password, or display an interface for resetting the password so that the user can reset the password. A manner of resetting the password is similar to the manner described in the embodiment corresponding to FIG. 7F, and details are not described herein again.

906. The mobile terminal performs another process.

When the mobile terminal determines that the behavior information recorded from the first moment to the second moment does not match the preset behavior information, the mobile terminal may perform another process, for example, display prompt information to notify the user of a verification failure, or display the start-point picture again to prompt the user to perform other verification.

In this embodiment of this application, the mobile terminal may display the start-point picture, to prompt for the start location of the track password; collect the behavior information of the user based on the operation of the user; perform matching between the collected behavior information and the preset behavior information; and if the matching is successful, display the password. In other words, when the user forgets the password, the user does not need to rely on another device or manually enter any information, but merely needs to find the start point according to the prompt of the start-point picture and walk on a pre-recorded route while carrying the mobile terminal, to retrieve the password, thereby facilitating a user operation and improving user experience.

In some embodiments, a process of setting the track password by the mobile terminal may specifically include: detecting a track password setting request input by the user; in response to the request, starting recording a walking track of the user based on behavior information of the user; detecting a stop operation input by the user; in response to the operation, stopping drawing the walking track of the user; and storing a drawn walking track as the track password into the mobile terminal.

Correspondingly, a process of verifying the track password by the mobile terminal may specifically include: detecting a track password verification request input by the user; in response to the request, starting recording a walking track of the user based on behavior information of the user; detecting a stop operation input by the user; in response to the operation, stopping drawing the walking track of the user; and performing matching between a drawn walking track and a preset walking track, where the verification is successful if the drawn walking track successfully matches the preset walking track. The preset walking track is a walking track drawn by the mobile terminal based on behavior information of the user during the setting of the track password.

For example, during the setting of the track password, the user walks around a sitting room while holding the mobile terminal, and a walking track is a circle with a radius of 3 meters. Then, during verification of the track password, if the user walks for a circle with a radius of 3 meters while holding the mobile terminal, the verification of the track password is successful.

In an optional manner, during the setting of the track password, a start location and an end location of the walking track may be further recorded when the walking track is being drawn; and during verification of the track password, not only the walking track needs to be matched, but also the start location and the end location of the track need to be matched, and the verification of the track password is considered to be successful only when the walking track, the start location and the end location are all successfully matched.

In some embodiments, a process of setting the track password by the mobile terminal may specifically include: detecting a track password setting request input by the user; in response to the request, starting recording a video; detecting a stop operation input by the user; in response to the operation, stopping recording the video; and storing recorded video data into the mobile terminal.

Correspondingly, a process of verifying the track password by the mobile terminal may specifically include: detecting a track password verification request input by the user; in response to the request, starting recording a video; detecting a stop operation input by the user; in response to the operation, stopping recording the video; and performing matching between recorded video data and preset video data, where the verification is successful if the matching is successful. The preset video data is video data recorded by the mobile terminal during the setting of the track password.

Specifically, the performing, by the mobile terminal, matching between recorded video data and preset video data may specifically be: respectively performing matching between a first image and a second image that are obtained from the recorded video data, and a first preset image and a second preset image that are in the preset video data, where the recorded video data successfully matches the preset video data if the first image is the same as the first preset image and the second image is the same as the second preset image. In an optional manner, the first image and the first preset image may be first N frames in the video data; and the second image and the second preset image may be last M frames in the video data.

3. Action Password

The following first describes in detail a process of setting an action password. As shown in FIG. 10H, an embodiment of a password setting method according to an embodiment of this application includes the following steps.

A mobile terminal detects an action password setting request input by a user, and displays a camera preview interface in response to the request.

Figure 10A:
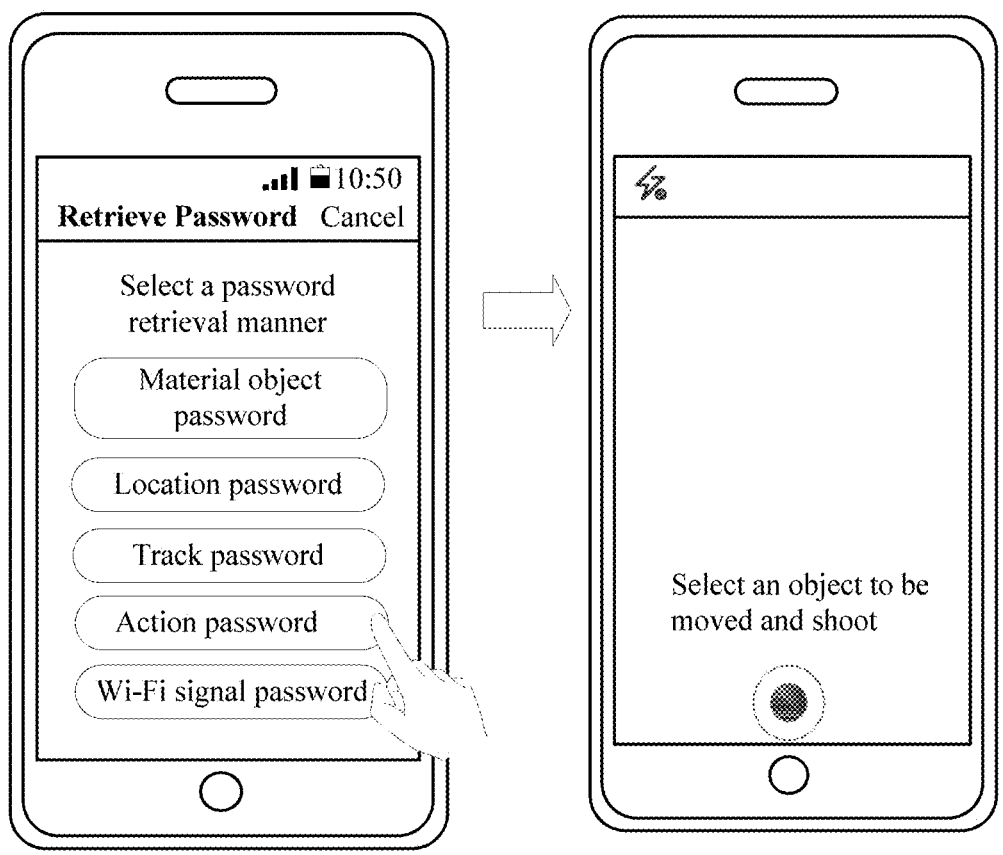
FIG. 10A is a schematic diagram of displaying a camera preview interface by a mobile terminal in response to an operation according to an embodiment of this application.

The user inputs the action password setting request, for example, taps a corresponding control on a setting interface, to trigger the action password setting request. In response to the request, the mobile terminal starts a camera, and presents a camera preview interface on a screen, as shown in FIG. 10A.

1002. The mobile terminal detects a start operation input by the user on the camera preview interface, and stores, in response to the operation, a first matching image displayed on the camera preview interface.

In this embodiment, the first matching image is an image obtained by combining a virtual image and image information collected by the camera.

In an optional manner, after starting the camera, the mobile terminal may identify a scene obtained by the camera. When the mobile terminal has identified a specific object in a current scene, that is, when a specific object appears on the camera preview interface, the mobile terminal may prompt, on the camera preview interface, the user whether the object needs to be moved. The user taps a confirmation button (for the start operation). The mobile terminal detects the operation, collects image information (a first verification image) by using the camera, extracts an image characteristic of the object (a target object) from the image information, generates a virtual image (a virtual verification image) of the target object based on the image characteristic, combines the virtual verification image and the image information collected by the camera to obtain a first matching image, and displays the first matching image. The first matching image corresponds to a first matching condition. During a process of verifying the action password, if an image obtained by combining a first image collected by the camera and a virtual image of an object collected by the camera is the same as the first matching image, the first matching condition is satisfied.

In an optional manner, the camera preview interface includes a shooting button. The user moves the mobile terminal to aim the camera at a target object needing to be moved, and taps the shooting button. The mobile terminal detects the operation, collects image information (a first verification image) by using the camera, obtains an image characteristic of the target object from the image information, generates a virtual image (a virtual verification image) of the target object based on the image characteristic, combines the virtual verification image and the image information collected by the camera to obtain a first matching image, and displays the first matching image. It should be understood that, the start operation may alternatively be sliding on the screen with a predefined gesture, or an operation such as tapping entity hardware of the mobile terminal, in addition to tapping a function button on the screen. This is not specifically limited herein.

1003. The mobile terminal detects a stop operation input by the user, and stores, in response to the operation, a second matching image displayed on the camera preview interface.

In this embodiment, the second picture image is an image obtained by combining the virtual image and image information collected by the camera.

After the mobile terminal generates the virtual image (the virtual verification image) of the target object, a gesture corresponding to the virtual image changes as a gesture of the mobile terminal changes, and a real-scene location that corresponds to the virtual image and that is on the camera preview interface changes as the mobile terminal moves.

After inputting the start operation, the user moves and/or rotates the mobile terminal, to move the target object to another location in a real scene and/or change a gesture of the target object. It should be understood that, a real-scene image (namely, image information displayed on the camera preview interface) collected by the camera changes when the user moves and/or rotates the mobile terminal. The moving the target object to another location in a real scene means moving the virtual image of the target object to another location in a real-scene image.

After the user moves the target object to the another location in the real scene and/or changes the gesture of the target object, the user inputs a stop operation on the mobile terminal. The mobile terminal collects, in response to the stop operation, image information (a second verification image) by using the camera, combines the virtual image of the target object and the second verification image to obtain a second matching image, and displays the second matching image. The second matching image corresponds to a second matching condition. During a process of verifying the action password, if an image obtained by combining a virtual image and a second image collected by the camera, is the same as the second matching image, the second matching condition is satisfied.

In an optional manner, in this embodiment, when detecting the start operation input by the user, the mobile terminal may further start, in response to the start operation, to record motion information of the mobile terminal. When detecting the stop operation input by the user, the mobile terminal may further stop, in response to the stop operation, recording the motion information of the mobile terminal. Motion information (motion verification information) recorded by the mobile terminal in this process also corresponds to the second matching condition. During a process of verifying the action password, if an image obtained by combining a virtual image and a second image collected by the camera, is the same as the second matching image, and motion information recorded by the mobile terminal successfully matches the motion verification information, the second matching condition is satisfied.

In this embodiment, the motion information may include at least one of the following: a gesture of the mobile terminal, an acceleration of the mobile terminal, and an angular velocity of the mobile terminal. The mobile terminal obtains action information (action verification information) of the user based on the motion information. The action information includes information about an operational action performed by the user on the mobile terminal, for example, information (shake amplitude, a shake frequency, and the like) about a shake operation performed by the user on the mobile terminal, information (a rotation direction, a rotation angle, a rotation speed, and the like) about a rotation operation performed by the user on the mobile terminal, or information (a moving distance, a moving direction, a moving speed, and the like) about moving of the mobile terminal by the user.

More specifically, the mobile terminal may collect a direction and a speed of rotation of the mobile terminal by using a gyroscope, and may collect a speed and an acceleration of linear motion of the mobile terminal by using a gravity sensor (or an acceleration sensor); and then process data collected by the gyroscope and the gravity sensor into speed information and acceleration information on an X axis, a Y axis, and a Z axis (that is, obtain the action information of the user). Then, if speed information and acceleration information obtained through processing by the mobile terminal in a verification process successfully match the speed information and the acceleration information, the motion information is successfully matched.

Figure 10B:
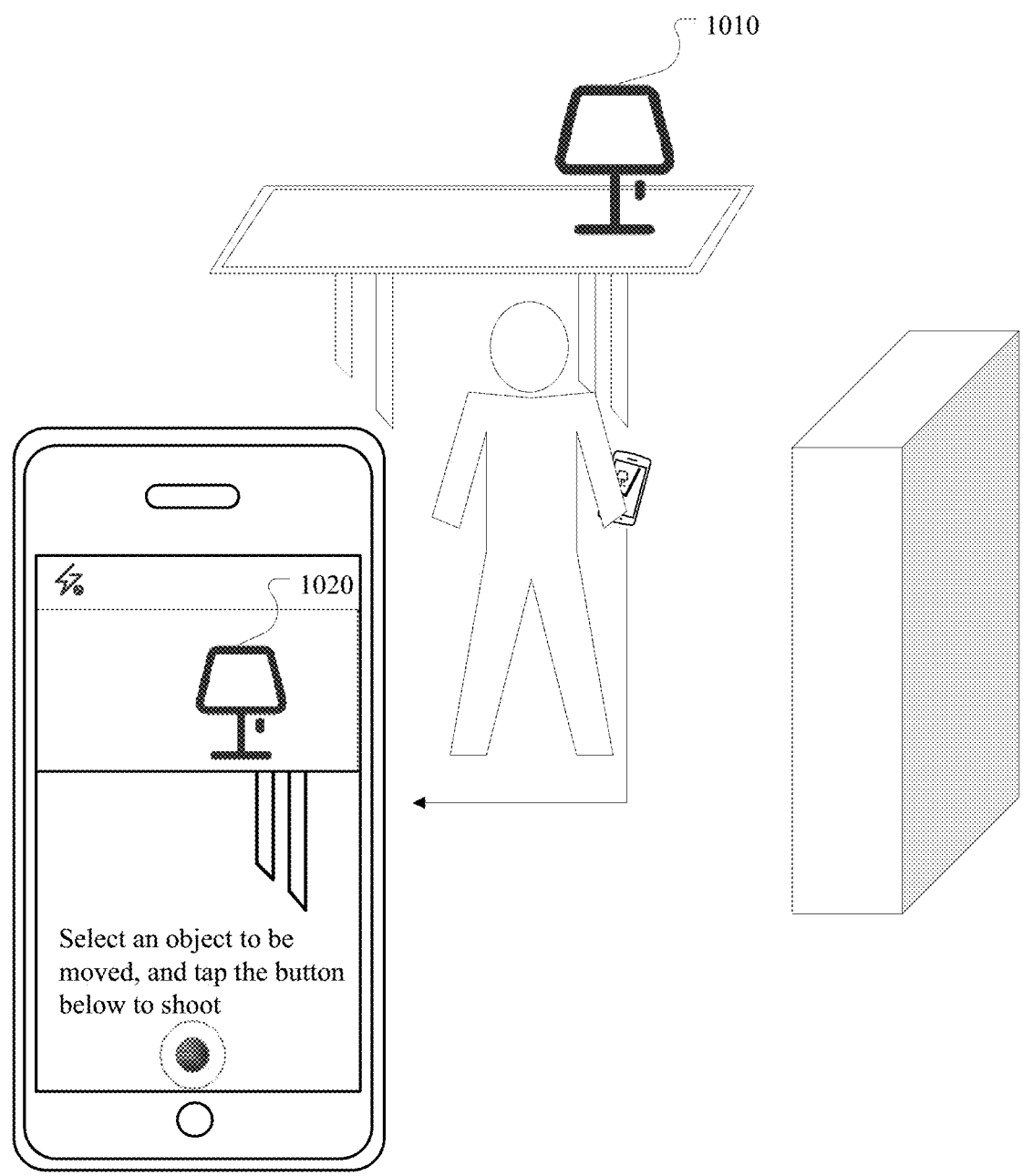
FIG. 10B is a schematic diagram of collecting a first verification image by using a camera according to an embodiment of this application.
Figure 10C:
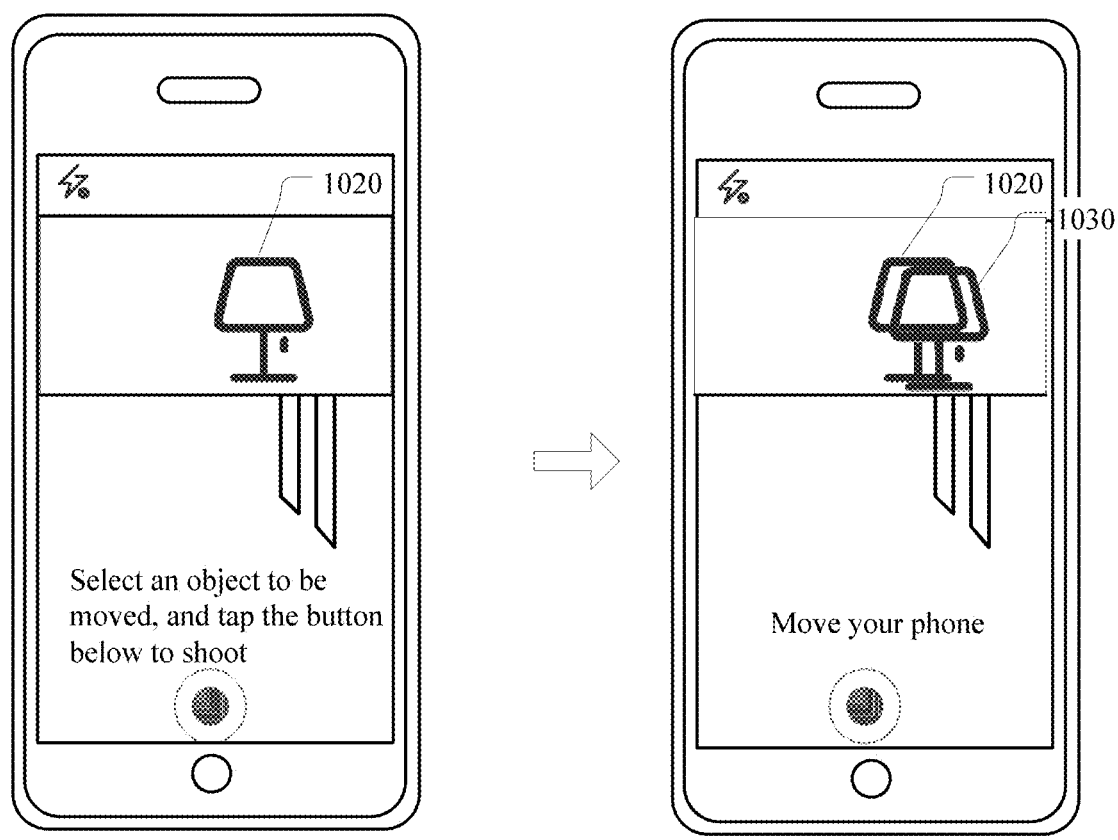
FIG. 10C is a schematic diagram of displaying a virtual image on a camera preview interface by a mobile terminal according to an embodiment of this application.

An example is given below for description. The user holds the mobile terminal, and aims the camera of the mobile terminal at a desk lamp 1010 while facing a desk in a room, as shown in FIG. 10B. In this case, the user taps a shooting button (for a start operation) on a camera preview interface. The mobile terminal collects, in response to the operation, a current image 1020 by using the camera, generates a virtual image 1030 of the desk lamp based on information about the image 1020, and combines the virtual image 1030 and the image 1020 collected by the camera to obtain a first matching image, as shown in FIG. 10C.

Figure 10D:
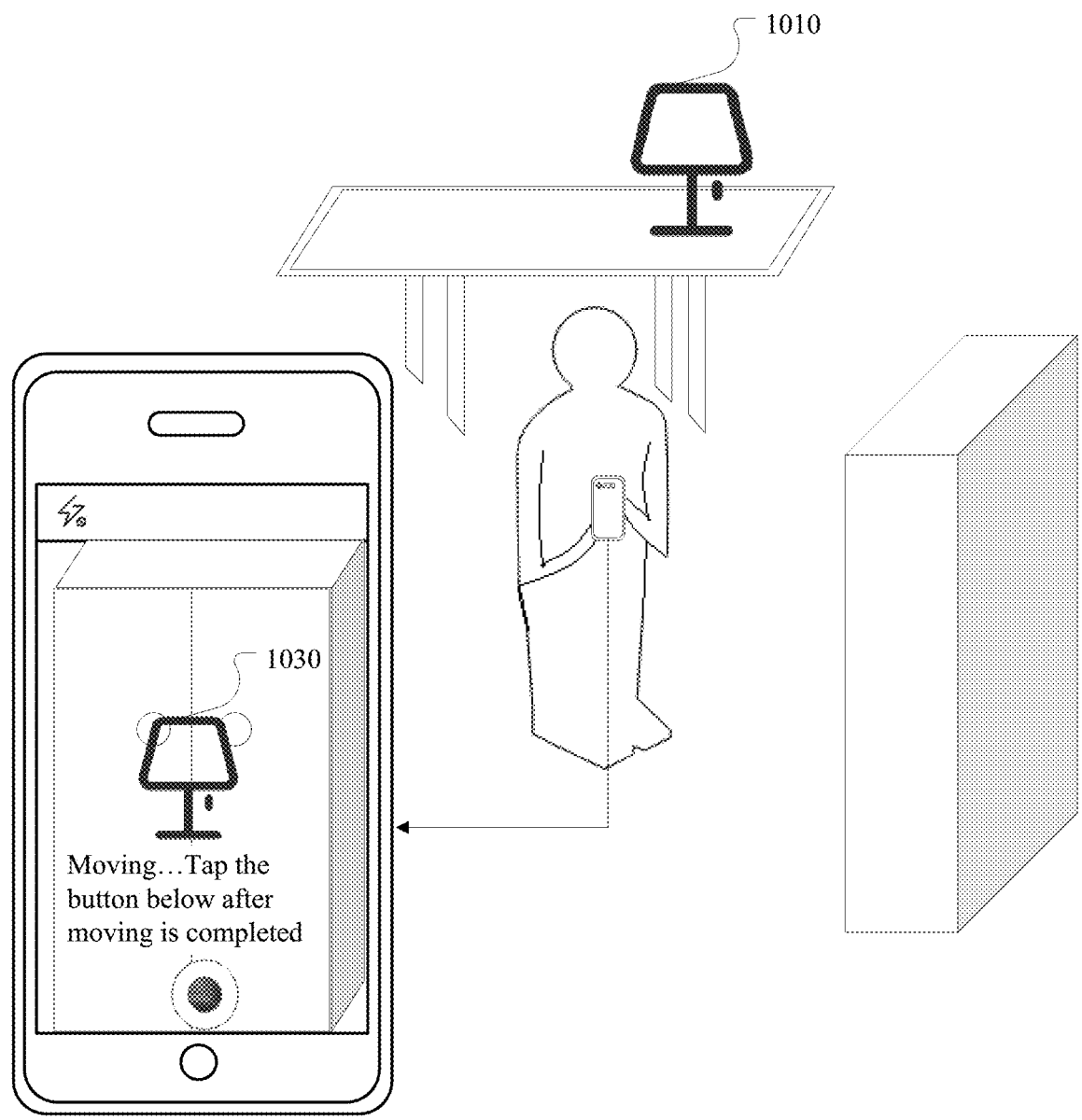
FIG. 10D is a schematic diagram of moving a mobile terminal by a user according to an embodiment of this application.
Figure 10E:
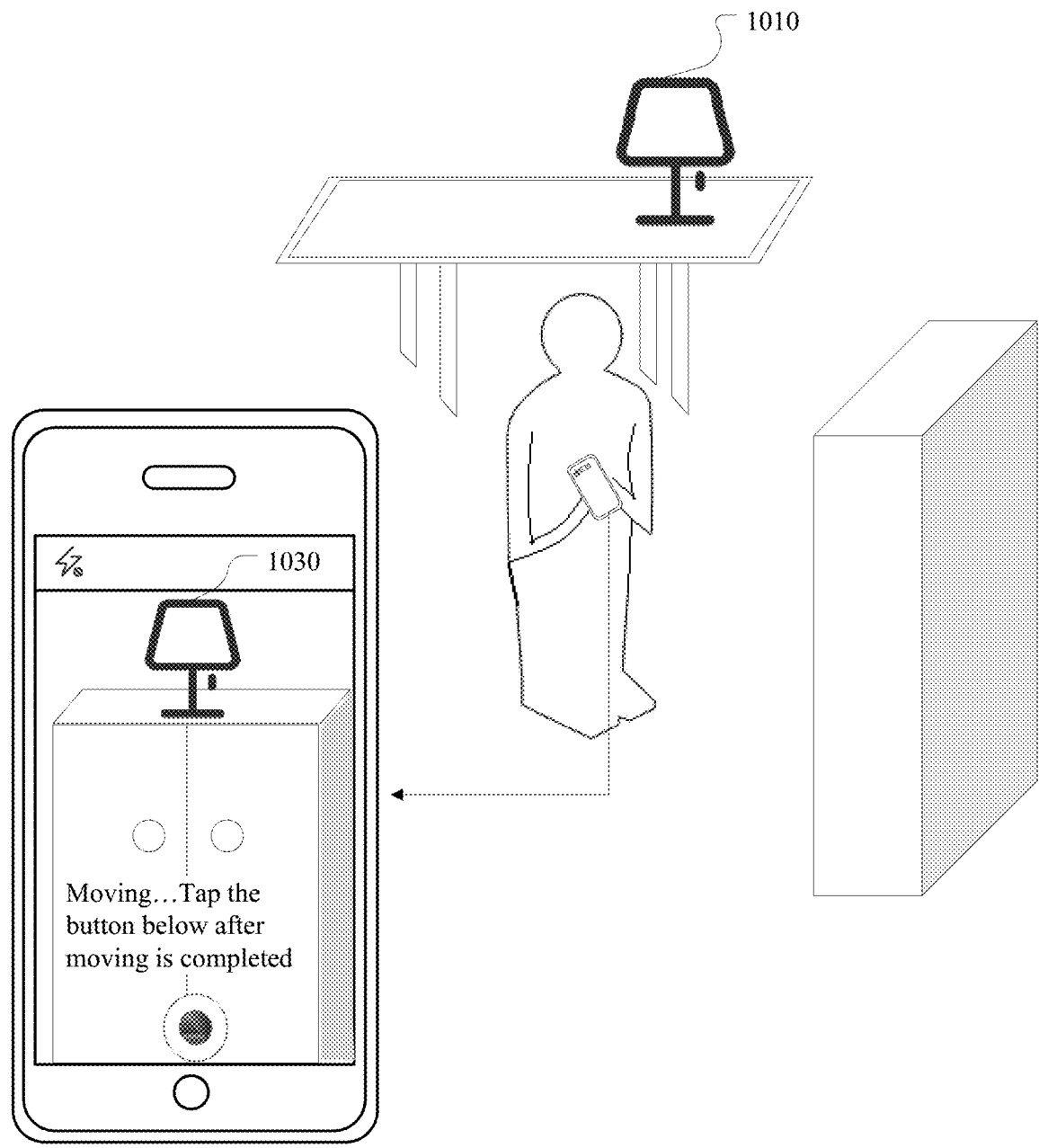
FIG. 10E is a schematic diagram of turning over a mobile terminal by a user according to an embodiment of this application.

The user turns to a wardrobe in the room while holding the mobile terminal. In this case, the user aims the camera of the mobile terminal at a door of the wardrobe while facing the wardrobe, and the user turns the mobile terminal anti-clockwise to aim the camera of the mobile terminal at the top of the wardrobe in the room. In this process, the virtual image 1030 changes on the camera preview interface as the mobile terminal moves (or turns). To be specific, in this process, the mobile terminal keeps combining an image collected by the camera and the virtual image 1030, and displays a combined image on the camera preview interface. When the camera faces the door of the wardrobe, the mobile terminal displays, on the camera preview interface, an image obtained by combining image information of the door of the wardrobe and the virtual image 1030, as shown in FIG. 10D. When the user turns the mobile terminal, the mobile terminal moves, based on the operation, the virtual image 1030 of the desk lamp from the door of the wardrobe to the top of the wardrobe (that is, displays, on the camera preview interface, an image obtained by combining the virtual image 1030 and an image collected by the camera after the moving), as shown in FIG. 10E.

Figure 10F:
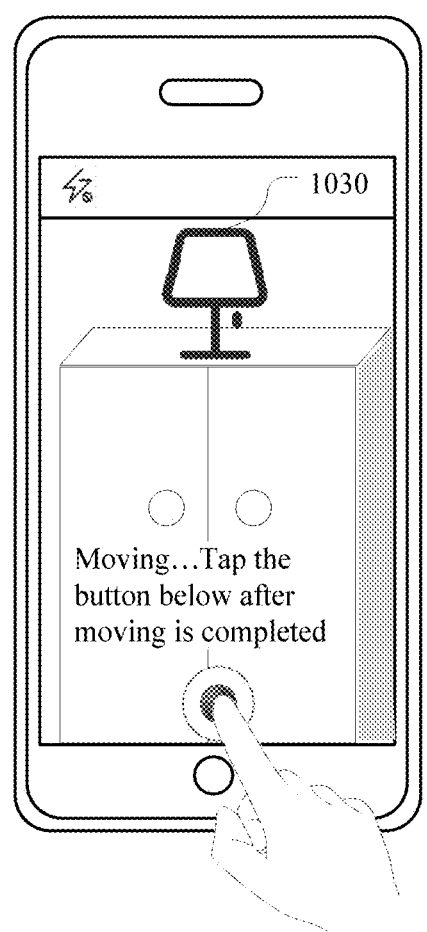
FIG. 10F is a schematic diagram of inputting a stop operation by a user according to an embodiment of this application.

In the foregoing process, after seeing, on the camera preview interface, that the desk lamp has moved from the desk to the top of the wardrobe (that is, the virtual image 1030 of the target object is displayed at the top of the wardrobe), the user confirms that the moving is complete and taps an "End" button (for a stop operation) on the screen. An image (a second matching image) obtained by combining the virtual image and a second image currently collected by the camera is stored, as shown in FIG. 10F. The mobile terminal processes, into a speed change and an acceleration change on an X axis, a Y axis, and a Z axis, data that is collected by a sensor in the moving process, and then stores the information correspondingly as action verification information into the mobile terminal.

In an optional manner, after storing the action information, the mobile terminal may display a notification interface, to notify the user that the action password has been recorded, as shown in FIG. 10G. This interface may further include a "Finish" button and a "Record again" button. When the user taps the "Finish" button on this interface, a main interface, or a login interface, or another interface of the mobile terminal may be displayed. When the user taps the "Record again" button on the interface, the mobile terminal may display the camera preview interface and perform the foregoing steps 1002 and 1003 to: replace the original first matching image with a newly-recorded first matching image, and store the newly-recorded first matching image as a first verification image into the mobile terminal; replace the original second matching image with a newly-recorded second matching image, and store the newly-recorded second matching image as a second verification image into the mobile terminal; and replace the original action information with newly-recorded action information, and store the newly-recorded action information as action verification information into the mobile terminal.

In this embodiment, the action password (including at least one of the following: the first matching image, the second matching image, and the action verification information) may be used to verify a conventional password. When the user needs to perform a corresponding function (for example, account login, screen unlocking, or payment), the user performs a corresponding operation on the mobile terminal to generate information that successfully matches the action password, and then the verification is successful. Then the mobile terminal may perform an operation, such as releasing password lock, allowing account login, or allowing payment.

In some embodiments, the action password may be further used to retrieve a conventional password. When the user forgets the password, the user performs a corresponding operation on the mobile terminal to generate information that successfully matches the action password, and then verification is successful. Then the mobile terminal may display the to-be-retrieved password, or display prompt information (namely, password prompt information) of the password, or display an interface for resetting the password so that the user can reset the password.

In this embodiment, the mobile terminal needs to pre-store prompt information of the password, or pre-store characteristic data (for example, a password resetting link) that exists in a server and that corresponds to the password, or pre-store the to-be-retried password requested by the user. (For a specific storage process, refer to S1 and S2 in the embodiment corresponding to FIG. 6L.)

In this embodiment of this application, the mobile terminal may generate the virtual image of the target object, and move, based on the operation of the user, the location of the virtual image in the real-scene image; and store, as the motion verification information into the mobile terminal, the action information of the user obtained in the moving process. When setting a password retrieval item, the user does not need to manually enter any information, but merely needs to aim the camera at a material object and then move a virtual image of the material object to a specific location by using the mobile terminal, to finish the setting, thereby facilitating a user operation and improving user experience.

Figure 11A:
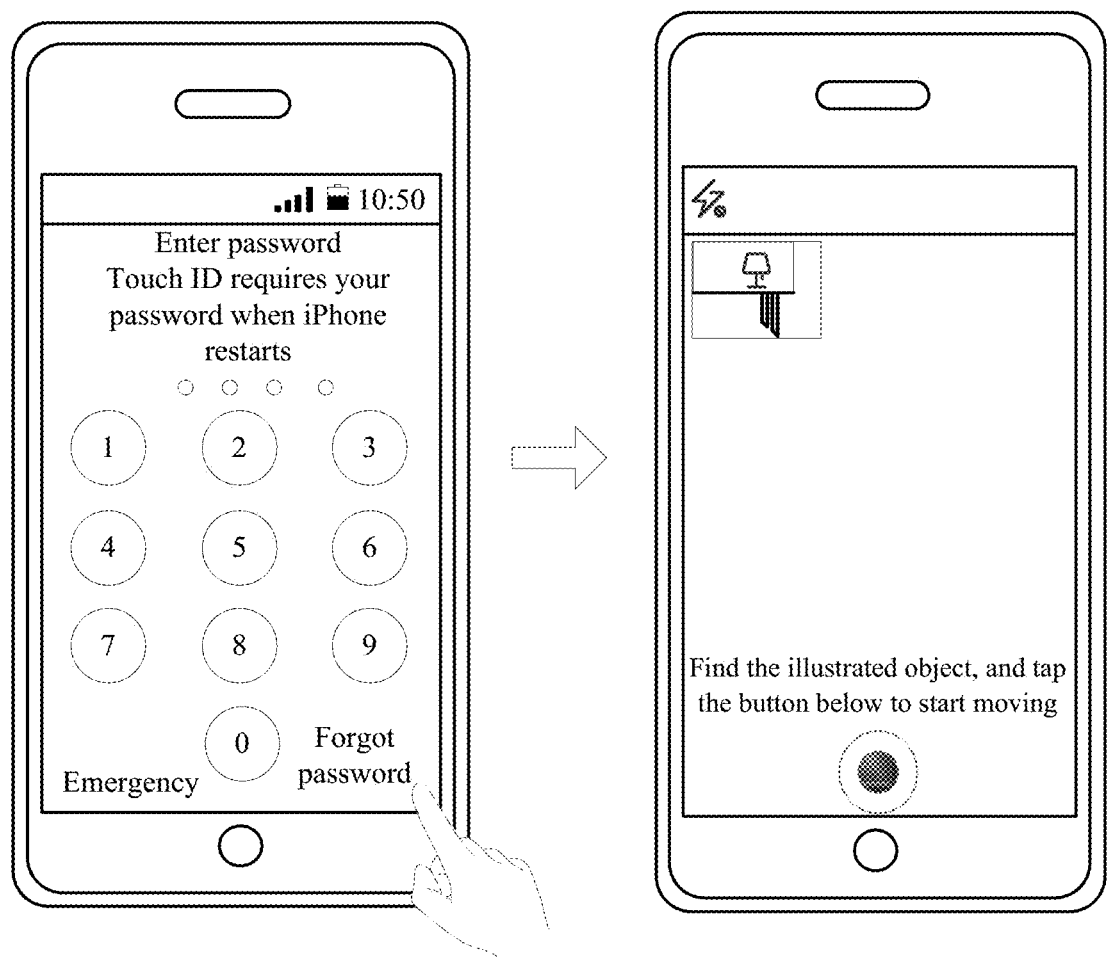
FIG. 11A is a schematic diagram of displaying image information by a mobile terminal in response to an operation according to an embodiment of this application.
Figure 11B:
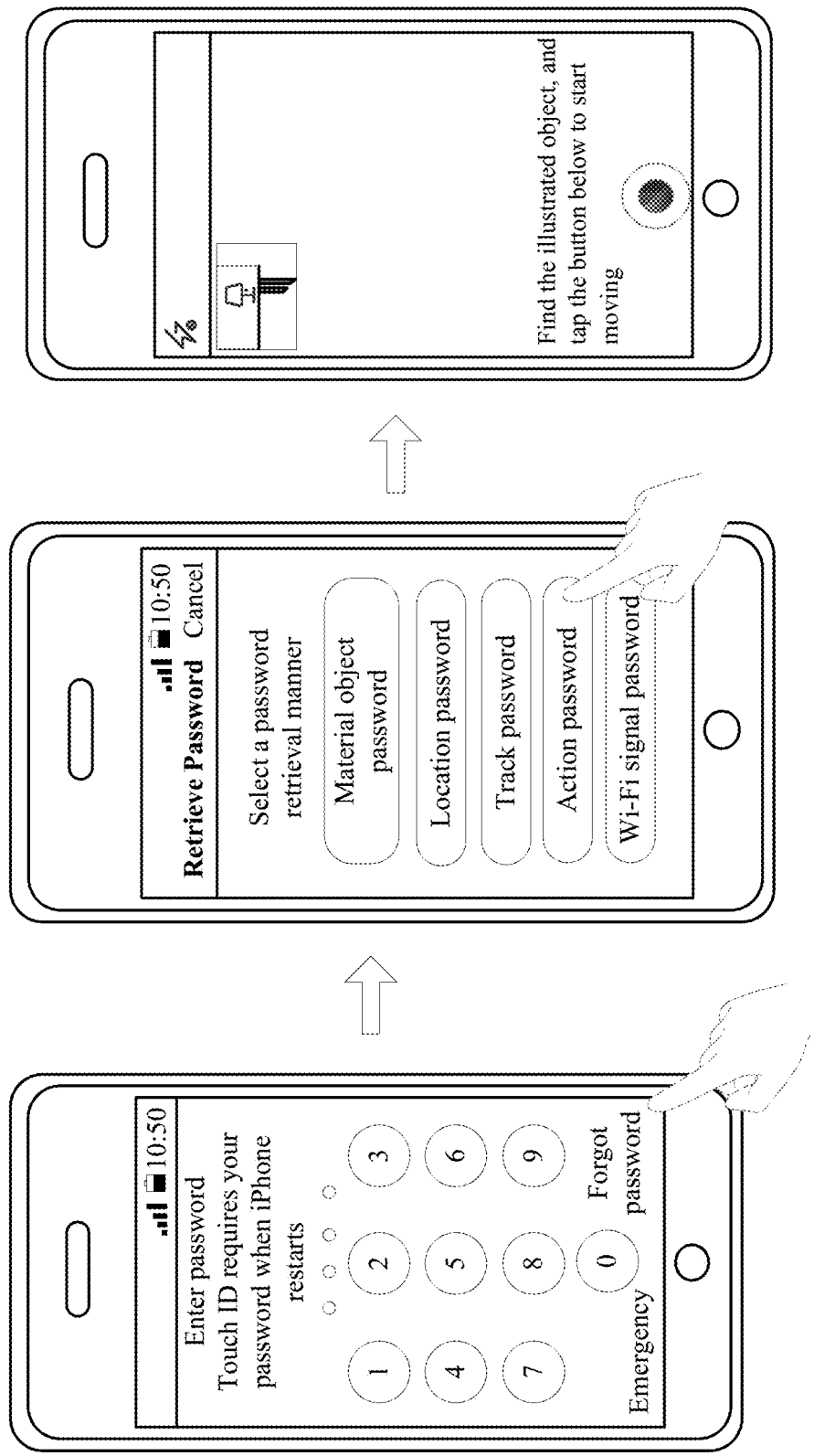
FIG. 11B is a schematic diagram of displaying image information by a mobile terminal in response to an operation according to an embodiment of this application.
Figure 11C:
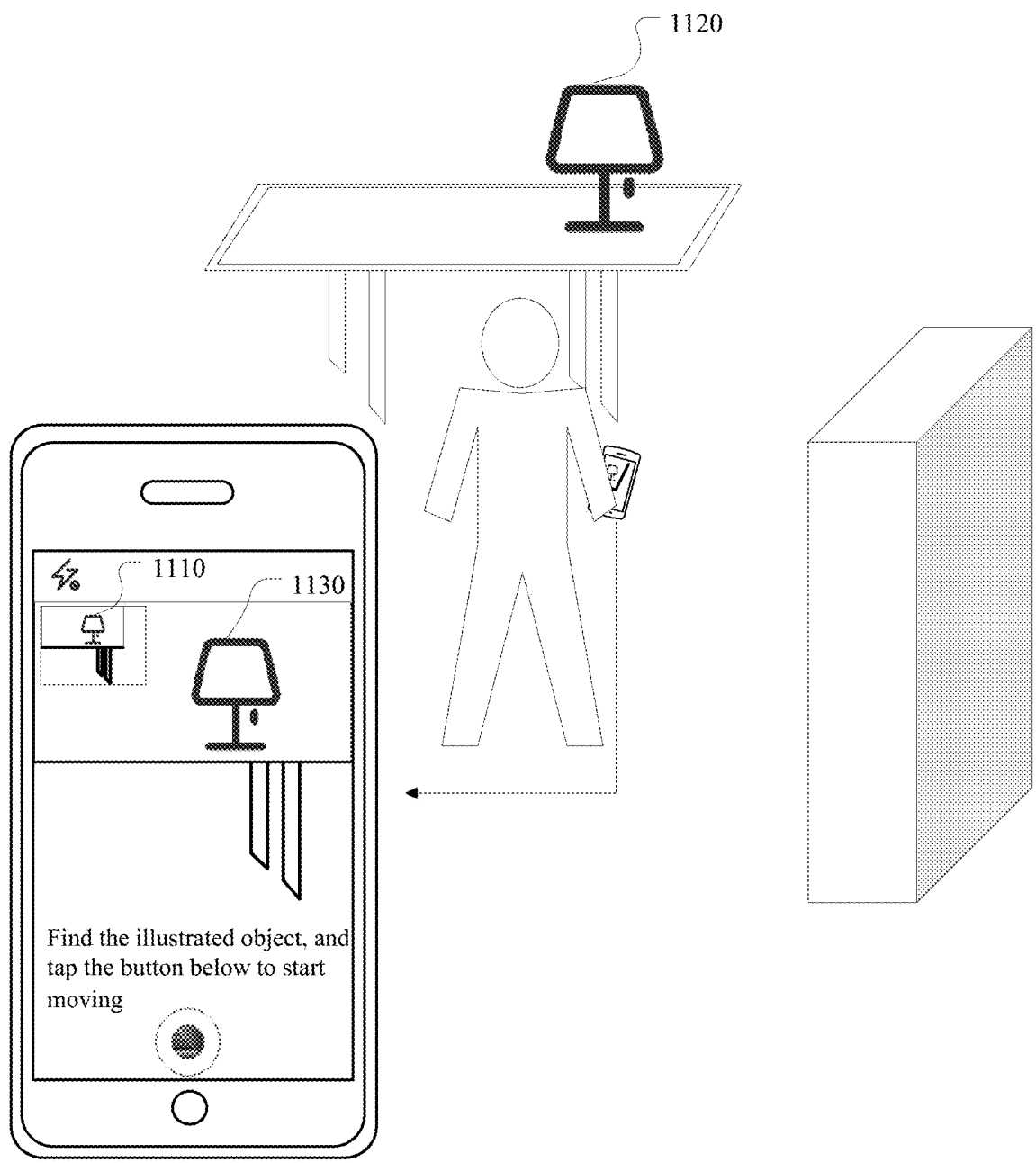
FIG. 11C is a schematic diagram of collecting a first image by using a camera according to an embodiment of this application.
Figure 11D:
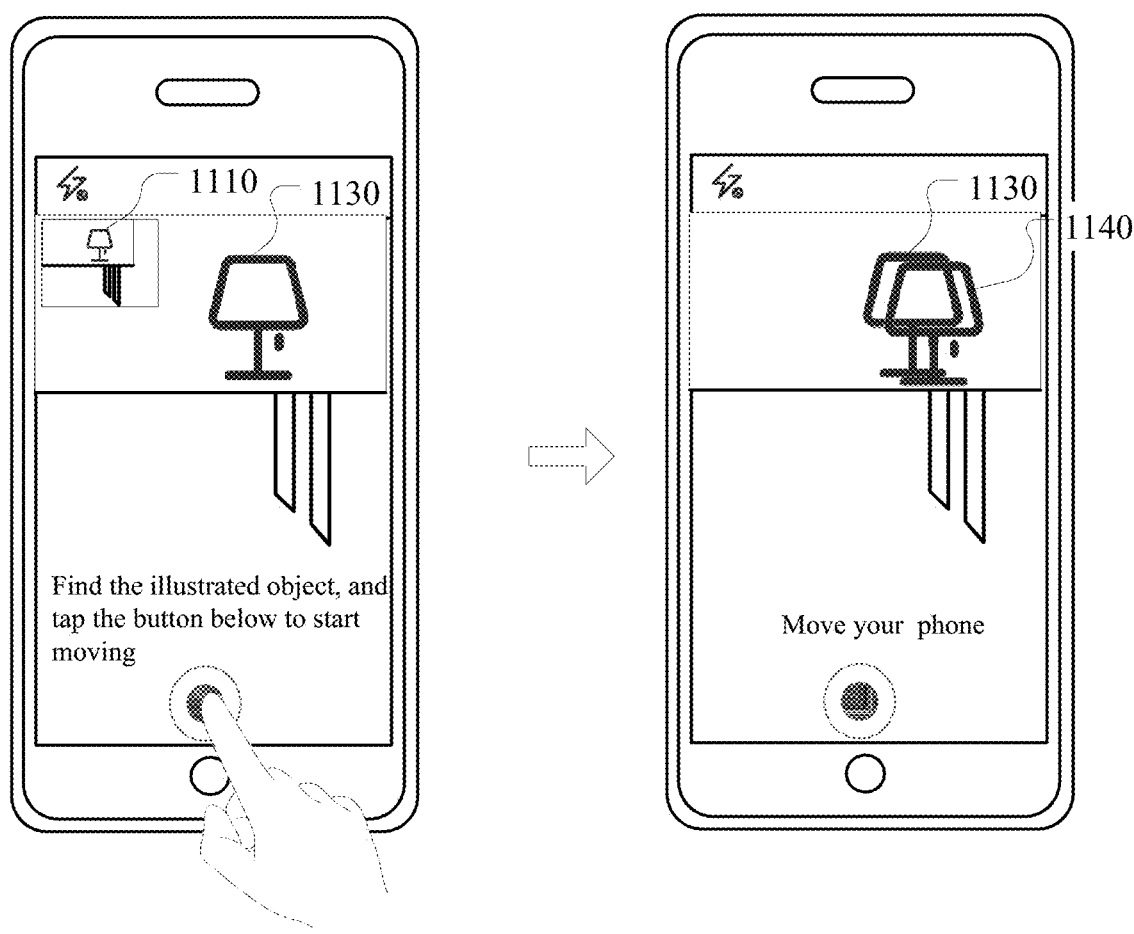
FIG. 11D is a schematic diagram of an image obtained by combining a first image and a virtual image according to an embodiment of this application.
Figure 11E:
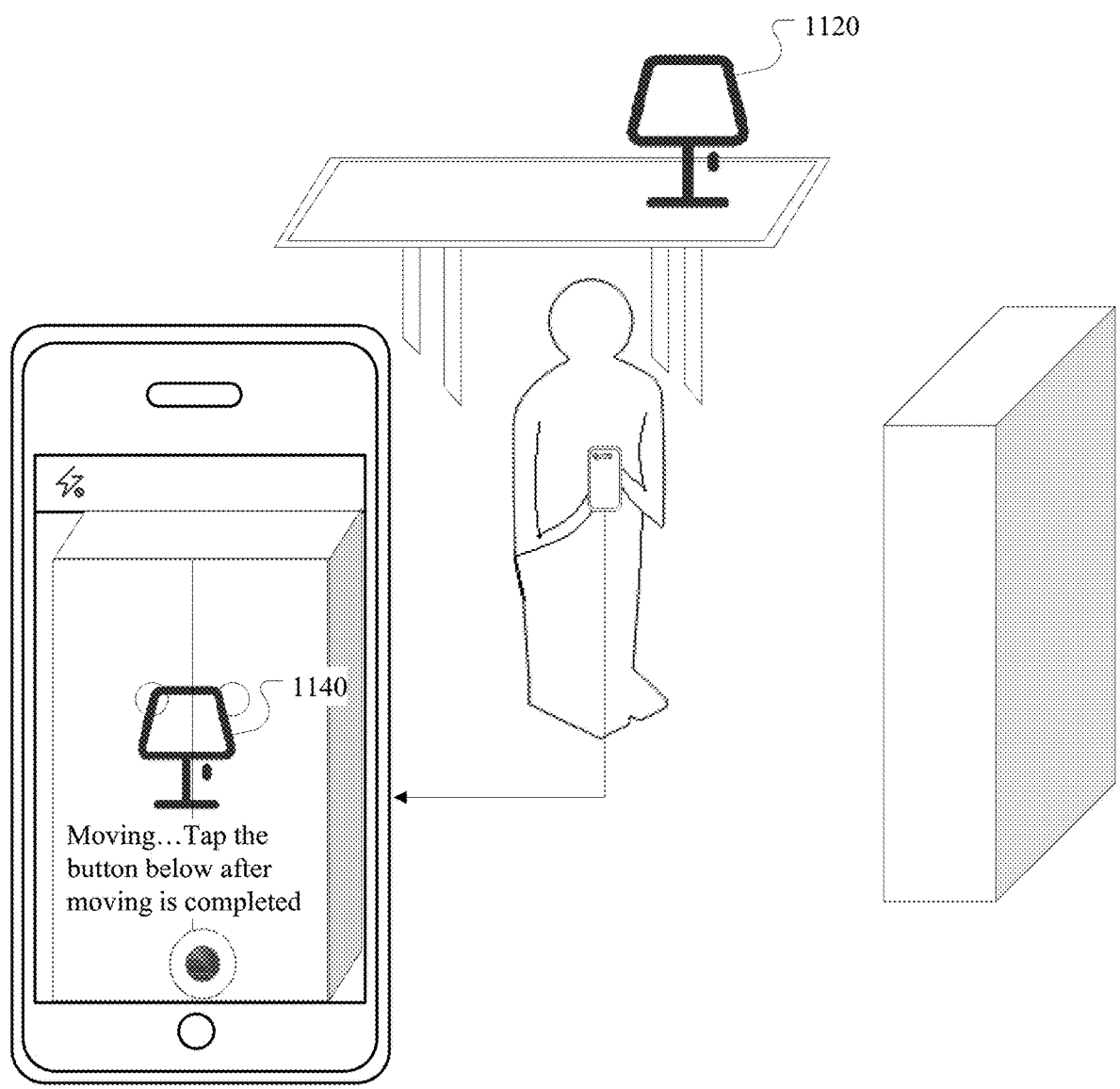
FIG. 11E is a schematic diagram of moving a mobile terminal by a user according to an embodiment of this application.
Figure 11F:
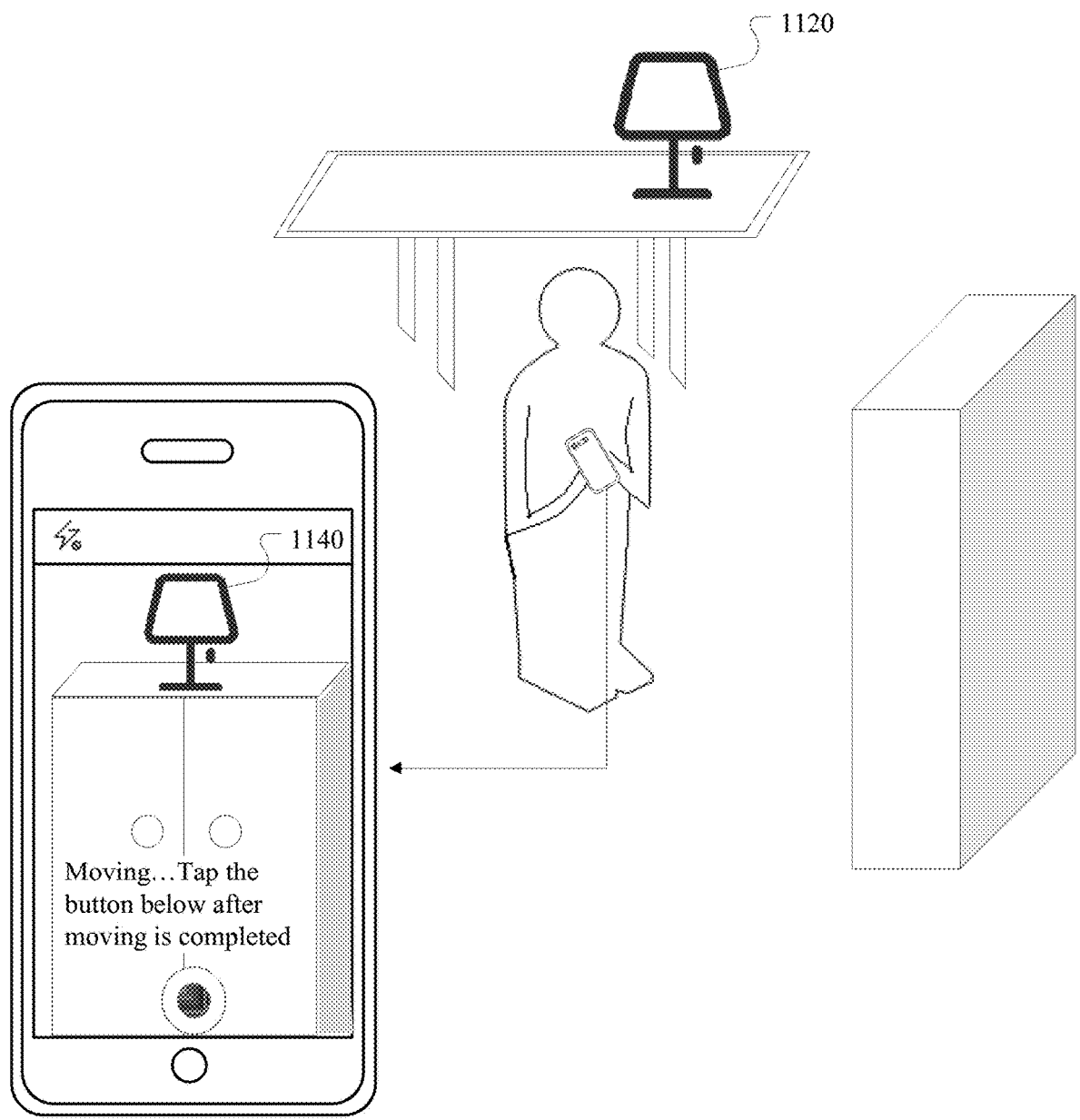
FIG. 11F is a schematic diagram of turning over a mobile terminal by a user according to an embodiment of this application.
Figure 11G:
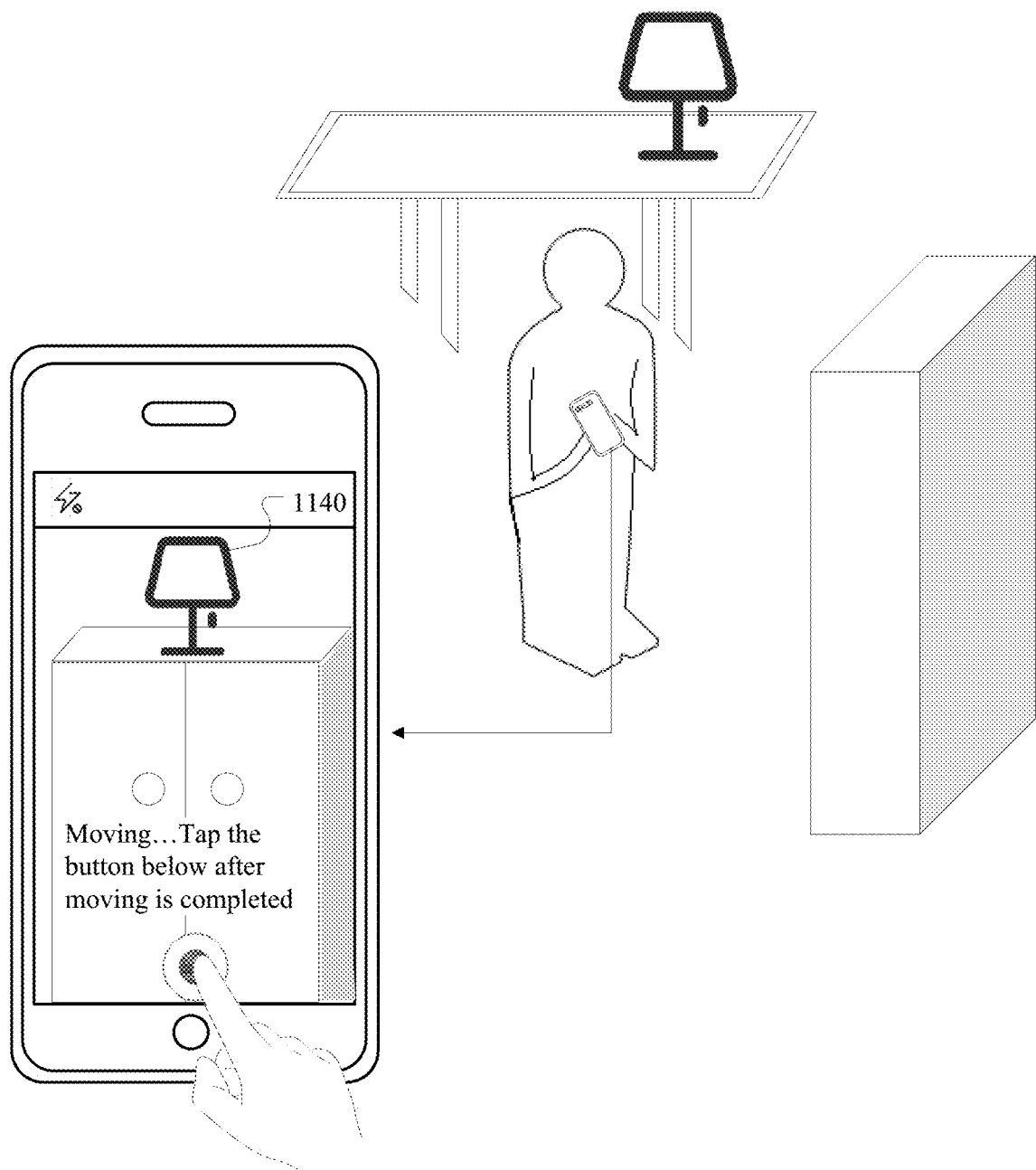
FIG. 11G is a schematic diagram of inputting a stop operation by a user according to an embodiment of this application.

After the user sets the action password in the manner corresponding to FIG. 10H, when the user requests for verification of the action password, the mobile terminal may perform the following process to help the user retrieve a password. As shown in FIG. 11J, an embodiment of a password verification method according to an embodiment of this application includes the following steps.

1101. A mobile terminal detects a password verification request input by a user, and displays an image of a target object in response to the request.

When the user forgets a login password, or a screen unlocking password, or a payment password, or another password, the user inputs a password retrieval request (the password verification request) on the mobile terminal, as shown in FIG. 2B or FIG. 2D. After detecting the password retrieval request input by the user, the mobile terminal reads, from a database in response to the request, an image that is of a target object and that corresponds to the to-be-retrieved password requested by the user, and displays the image.

Alternatively, when the user needs to perform a corresponding function (for example, account login, screen unlocking, or payment), the user inputs a password entry request (the password verification request) on the mobile terminal. In response to the request, the mobile terminal finds, from a database, an image that is of a target object and that corresponds to the password entry request, and displays the image of the target object.

In an optional manner, after detecting the password verification request input by the user, the mobile terminal may start a camera, and display the image of the target object on a camera preview interface. As shown in FIG. 11A, the mobile terminal may display the image of the target object in a form of a small picture on the camera preview interface.

In an optional manner, after detecting the password retrieval request input by the user, the mobile terminal may display the image of the target object and a camera icon on a prompt interface. When the user taps the camera icon, the mobile terminal starts a camera and presents a camera interface.

In an optional manner, when the user has set a plurality of password verification manners, after detecting the password verification request input by the user, the mobile terminal may first display a selection interface. On the selection interface, the user selects an action password manner for password retrieval. The mobile terminal displays the image of the target object, as shown in FIG. 11B.

In an optional manner, after detecting the password verification request, the mobile terminal may not display image information of the target object but display a camera preview interface.

1102. The mobile terminal obtains an image by combining a virtual image of the target object and a first image collected by the camera.

In an optional manner, when the camera is aimed at a specific object, the mobile terminal obtains image information (a first image) of the object. If the image information successfully matches the image information of the target object, the mobile terminal generates a virtual image of the target object based on the image information, combines the virtual image and an image currently collected by the camera, and displays a combined image on the camera preview interface.

In an optional manner, the camera preview interface displayed on the mobile terminal includes a confirmation button. The user moves the mobile terminal to aim the camera at an object, and taps the confirmation button. The mobile terminal detects the operation and collects image information of the object. If the image information of the object successfully matches the image information of the target object, the mobile terminal generates a virtual image of the target object based on the image information, combines the virtual image and an image currently collected by the camera, and displays a combined image on the camera preview interface; or if the image information of the object does not match the image information of the target object, a first matching condition is not satisfied and the mobile terminal performs step 1107.

In an optional manner, the mobile terminal obtains, from a stored image, a virtual image corresponding to the password verification request, combines the virtual verification image and an image currently collected by the camera, and displays a combined image on the camera preview interface.

An example is given below for description. The user walks to a room based on an image 1110 of a target object, and aims the camera at a desk lamp 1120 (the target object) while facing a desk in the room. In this case, the mobile terminal displays an image 1130 of the desk lamp on a camera preview interface, as shown in FIG. 11C. After seeing the image 1130 of the desk lamp on the camera preview interface, the user taps a confirmation button on the mobile terminal. In response to the operation input by the user, the mobile terminal collects image information 1130 of the desk lamp, confirms that the image information successfully matches image information of the target object, generates a virtual image 1140 of the desk lamp 1120, and displays, on the camera preview interface, an image obtained by combining the virtual image 1140 and an image currently collected by the camera, as shown in FIG. 11D.

1103. The mobile terminal determines whether the image obtained by combining the first image and the virtual image successfully matches a first preset image; and performs step 1104 if the matching is successful, or performs step 1107 if the matching is unsuccessful.

In this embodiment, the first preset image is an image obtained by combining a virtual verification image and a first verification image collected by the camera during the setting of the action password, for example, the first matching image in the embodiment corresponding to FIG. 10H.

Specifically, if an image characteristic value of the image obtained by combining the first image and the virtual image is the same as an image characteristic value of the first preset image, it is determined that the matching is successful and the first matching condition is satisfied, and then the mobile terminal performs step 1104. If the image characteristic values are not the same, it is determined that the matching is unsuccessful and the first matching condition is not satisfied, and then the mobile terminal performs step 1107.

1104. In response to a stop operation input by the user, the mobile terminal obtains an image by combining the virtual image of the target object and a second image collected by the camera.

After the mobile terminal generates the virtual image of the target object, a gesture corresponding to the virtual image changes as a gesture of the mobile terminal changes, and a real-scene location that corresponds to the virtual image and that is on the camera preview interface changes as the mobile terminal moves.

The user moves and/or rotates the mobile terminal, to move the target object to another location in a real scene and/or change a gesture of the target object, and then inputs a stop operation on the mobile terminal. In response to the operation, the mobile terminal collects a current image (the second image) by using the camera, and combines the image and the virtual image.

An example is given below for description. After the mobile terminal displays the virtual image 1140 of the desk lamp 1120 on the camera preview interface as shown in FIG. 11D, the user turns to a wardrobe in the room while holding the mobile terminal. In this case, the user aims the camera of the mobile terminal at a door of the wardrobe while facing the wardrobe, and the user turns the mobile terminal anticlockwise to aim the camera of the mobile terminal at the top of the wardrobe in the room. In this process, the mobile terminal keeps combining an image collected by the camera and the virtual image 1140, and displays a combined image on the camera preview interface. When the camera faces the door of the wardrobe, the mobile terminal displays, on the camera preview interface, the virtual image 1140 on the door of the wardrobe, as shown in FIG. 11E; or when the user turns the mobile terminal, the mobile terminal displays, on the camera preview interface, the virtual image 1140 at the top of the wardrobe, as shown in FIG. 11F. In this case, the user taps an "End" button (for a stop operation) on the camera preview interface, as shown in FIG. 11G. The mobile terminal stores the combined image (a second matching image) in response to the operation.

1105. The mobile terminal determines whether the image obtained by combining the second image and the virtual image successfully matches a second preset image; and performs step 1106 if the matching is successful, or performs step 1107 if the matching is unsuccessful.

In this embodiment, the second preset image is an image obtained by combining a second verification image collected by the camera and the virtual verification image during the setting of the action password, for example, the second matching image in the embodiment corresponding to FIG. 10H.

Specifically, if an image characteristic value of the image obtained by combining the second image and the virtual image is the same as an image characteristic value of the second preset image, it is determined that the matching is successful and the second matching condition is satisfied, and then the mobile terminal performs step 1106. If the image characteristic values are not the same, it is determined that the matching is unsuccessful and the second matching condition is not satisfied, and then the mobile terminal performs step 1107.

1106. The mobile terminal determines that password verification is successful. When determining that the image obtained by combining the second image and the virtual image successfully matches the second preset image, the mobile terminal determines that the verification is successful.

In an optional manner, for the password entry request, after the password verification succeeds, the mobile terminal may perform an operation, such as releasing password lock, allowing account login, allowing payment, starting an encrypted application, displaying an encrypted file, or displaying an encrypted album.

Figure 11H:
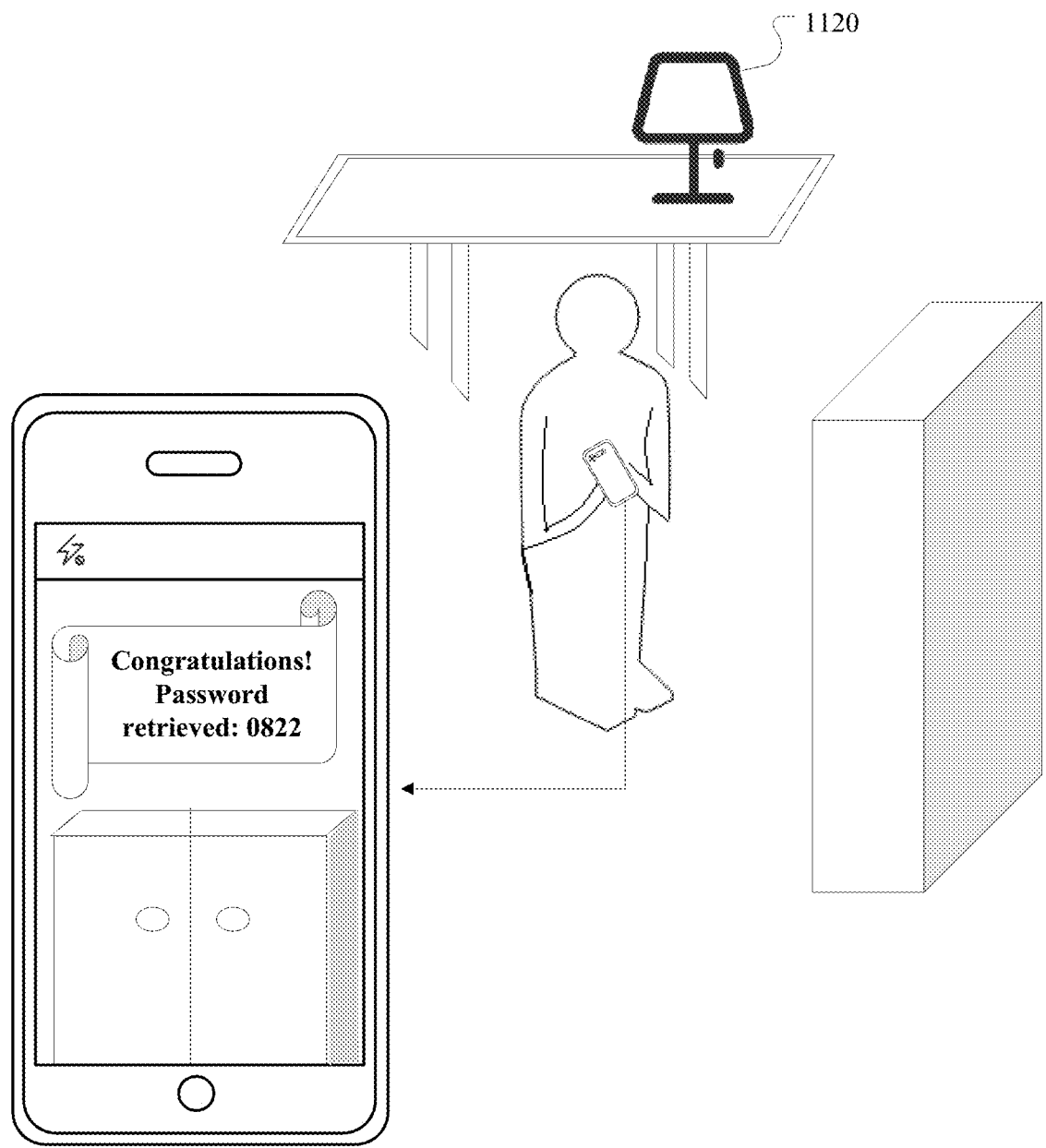
FIG. 11H is a schematic diagram of displaying a password by a mobile terminal according to an embodiment of this application.
Figure 11I:
FIG. 11I is a schematic diagram of displaying a password by a mobile terminal according to an embodiment of this application.
Figure 11J:
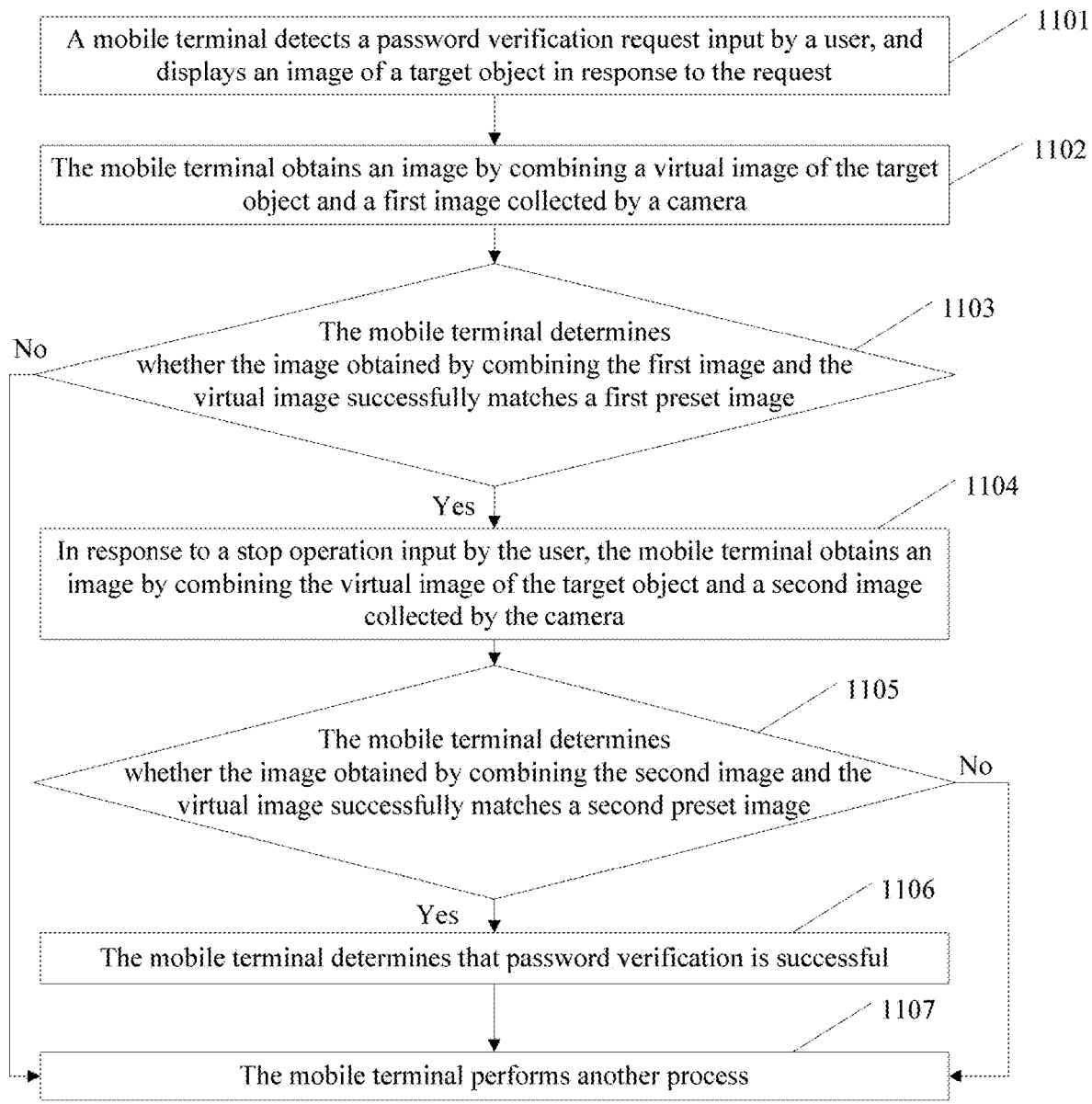
FIG. 11J is a flowchart of an embodiment of a password verification method according to an embodiment of this application.

In an optional manner, for the password retrieval request, after the password verification succeeds, the mobile terminal may display the to-be-retrieved password (as shown in FIG. 11H or FIG. 11I), or display prompt information (namely, password prompt information) of the password, or display an interface for resetting the password so that the user can reset the password. A manner of resetting the password is similar to the manner described in the embodiment corresponding to FIG. 7F, and details are not described herein again.

1107. The mobile terminal performs another process.

When determining that the image obtained by combining the second image and the virtual image does not match the second preset image, the mobile terminal may perform another process, for example, display prompt information to notify the user of a verification failure, or prompt the user to perform other verification.

In an optional manner, in this embodiment, when obtaining the image obtained by combining the first image collected by the camera and the virtual image of the target object, the mobile terminal may further start to record motion information of the mobile terminal. When detecting the stop operation input by the user, the mobile terminal may further stop, in response to the stop operation, recording the motion information of the mobile terminal, and perform matching between motion information recorded in this process by the mobile terminal and preset motion information (corresponding to the motion verification information in the embodiment of FIG. 10H). If the matching is successful, the second matching condition is satisfied and the verification is successful.

In this embodiment, the motion information may include at least one of the following: a gesture of the mobile terminal, an acceleration of the mobile terminal, and an angular velocity of the mobile terminal. The mobile terminal obtains action information of the user based on the motion information. The action information includes information about an operational action performed by the user on the mobile terminal, for example, information (shake amplitude, a shake frequency, and the like) about a shake operation performed by the user on the mobile terminal, information (a rotation direction, a rotation angle, a rotation speed, and the like) about a rotation operation performed by the user on the mobile terminal, or information (a moving distance, a moving direction, a moving speed, and the like) about moving of the mobile terminal by the user.

That the mobile terminal performs matching between the motion information and the preset motion information may specifically be: performing matching between action information of the user and preset action information (corresponding to the action verification information in the embodiment of FIG. 10H). If the action information of the user successfully matches the preset action information, the motion information successfully matches the preset motion information.

Specifically, the mobile terminal may collect a direction and a speed of rotation of the mobile terminal by using a gyroscope, and may collect a speed and an acceleration of linear motion of the mobile terminal by using a gravity sensor (or an acceleration sensor); and then process data collected by the gyroscope and the gravity sensor into speed information and acceleration information on an X axis, a Y axis, and a Z axis (that is, obtain the action information of the user). If an obtained speed and an obtained acceleration successfully match a speed and an acceleration in the preset action information, the motion information successfully matches the preset action information.

In an optional manner, if the speed information and the acceleration information on the X axis, the Y axis, and the Z axis obtained through the processing are completely consistent with speed information and acceleration information on the X axis, the Y axis, and the Z axis in the preset action information, the motion information successfully matches the preset action information.

In an optional manner, for the speed information and the acceleration information on the X axis, the Y axis, and the Z axis obtained through the processing, and speed information and acceleration information on the X axis, the Y axis, and the Z axis in the preset action information, if a proportion of same information is greater than a preset proportion, the motion information successfully matches the preset action information.

In this embodiment of this application, the mobile terminal may generate the virtual image of the target object, and move, based on the operation of the user, the location of the virtual image in the real-scene image; and perform matching between the preset action information and the action information obtained in the moving process. If the matching is successful, the verification is successful. When the user forgets the password, the user does not need to rely on another device or manually enter any information, but merely needs to aim the camera at a material object selected during the setting of the action password and then move, by the mobile terminal, a virtual image of the material object to a location specified during the setting of the action password, to retrieve the password, thereby facilitating a user operation and improving user experience.

4. Location Password

The following briefly describes a process of setting a location password: after storing a password input by a user, such as a screen unlocking password, a login password, or a payment password, a mobile terminal detects a location password setting request triggered by the user; the mobile terminal displays a prompt interface in response to the request, where the prompt interface includes prompt information and a confirmation button; the user places, according to a prompt, the mobile terminal at a specific location in such a manner that the terminal device faces a specific direction, and taps the confirmation button on the prompt interface; and the mobile terminal detects an operation input by the user, obtains current location information and current direction information of the mobile terminal, and stores the location information and the direction information correspondingly as the location password into the mobile terminal.

The following briefly describes a process of retrieving a password by a user by using a location password: When the user forgets the password, the user inputs a password retrieval request on a mobile terminal; the mobile terminal displays a prompt interface in response to the request, to prompt the user to place the mobile terminal at a pre-recorded location, where the prompt interface includes a confirmation button; the user places, according to a prompt, the mobile terminal at a specific location in such a manner that the terminal device faces a specific direction, and taps the confirmation button on the prompt interface; the mobile terminal detects an operation input by the user, obtains current location information and current direction information of the mobile terminal, and reads, from a database, a location password (location information and direction information that are recorded when the user sets the location password) corresponding to the password retrieval request; and if the read location information is consistent with the current location information, and the read direction information is consistent with the current direction information, the mobile terminal displays a password corresponding to the password retrieval request.

In this embodiment of this application, when the user forgets the password, the user does not need to rely on another device or manually enter any information, but merely needs to place the mobile terminal at the preset location in such a manner that the terminal device faces a preset direction, to retrieve the password, thereby facilitating a user operation and improving user experience.

5. Wi-Fi Signal Password

The following briefly describes a process of setting a Wi-Fi signal password: A mobile terminal detects a location password setting request input by a user; the mobile terminal displays a Wi-Fi signal setting interface in response to the request; on the Wi-Fi signal setting interface, the user selects a Wi-Fi signal used for verification, to perform connection; and after the connection is successful, the mobile terminal stores identification information of the Wi-Fi signal as the Wi-Fi signal password into the mobile terminal.

In some embodiments, the mobile terminal detects the location password setting request input by the user; and in response to the request, the mobile terminal collects a first verification image by using a camera, obtains identification information of at least one Wi-Fi signal, and stores the first verification image and the identification information as the Wi-Fi signal password into the mobile terminal correspondingly. Specifically, the obtaining identification information of the Wi-Fi signal includes: obtaining identification information of a Wi-Fi signal currently connected to the mobile terminal; or displaying a Wi-Fi signal setting interface, and determining identification information that is of at least one Wi-Fi signal and that is selected by the user on the setting interface, where the identification information may include an account and a password of the Wi-Fi signal.

It should be understood that, the Wi-Fi signal password may be used to verify a conventional password, or may be used to retrieve a conventional password.

The following briefly describes a process of retrieving a password by a user by using a location password: When the user forgets the password, the user inputs a password verification request on the mobile terminal; the mobile terminal displays a Wi-Fi signal setting interface in response to the request; on the Wi-Fi signal setting interface, the user selects a Wi-Fi signal used to store the password, to perform connection; and after the connection is successful, the mobile terminal reads, from a database, Wi-Fi signal identification information corresponding to the password retrieval request, and obtains identification information of a Wi-Fi signal currently connected to the mobile terminal, where verification is successful if the two pieces of identification information are consistent with each other.

In some embodiments, in response to the request, the mobile terminal starts a camera, collects, based on an operation of the user, a first image by using the camera, and performs matching between the first image and a first verification image; and if the matching is successful, performs network connection by using a pre-stored Wi-Fi signal account and password. If the network connection succeeds, the verification is successful.

In this embodiment of this application, the user may select a common Wi-Fi signal in life, for example, a Wi-Fi signal at home or a Wi-Fi signal in a company, as a password retrieval item. When the user forgets the password, the user may retrieve the password by connecting to the Wi-Fi signal at such a place. Therefore, after the mobile terminal is lost, an authorized user cannot search for and connect to the Wi-Fi signal, thereby ensuring user information security while facilitating memorization and an operation of the user.

The foregoing describes the password verification methods and the password setting methods in the embodiments of this application. The following describes mobile terminals in the embodiments of this application.

Figure 12:
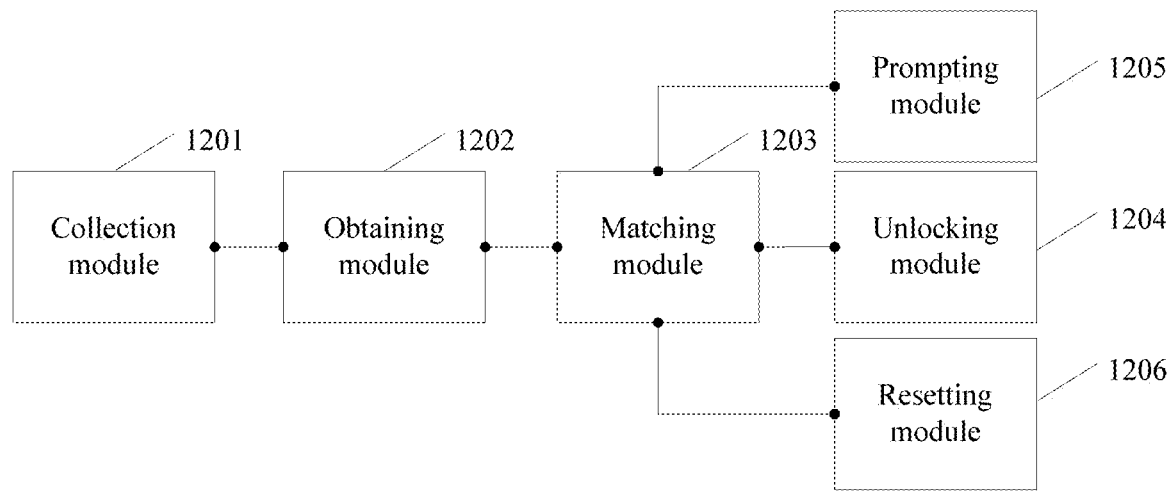
FIG. 12 is a schematic diagram of an embodiment of a mobile terminal according to an embodiment of this application.

As shown in FIG. 12, an embodiment of a mobile terminal according to an embodiment of this application includes: a collection module 1201, an obtaining module 1202, and a matching module 1203.

The collection module 1201 is configured to collect at least one first image in response to a detected operation of requesting for password verification. The obtaining module 1202 is configured to obtain matching information. The matching module 1203 is configured to perform matching between the obtained matching information and a second preset matching condition. Password verification is successful when the matching performed by the matching module 1203 is successful.

In this embodiment, the matching information includes at least one of the following: location information of the mobile terminal, motion information of the mobile terminal, at least one second image collected by a camera of the mobile terminal, and network connection information of the mobile terminal, where the second image is different from the first image.

Optionally, in some embodiments, the matching information includes the location information of the mobile terminal; and when performing matching between the obtained matching information and the second preset matching condition, the matching module 1203 is specifically configured to: perform matching between the location information and preset location information, where the location information includes at least one of the following: global positioning system GPS information, base station positioning information, Wi-Fi positioning information, and geographical location information.

Optionally, in some embodiments, a result of matching between the at least one first image collected by the collection module 1201 and at least one first preset image satisfies a first preset matching condition, and this includes: an image obtained by combining the first image and a virtual image, successfully matches the first preset image;

the matching information includes: the at least one second image collected by the camera of the mobile terminal; and when performing matching between the obtained matching information and the second preset matching condition, the matching module 1203 is specifically configured to: perform matching between a second preset image and an image obtained by combining the second image and the virtual image.

Optionally, in some embodiments, the matching information includes the motion information of the mobile terminal; and when performing matching between the obtained matching information and the second preset matching condition, the matching module 1203 is specifically configured to: obtain, based on the motion information, action information of a user corresponding to the mobile terminal, and perform matching between the action information of the user and preset action information, where the motion information includes at least one of the following: a gesture of the mobile terminal, an acceleration of the mobile terminal, and an angular velocity of the mobile terminal.

Optionally, in some embodiments, the matching information includes the motion information of the mobile terminal, where the motion information includes at least one of the following: a gesture of the mobile terminal, an acceleration of the mobile terminal, and an angular velocity of the mobile terminal; and when performing matching between the obtained matching information and the second preset matching condition, the matching module 1203 is specifically configured to: obtain, based on the motion information, behavior information of a user, and perform matching between the behavior information of the user and preset behavior information, where the behavior information includes at least one of the following: a motion step count of the user, a motion step length of the user, a location corresponding to each motion step of the user, and motion duration corresponding to each motion step of the user.

Optionally, in some embodiments, the network connection information includes: a Wi-Fi account and a Wi-Fi password that are stored in the mobile terminal; and when performing matching between the obtained matching information and the second preset matching condition, the matching module 1203 is specifically configured to: perform network connection by using the stored at least one Wi-Fi account and Wi-Fi password, where the matching is successful if the network connection succeeds.

Optionally, in some embodiments, the mobile terminal further includes one or more of the following modules: an unlocking module 1204, a prompting module 1205, or a resetting module 1206. The unlocking module 1204 is configured to: when the password verification succeeds, release password lock; the prompting module 1205 is configured to: when the password verification succeeds, prompt for password information; and the resetting module 1206 is configured to: when the password verification succeeds, reset the password.

The operation of requesting for password verification may be an operation of retrieving a screen unlocking password of the mobile terminal; and correspondingly, the resetting module 1206 is specifically configured to: when the password verification succeeds, prompt for information about resetting the screen unlocking password; the prompting module 1205 is specifically configured to: when the password verification succeeds, display the screen unlocking password; and the unlocking module 1204 is specifically configured to: when the password verification succeeds, unlock a screen of the mobile terminal.

In this embodiment of this application, the mobile terminal needs to combine the image collected by the camera and the obtained verification information, for example, the motion information, the location information, the action information, and the network connection information, to implement password verification, thereby improving security of the verification.

In addition, this embodiment of this application provides a plurality of password verification manners, thereby improving flexibility of the solution.

Figure 13:
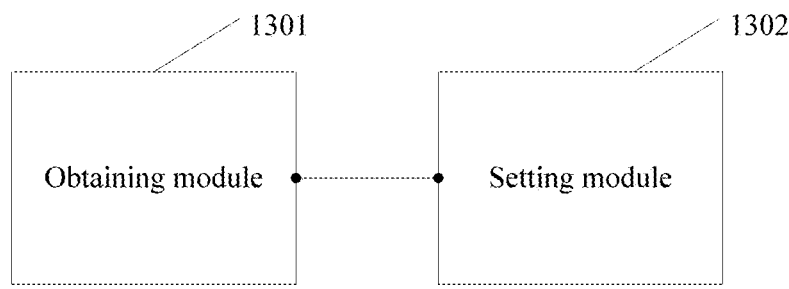
FIG. 13 is a schematic diagram of an embodiment of a mobile terminal according to an embodiment of this application.

An embodiment of this application further provides another mobile terminal. As shown in FIG. 13, a mobile terminal according to the embodiment of this application includes an obtaining module 1301 and a setting module 1302.

In response to a detected operation of requesting for password setting, the obtaining module 1301 obtains at least one first verification image selected based on the operation, and obtains verification information selected based on the operation. The setting module 1302 sets a first matching condition based on the at least one first verification image obtained by the obtaining module 1301, records the first matching condition, sets a second matching condition based on the verification information, and records the second matching condition.

In this embodiment, the verification information includes at least one of the following: location information of the mobile terminal, motion information of the mobile terminal, at least one second verification image collected by a camera of the mobile terminal, and network connection information of the mobile terminal, where the second verification image is different from the first verification image.

In some embodiments, the verification information includes location information of the mobile terminal, where the location verification information includes at least one of the following: global positioning system GPS information, base station positioning information, Wi-Fi positioning information, and geographical location information.

In some embodiments, the verification information includes the motion information of the mobile terminal, where the motion information includes at least one of the following: a gesture of the mobile terminal, an acceleration of the mobile terminal, and an angular velocity of the mobile terminal; and when setting the second matching condition, the setting module 1302 is specifically configured to: obtain action information based on the motion information, where the action information includes information about an operational action performed by a user on the mobile terminal, and the action information is used to verify action information of the user; or the setting module 1302 is specifically configured to: obtain, based on the motion information, behavior information of a user corresponding to the mobile terminal, where the behavior information includes at least one of the following: a motion step count of the user, a motion step length of the user, a location corresponding to each motion step of the user, and motion duration corresponding to each motion step of the user; and the behavior verification information is used to verify behavior information of the user.

In some embodiments, the network connection information of the mobile terminal includes: at least one Wi-Fi account and a Wi-Fi password corresponding to each Wi-Fi account.

In some embodiments, the operation of requesting for password setting is used to request for password setting for retrieving a screen unlocking password.

In this embodiment of this application, the setting module 1302 may set a matching condition for password verification by combining the verification image and the verification information, for example, the motion information, the location information, the action information, and the network connection information, thereby improving security of the verification.

In addition, in this embodiment of this application, the setting module 1302 may set the matching condition in a plurality of manners, thereby improving flexibility of the solution.

Figure 14:
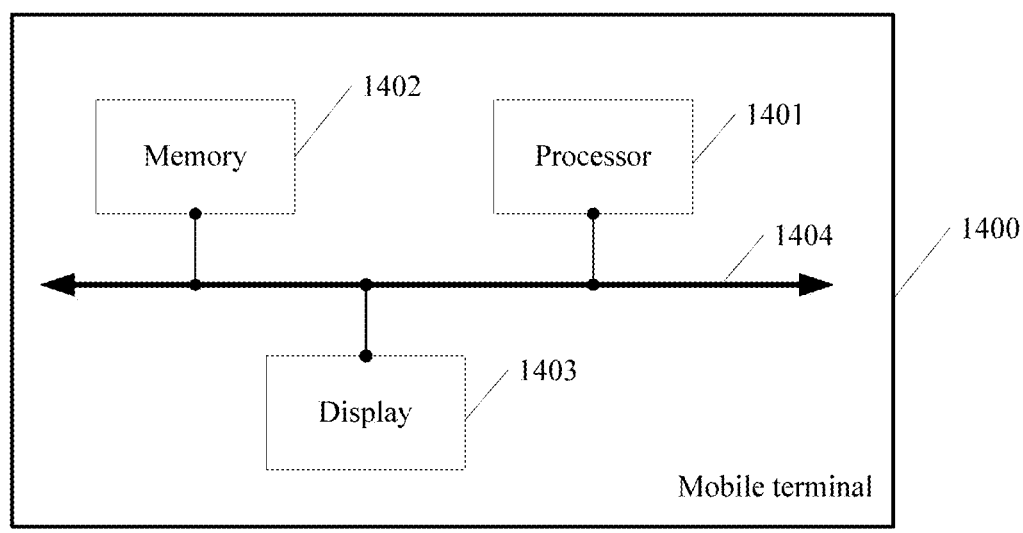
FIG. 14 is a schematic diagram of an embodiment of a mobile terminal according to an embodiment of this application.

The foregoing describes the mobile terminal in this application from a perspective of function modules. The following gives description from a perspective of entity hardware. As shown in FIG. 14, an embodiment of a mobile terminal 1400 according to an embodiment of this application includes: one or more processors 1401, a memory 1402, and a display 1403.

The terminal 1400 further includes a bus 1404.

The processor 1401, the memory 1402, and the display 1403 are connected to each other by using the bus 1404.

The bus 1404 may be a peripheral component interconnect (peripheral component interconnect, PCI for short) bus, an extended industry standard architecture (extended industry standard architecture, EISA for short) bus, and or the like. The bus may be classified into an address bus, a data bus, a control bus, and the like. For ease of representation, only one thick line is used to represent the bus in FIG. 14, but this does not mean that there is only one bus or only one type of bus.

The processor 1401 may be a central processing unit (central processing unit, CPU for short), a network processor (network processor, NP for short), or a combination of a CPU and an NP.

The processor 1401 may further include a hardware chip. The hardware chip may be an application-specific integrated circuit (application-specific integrated circuit, ASIC for short), a programmable logic device (programmable logic device, PLD for short), or a combination thereof. The PLD may be a complex programmable logic device (complex programmable logic device, CPLD for short), a field-programmable gate array (field-programmable gate array, FPGA for short), generic array logic (generic array logic, GAL for short), or any combination thereof.

The memory 1402 may include a volatile memory (volatile memory), such as a random access memory (random access memory, RAM for short); or the memory 1402 may include a non-volatile memory (non-volatile memory), such as a flash memory (flash memory), a hard disk drive (hard disk drive, HDD for short), or a solid-state drive (solid-state drive, SSD for short); or the memory 1402 may include a combination of the foregoing types of memories.

Optionally, the memory 1402 is configured to store a program instruction; and the processor 1401 invokes the program instruction stored in the memory 1402, so that the mobile terminal performs one or more steps in the embodiments shown in FIG. 4, FIG. 5, FIG. 6L, FIG. 7F, FIG. 8G, FIG. 9H, FIG. 10H, and FIG. 11J, or an optional implementation thereof.

An embodiment of this application further provides a computer storage medium. The computer storage medium is configured to store a computer software instruction used by the foregoing mobile terminal. The computer software instruction includes a program designed for the foregoing mobile terminal.

An embodiment of this application further provides a computer program product. The computer program product includes a computer software instruction. The computer software instruction may be loaded by using a processor, to implement a process of the methods shown in FIG. 4, FIG. 5, FIG. 6L, FIG. 7F, FIG. 8G, FIG. 9H, FIG. 10H, and FIG. 11J.

The foregoing embodiments each may be completely or partially implemented by using software, hardware, firmware, or any combination thereof. When the software is used to implement an embodiment, the embodiment may be implemented completely or partially in a form of a computer program product.

The computer program product includes one or more computer instructions. When the computer program instruction is loaded and executed on a computer, some or all of the procedures or functions according to the embodiments of the present invention are generated. The computer may be a general-purpose computer, a special-purpose computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed system, apparatus, and method may be implemented in other manners. For example, the described apparatus embodiments are merely examples. For example, the unit division is merely logical function division, and there may be another division manner in actual implementation. For example, a plurality of units or components may be combined or integrated into another system, or some features may be ignored or not performed. In addition, the shown or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts shown as units may or may not be physical units, that is, may be located at one position, or may be distributed on a plurality of network units. Some or all of the units may be selected according to actual needs to achieve the objectives of the solutions of the embodiments.

In addition, functional units in the embodiments of this application may be integrated into one processing unit, or each unit may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a read-only memory (English full name: Read-Only Memory, ROM for short), a random access memory (English full name: Random Access Memory, RAM for short), a magnetic disk, or an optical disc.

The foregoing embodiments are merely intended for describing the technical solutions in this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method, comprising:
in response to detecting an operation of requesting password verification, collecting, by a mobile terminal, at least one first image by using a camera of the mobile terminal, wherein collecting the at least one first image comprises collecting an image of a material object pre-selected by a user;
obtaining, by the mobile terminal, matching information in response to a result of matching between the at least one first image and at least one first preset image satisfying a first preset matching condition, wherein the at least one first preset image corresponds to a start point of a preset walking track password of the user, and the matching information comprises:
motion information of a movement of the mobile terminal;
obtaining, by the mobile terminal based on the motion information, behavior information of a user corresponding to the mobile terminal, wherein the behavior information of the user comprises:
a motion step count of one or more steps of the user;
a motion step length of one or more steps of the user;
a location corresponding to each motion step of one or more steps of the user; or
motion duration corresponding to each motion step of one or more steps of the user; and
performing, by the mobile terminal, matching between the behavior information of the user and a second preset matching condition, wherein the password verification succeeds in response to the matching being successful, and the second preset matching condition comprises behavior information of the user as the user walks along the preset walking track password of the user.

2. The method according to claim 1, wherein further comprising:
in response to the password verification succeeding, releasing, by the mobile terminal, password lock; and
prompting, by the mobile terminal, for password information, or prompting, by the mobile terminal, for password resetting information.

3. The method according to claim 1, wherein the password is a screen unlocking password of the mobile terminal.

4. The method according to claim 3, further comprising:
in response to the password verification succeeding, displaying, by the mobile terminal, an interface for resetting the screen unlocking password.

5. The method according to claim 3, further comprising:
in response to the password verification succeeding, displaying, by the mobile terminal, the screen unlocking password.

6. The method according to claim 3, further comprising:
in response to the password verification succeeding, unlocking, by the mobile terminal, a screen of the mobile terminal.

7. The method according to claim 1, wherein the behavior information of the user comprises:
a motion step count of one or more steps of the user.

8. The method according to claim 1, wherein the behavior information of the user comprises:
a motion step length of one or more steps of the user.

9. The method according to claim 1, wherein the behavior information of the user comprises:
a location corresponding to each motion step of one or more steps of the user.

10. The method according to claim 1, wherein the behavior information of the user comprises:
motion duration corresponding to each motion step of one or more steps of the user.

11. The method according to claim 1, wherein the behavior information of the user matches the second preset matching condition when a quantity of steps that the user walks and locations of the steps that the user walks matches a quantity of steps that the user walks along the preset walking track password of the user and locations of the steps that the user walks along the preset walking track of the user.

12. The method according to claim 1, further comprising:
in response to the result of matching between the at least one first image and the at least one first preset image satisfying the first preset matching condition, display a prompt interface that prompts the user to carry the mobile terminal and start recording the behavior information of the user.

13. A method, comprising:
in response to detecting an operation of requesting password setting, obtaining, by a mobile terminal, at least one first verification image selected based on the operation of requesting password setting, wherein obtaining the at least one first verification image comprises obtaining an image of a material object pre-selected by a user, and the at least one first verification image corresponds to a start point of a preset walking track password of the user, and;
obtaining, by the mobile terminal, verification information selected based on the operation of requesting password setting, wherein obtaining the verification information comprises:
obtaining motion information of a movement of the mobile terminal; and
obtaining, based on the motion information, behavior information of a user corresponding to the mobile terminal, wherein the behavior information of the user comprises:
a motion step count of one or more steps of the user;
a motion step length of one or more steps of the user;
a location corresponding to each motion step of one or more steps of the user; or
motion duration corresponding to each motion step of one or more steps of the user;

generating, by the mobile terminal, a first matching condition based on the at least one first verification image;

recording, by the mobile terminal, the first matching condition;

generating, by the mobile terminal, a second matching condition based on the verification information, and the second matching condition comprises behavior information of the user as the user walks along the preset walking track password of the user; and recording, by the mobile terminal, the second matching condition.

14. The method according to claim 13, wherein the second matching condition comprises a quantity of steps that the user walks along the preset walking track password of the user and locations of the steps that the user walks along the preset walking track of the user.

15. A mobile terminal, comprising:
  a touchscreen, wherein the touchscreen comprises a touch-sensitive surface and a display;
  at least one processor;
  a non-transitory memory;
  a camera;
  a plurality of application programs; and
  one or more computer programs, wherein the one or more computer programs are stored in the non-transitory memory, the one or more computer programs comprise an instruction, and when the instruction is executed by the terminal, the terminal is enabled to perform the following:
    in response to detecting an operation of requesting password verification, collecting at least one first image using the camera, wherein collecting the at least one first image comprises collecting an image of a material object pre-selected by a user;
    obtaining matching information in response to a result of matching between the at least one first image and at least one first preset image satisfying a first preset matching condition, wherein the at least one first preset image corresponds to a start point of a preset walking track password of the user, and the matching information comprises:
      motion information of a movement of the mobile terminal;
    obtaining, based on the motion information, behavior information of a user corresponding to the mobile terminal, and the behavior information of the user comprises:
      a motion step count of one or more steps of the user;
      a motion step length of one or more steps of the user;
      a location corresponding to each motion step of one or more steps of the user; or
      motion duration corresponding to each motion step of one or more steps of the user; and
    performing matching between the behavior information of the user and a second preset matching condition, wherein the second preset condition comprises behavior information of the user as the user walks along the preset walking track password of the user, and the password verification succeeds in response to the matching being successful.

16. The mobile terminal according to claim 15, wherein the behavior information of the user matches the second preset matching condition when a quantity of steps that the user walks and locations of the steps that the user walks matches a quantity of steps that the user walks along the preset walking track password of the user and locations of the steps that the user walks along the preset walking track of the user.

17. The mobile terminal according to claim 15, when the instruction is executed by the terminal, the terminal is enabled to perform the following:
  in response to the result of matching between the at least one first image and the at least one first preset image satisfying the first preset matching condition, display a prompt interface that prompts the user to carry the mobile terminal and start recording the behavior information of the user.

\* \* \* \* \*